US011854127B2

(12) United States Patent
King et al.

(10) Patent No.: US 11,854,127 B2
(45) Date of Patent: Dec. 26, 2023

(54) GRAPHICAL USER INTERFACE FOR POWER AND UNCERTAINTY INTERVAL CONSTRUCTIONS

(71) Applicant: JMP Statistical Discovery LLC, Cary, NC (US)

(72) Inventors: Caleb Bridges King, Morrisville, NC (US); Ryan Adam Lekivetz, Cary, NC (US); Joseph Albert Morgan, Raleigh, NC (US); Yeng Saanchi, Raleigh, NC (US); Bradley Allen Jones, Cary, NC (US)

(73) Assignee: JMP Statistical Discovery LLC, Cary, NC (US)

(*) Notice: Subject to any disclaimer, the term of this patent is extended or adjusted under 35 U.S.C. 154(b) by 0 days.

(21) Appl. No.: 18/214,640

(22) Filed: Jun. 27, 2023

(65) Prior Publication Data

US 2023/0343003 A1 Oct. 26, 2023

Related U.S. Application Data

(63) Continuation-in-part of application No. 17/872,072, filed on Jul. 25, 2022, now Pat. No. 11,699,006.

(Continued)

(51) Int. Cl.
*G06T 11/20* (2006.01)
*G06F 3/04847* (2022.01)

(52) U.S. Cl.
CPC ........ *G06T 11/206* (2013.01); *G06F 3/04847* (2013.01); *G06T 2200/24* (2013.01)

(58) Field of Classification Search
CPC ...... G06F 30/20; G06F 30/12; G06F 16/9024; G06F 3/04847; G06T 11/206; G06T 2200/24
See application file for complete search history.

(56) References Cited

U.S. PATENT DOCUMENTS

| | | | |
|---|---|---|---|
| 2017/0329880 | A1 | 11/2017 | Ghosh et al. |
| 2018/0060469 | A1 | 3/2018 | Morgan et al. |
| 2019/0346297 | A1 | 11/2019 | Lekivetz et al. |

OTHER PUBLICATIONS

Loy et al., Design of Experiments Considering Multiple Engineering Characteristics, 2000, IEEE, pp. 874-880 (Year: 2000).*

(Continued)

*Primary Examiner* — Bradley A Teets
*Assistant Examiner* — Bernard E Cothran
(74) *Attorney, Agent, or Firm* — COATS & BENNETT, PLLC

(57) ABSTRACT

A computing device receives a target value for a design quality metric. The target value indicates a desired quality of a design of an experiment and is related to an input parameter by a response curve. The computing device also validates the target value as being in a feasibility range for the design quality metric, and if so, determines a candidate value for the input parameter that yields a calculated value for the design quality metric. To determine the calculated value, the computing device iteratively adjusts the candidate value until the calculated value is within a predetermined tolerance of the target value. The computing device then updates an interactive graph visually representing the calculated value for the design quality metric as a function of the candidate value for the input parameter and outputs a graph visually representing the relationship that exists between the candidate value and the calculated value.

30 Claims, 41 Drawing Sheets

Related U.S. Application Data

(60) Provisional application No. 63/321,613, filed on Mar. 18, 2022, provisional application No. 63/297,558, filed on Jan. 7, 2022.

(56) References Cited

OTHER PUBLICATIONS

JMP, Design of Experiments Guide, 2017, SAS Institute Inc., Second Edition, pp. 1-694 (Year: 2017).*
JMP, "Profilers", Version 16, Aug. 1, 2021, pp. 1-200, JMP.
JMP, "Design of Experiments Guide", Version 16, Dec. 1, 2021, pp. 1-848, JMP.
Pass Software, "Pass Documentation", Jan. 1, 2022, pp. 1-70, retrieved on Jan. 7, 2022, retrieved from internet: https://www.ncss.com/software/pass/pass-documentation/.
Pass Software, "Sample Size & Power", Jan. 1, 2022, pp. 1-7, retrieved on Jan. 7, 2022, retrieved from internet: https://www.ncss.com/software/pass/.
Wikipedia, "G*Power" Jul. 2, 2021, pp. 1, retrieved on Jul. 7, 2022, retrieved from internet: https://en.wikipedia.org/wiki/G*Power.
JMP, "Introduction to Profilers" Jul. 30, 2020, pp. 1-3, retrieved on Jul. 22, 2022, retrieved from internet: https://www.jmp.com/support/help/en/15.0/index.shtml#page/jmp/profilers.shtml.
Hintze, J. et al., "User Guide 1—Quick Start, Proportions, and Diagnostic Tests", PASS: Power and Analysis and Sample Size System, 2011, pp. 1-774.

* cited by examiner

2370

GRAPHICAL USER INTERFACE FOR POWER AND UNCERTAINTY INTERVAL CONSTRUCTIONS

CROSS-REFERENCE TO RELATED APPLICATIONS

This application is a continuation-in-part of U.S. application Ser. No. 17/872,072 filed Jul. 25, 2022, which claims the benefit of, and priority based on, 35 U.S.C. § 119 to U.S. Provisional Application No. 63/297,558, filed Jan. 7, 2022, and U.S. Provisional Application No. 63/321,613, filed Mar. 18, 2022, the disclosures of each of which are incorporated herein by reference in their entirety.

BACKGROUND

In designing an experiment, a designer may have certain design goals or requirements. For example, if the designer has a hypothesis for an outcome of an experiment, a designer may be interested in designing an experiment to exceed a power where the power indicates a probability the experiment indicates a rejection if the outcome of the experiment is different than the hypothesis outcome. As another example, the designer may be interested in a margin of error or uncertainty in experiment outcome.

SUMMARY

In an example embodiment, the present disclosure provides a computer profiler tool configured to determine an input parameter given a desired response for a design of an experiment.

In some embodiments, the present disclosure provides a computer-program product tangibly embodied in a non-transitory machine-readable storage medium. The computer-program product includes instructions implementing a computer profiler tool of a computing system to cause the computing system to generate, by the computer profiler tool, an interactive adjustable power analysis graphically indicating a relationship between one or more adjustable settings and each of a plurality of power profiles. To generate the interactive adjustable power analysis, the instructions are configured to cause the computer profiler tool to obtain, for a design of an experiment, settings comprising a first sample size indicating an amount of members for a first group observed as part of the experiment, a design quality metric that assesses, based on the first sample size, a quality of the design for the experiment prior to conducting the experiment, and a parameter pertaining to the first group. Additionally, the instructions further cause the computing system to generate a graphical user interface by generating a first interactive graph visually representing the design quality metric as a function of the first sample size and a second interactive graph visually representing the design quality metric as a function of the parameter pertaining to the first group. In some embodiments, the second setting comprises a value on an x-axis of the second interactive graph and is different from the first setting. The instructions further cause the computing system to display the first and second interactive graphs to a user in a graphical user interface and update, by the computer profiler tool, the interactive adjustable power analysis. To update the interactive adjustable power analysis, the instructions are configured to cause the computer profiler tool to receive, via the graphical user interface, a target value for the design quality metric, wherein the target value indicates a desired quality of the design of the experiment and wherein the design quality metric is related to an input parameter by a response curve, validate the target value for the design quality metric as being in a feasibility range of values for the design quality metric, determine a candidate value for the input parameter that yields a calculated value for the design quality metric by iteratively adjusting the candidate value for the input parameter until the calculated value for the design quality metric is within a predetermined tolerance of the target value for the design quality metric, update, in the graphical user interface, an interactive graph visually representing the calculated value for the design quality metric as a function of the candidate value for the input parameter, and output the graphical user interface to a display.

In at least one embodiment, the present disclosure provides a computer-implemented method comprising generating an interactive adjustable power analysis graphically indicating a relationship between one or more adjustable settings and each of a plurality of power profiles, wherein generating the interactive adjustable power analysis comprises obtaining, for a design of an experiment, settings comprising a first sample size indicating an amount of members for a first group of observed as part of the experiment, a design quality metric that assesses, based on the first sample size, a quality of the design for the experiment prior to conducting the experiment, and a parameter pertaining to the first group. The computer-implemented method further comprises generating a graphical user interface by generating a first interactive graph visually representing the design quality metric as a function of the first sample size and generating a second interactive graph visually representing the design quality metric as a function of the parameter pertaining to the first group. A first setting comprises a value on an x-axis of the first interactive graph and a second setting comprises a value on an x-axis of the second interactive graph and is different from the first setting. The computer-implemented method further comprises displaying the first and second interactive graphs to a user in a graphical user interface and updating the interactive adjustable power analysis. Updating the interactive adjustable power analysis comprises receiving, via the graphical user interface, a target value for the design quality metric, wherein the target value indicates a desired quality of the design of the experiment and wherein the design quality metric is related to an input parameter by a response curve, validating the target value for the design quality metric as being in a feasibility range for the design quality metric, determining a candidate value for the input parameter that yields a calculated value for the design quality metric by iteratively adjusting the candidate value for the input parameter until the calculated value for the design quality metric is within a predetermined tolerance of the target value for the design quality metric, updating, in the graphical user interface, an interactive graph visually representing the calculated value for the design quality metric as a function of the candidate value for the input parameter, and outputting the graphical user interface to a display.

Some embodiments of the present disclosure also provide a computing device comprising a processor and memory. The memory contains instructions executable by the processor wherein the computing device is configured to generate an interactive adjustable power analysis graphically indicating a relationship between one or more adjustable settings and each of a plurality of power profiles. To generate the interactive adjustable power analysis, the instructions are executable to cause the computing device to obtain, for a design of an experiment, settings comprising a first sample size indicating an amount of members for a first group observed as part of the experiment, a design quality metric that assesses, based on the first sample size, a quality of the design for the experiment prior to conducting the experiment, and a parameter pertaining to the first group. The instructions are executable to further cause the computing device to generate a graphical user interface by generating a first interactive graph visually representing the design quality metric as a function of the first sample size and a second interactive graph visually representing the design quality metric as a function of the parameter pertaining to the first group. A first setting comprises a value on an x-axis of the first interactive graph and a second setting comprises a value on an x-axis of the second interactive graph and is different from the first setting. The instructions are executable to further cause the computing device to display the first and second interactive graphs to a user in a graphical user interface and update the interactive adjustable power analysis. To update the interactive adjustable power analysis, the instructions are executable to cause the computing device to receive, via the graphical user interface, a target value for the design quality metric, wherein the target value indicates a desired quality of the design of the experiment and wherein the design quality metric is related to an input parameter by a response curve, validate the target value for the design quality metric as being within a feasibility range for the design quality metric, determine a candidate value for the input parameter that yields a calculated value for the design quality metric by iteratively adjusting the candidate value for the input parameter until the calculated value for the design quality metric is within a predetermined tolerance of the target value for the design quality metric, update, in the graphical user interface, an interactive graph visually representing the calculated value for the design quality metric as a function of the candidate value for the input parameter, and output the graphical user interface to a display.

Other features and aspects of example embodiments are presented below in the Detailed Description when read in connection with the drawings presented with this application.

DETAILED DESCRIPTION

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional operations not included in a figure. A process may correspond to a method, a function, a procedure, a subroutine, a subprogram, etc. When a process corresponds to a function, its termination can correspond to a return of the function to the calling function or the main function.

Systems depicted in some of the figures may be provided in various configurations. In some embodiments, the systems may be configured as a distributed system where one or more components of the system are distributed across one or more networks in a cloud computing system.

Figure 1:
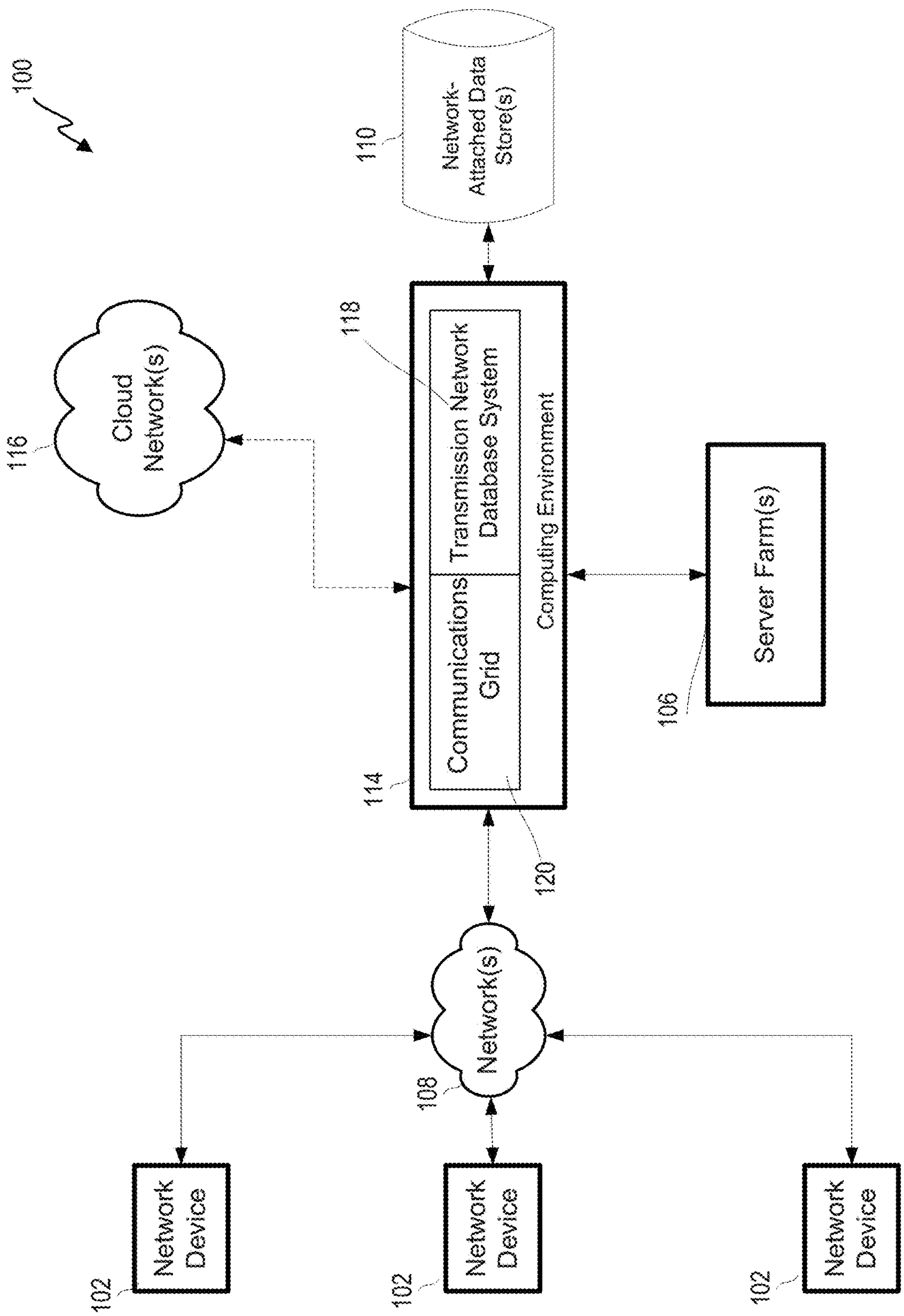
FIG. 1 illustrates a block diagram that provides an illustration of the hardware components of a computing system, according to at least one embodiment of the present technology.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
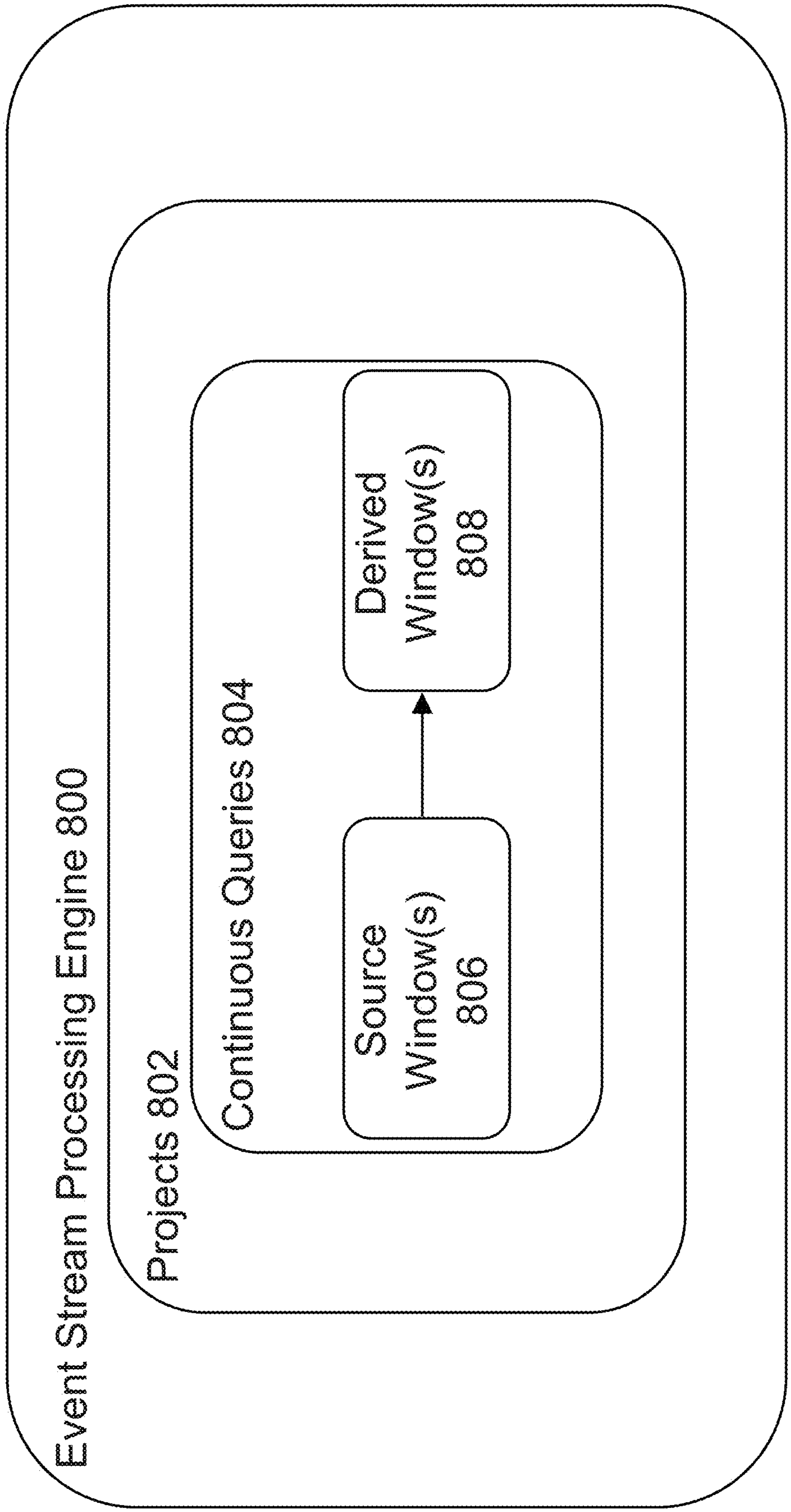
FIG. 8 illustrates a block diagram including components of an Event Stream Processing Engine (ESPE), according to at least one embodiment of the present technology.
Figure 9:
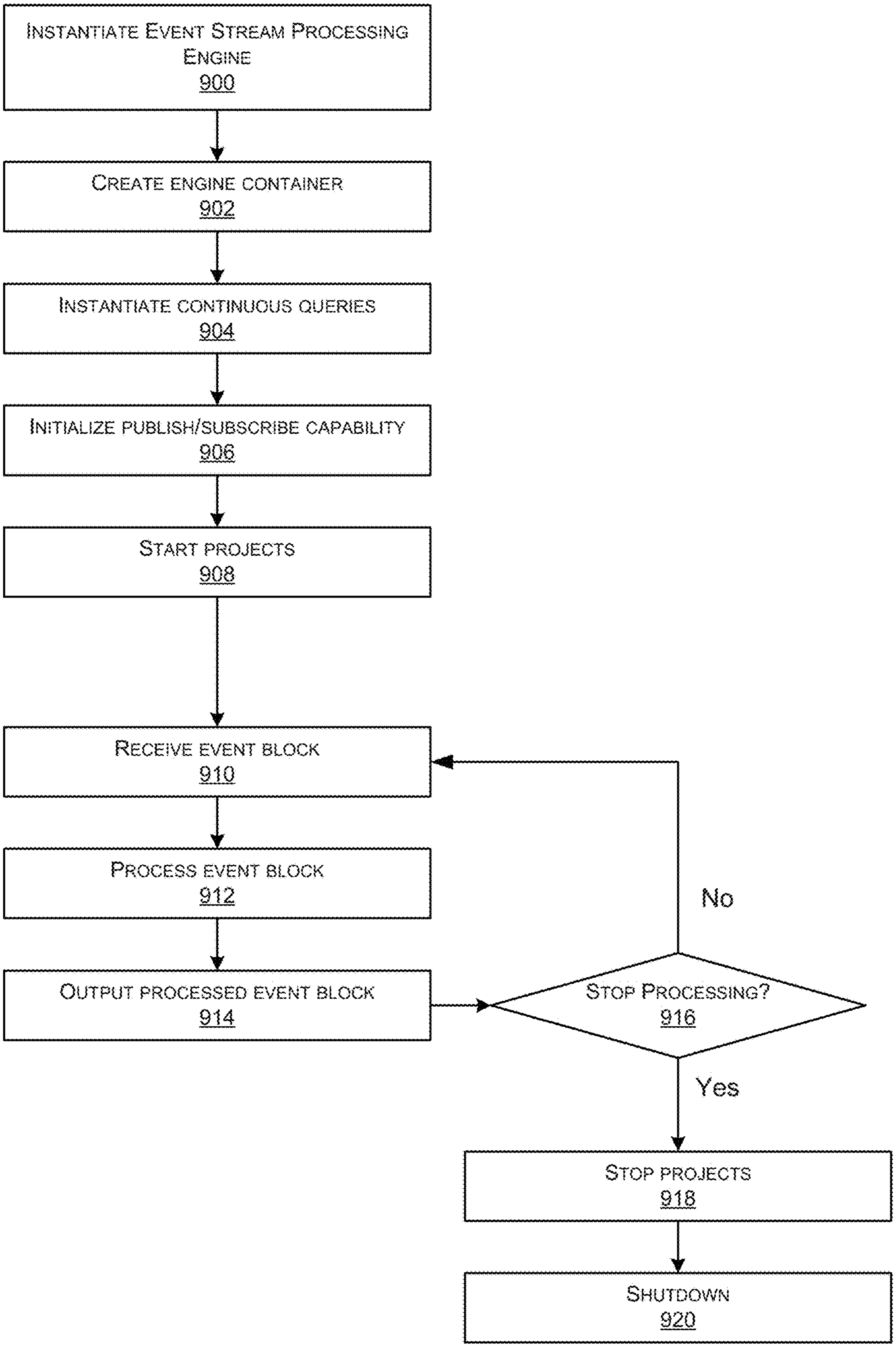
FIG. 9 illustrates a flow chart showing an example process including operations performed by an event stream processing engine, according to at least one embodiment of the present technology.
Figure 10:
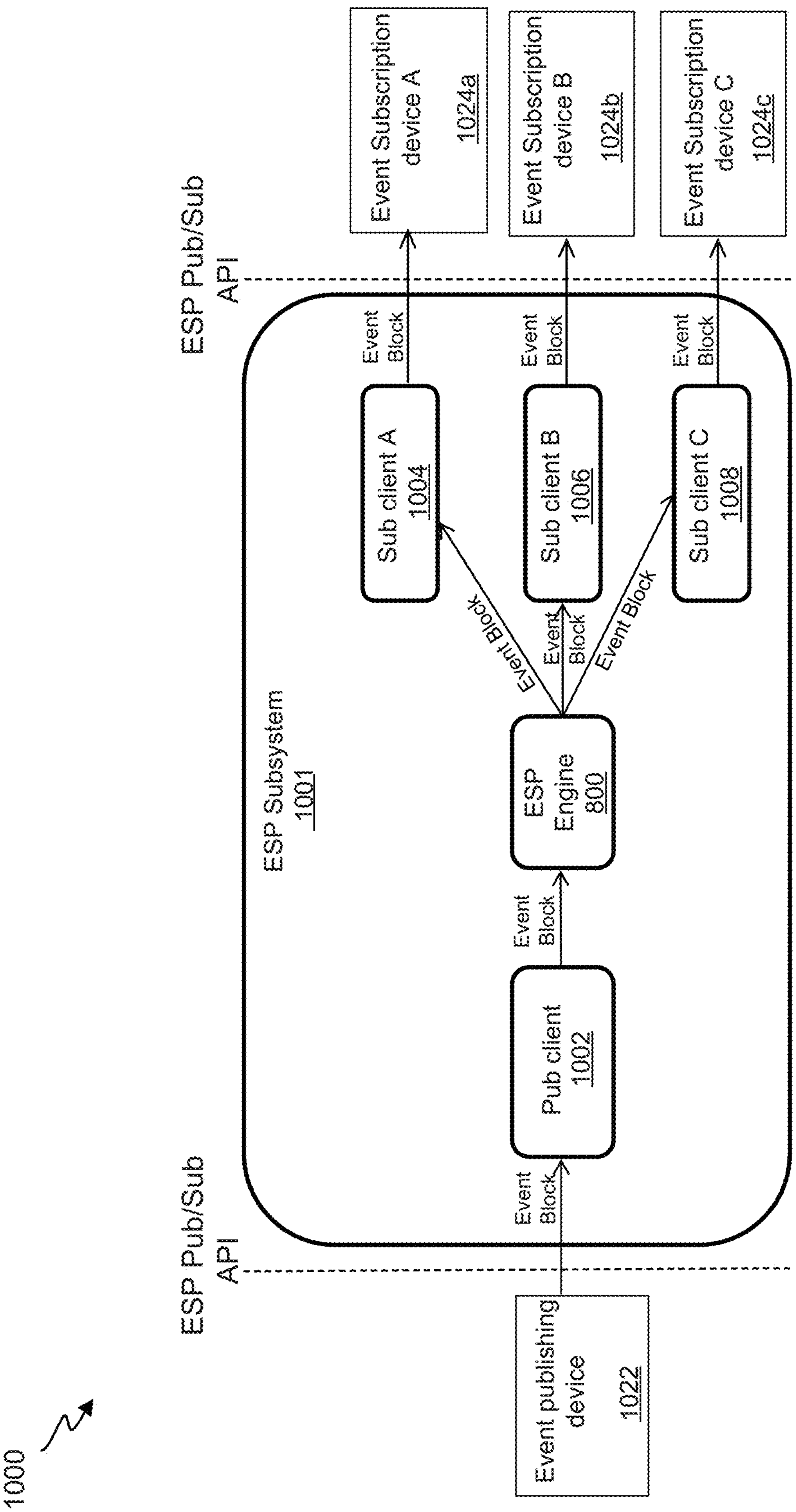
FIG. 10 illustrates an ESP system interfacing between a publishing device and multiple event subscribing devices, according to at least one embodiment of the present technology.

In other embodiments, network devices may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices may include local area network devices, such as routers, hubs, switches, or other computer networking devices. These devices may provide a variety of stored or generated data, such as network data or data specific to the network devices themselves. Network devices may also include sensors that monitor their environment or other devices to collect data regarding that environment or those devices, and such network devices may provide data they collect over time. Network devices may also include devices within the internet of things, such as devices within a home automation network. Some of these devices may be referred to as edge devices, and may involve edge computing circuitry. Data may be transmitted by network devices directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or a remote server may include a server stack. As another example, data may be processed as part of computing environment 114.

Each communication within data transmission network 100 (e.g., between client devices, between a device and connection management system, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. IoT may be implemented in various areas, such as for access (technologies that get data and move it), embed-ability (devices with embedded sensors), and services. Industries in the IoT space may include automotive (connected car), manufacturing (connected factory), smart cities, energy and retail. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
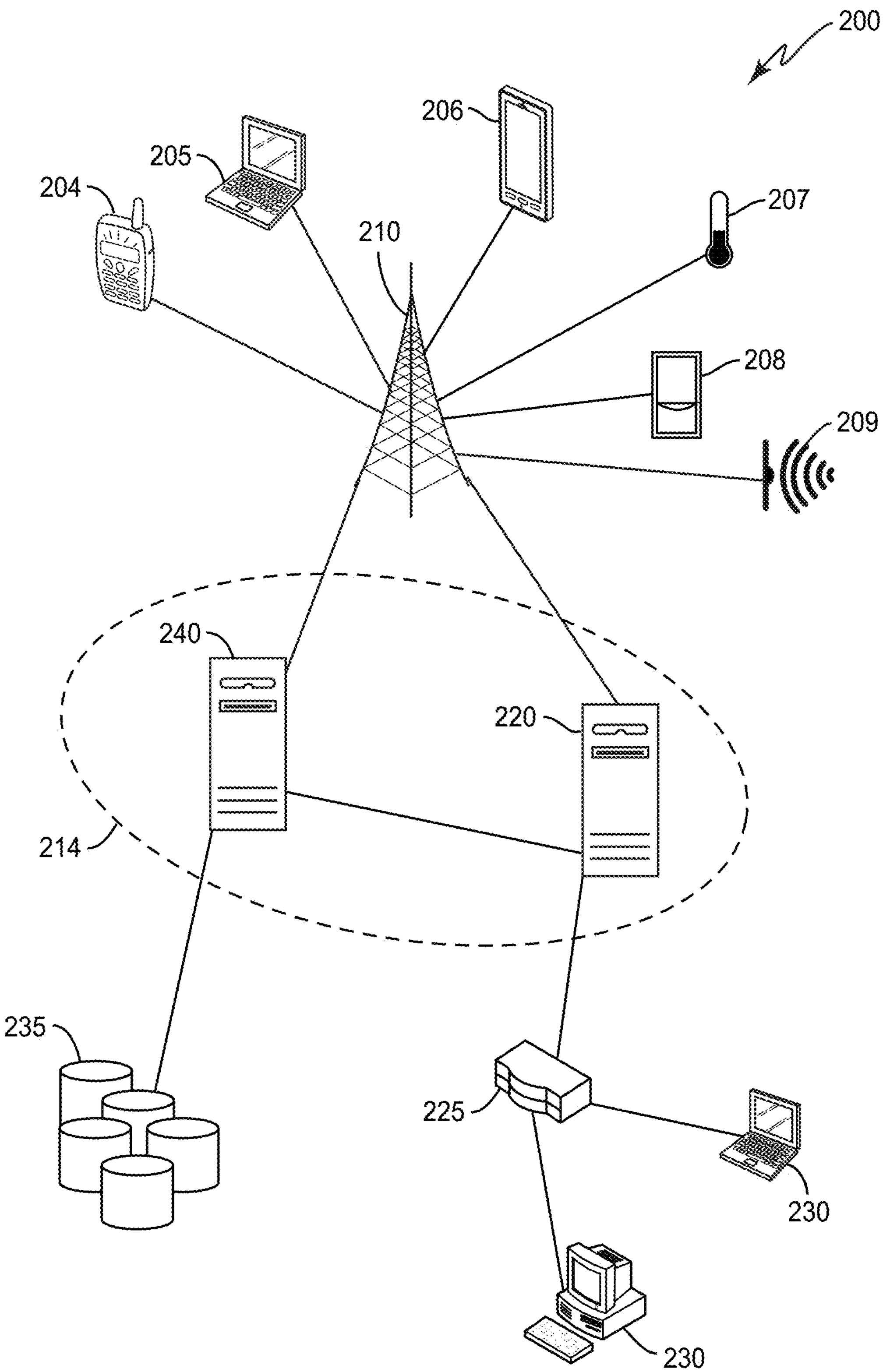
FIG. 2 illustrates an example network including an example set of devices communicating with each other over an exchange system and via a network, according to at least one embodiment of the present technology.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). The communication can be routed to another network device, such as network devices 205-209, via base station 210. The communication can also be routed to computing environment 214 via base station 210. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc. and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data it collects before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a web server 240. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments. Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
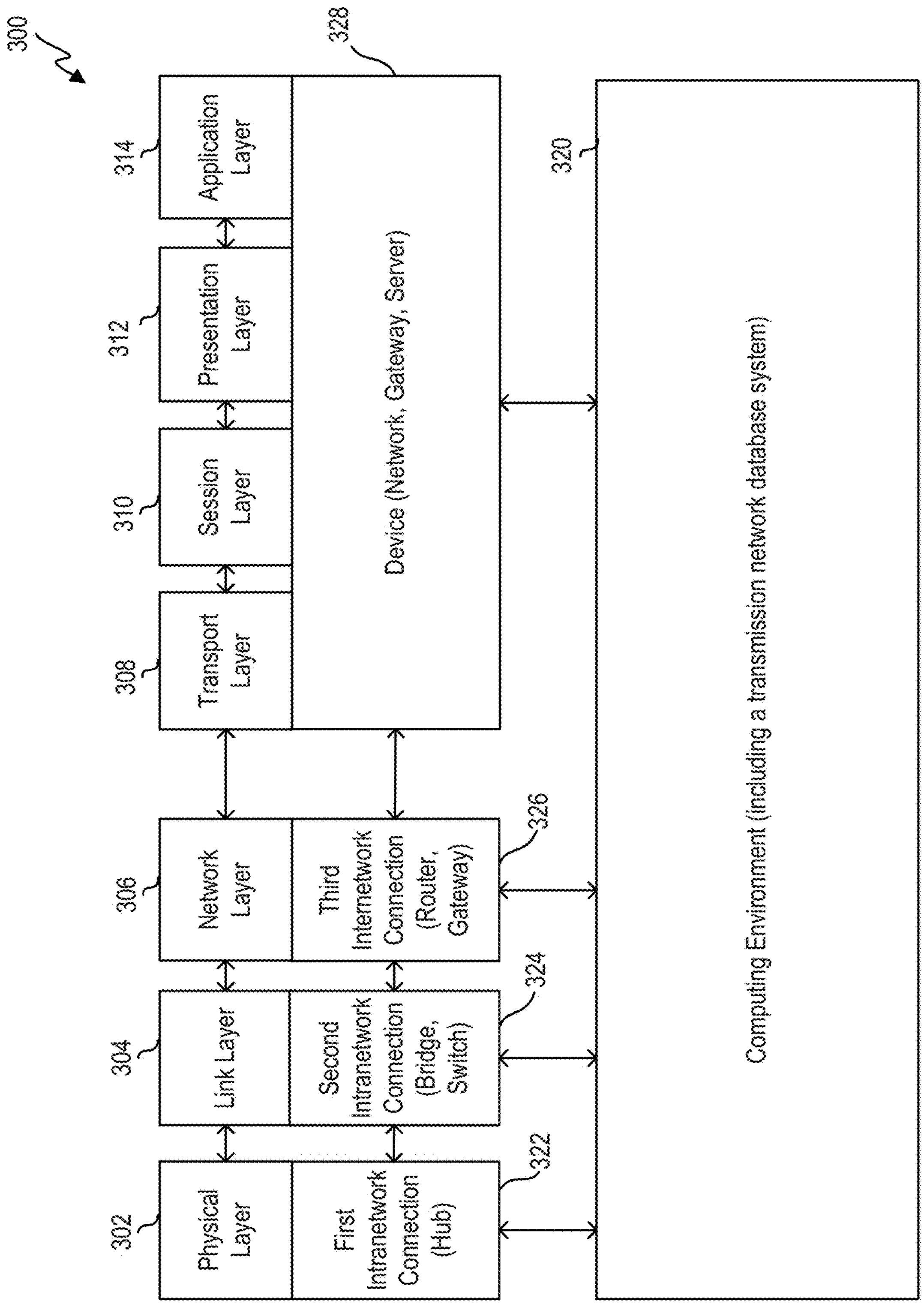
FIG. 3 illustrates a representation of a conceptual model of a communications protocol system, according to at least one embodiment of the present technology.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 320 (or computing environment 214 in FIG. 2) may communicate with other devices in its network, and control how communications between the computing environment and other devices are executed and under what conditions.

The model can include layers 302-314. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bytes of data and is the farthest layer from the user in a communications system. On the other hand, the application layer is the highest layer because it interacts directly with a software application.

As noted, the model includes a physical layer 302. Physical layer 302 represents physical communication and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (i.e., move) data across a network. The link layer manages node-to-node communications, such as within a grid computing environment. Link layer 304 can detect and correct errors (e.g., transmission errors in the physical layer 302). Link layer 304 can also include a media access control (MAC) layer and logical link control (LLC) layer.

Network layer 306 defines the protocol for routing within a network. In other words, the network layer coordinates transferring data across nodes in a same network (e.g., such as a grid computing environment). Network layer 306 can also define the processes used to structure local addressing within the network.

Transport layer 308 can manage the transmission of data and the quality of the transmission and/or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt and/or format data based on data types known to be accepted by an application or network layer.

Application layer 314 interacts directly with software applications and end users, and manages communications between them. Application layer 314 can identify destinations, local resource states or availability and/or communication content or formatting using the applications.

Intra-network connection components 322 and 324 are shown to operate in lower levels, such as physical layer 302 and link layer 304, respectively. For example, a hub can operate in the physical layer and a switch can operate in the link layer. Inter-network connection components 326 and 328 are shown to operate on higher levels, such as layers 306-314. For example, routers can operate in the network layer and network devices can operate in the transport, session, presentation, and application layers.

As noted, a computing environment 320 can interact with and/or operate on, in various embodiments, one, more, all or any of the various layers. For example, computing environment 320 can interact with a hub (e.g., via the link layer) so as to adjust which devices the hub communicates with. The physical layer may be served by the link layer, so it may implement such data from the link layer. For example, the computing environment 320 may control which devices it will receive data from. For example, if the computing environment 320 knows that a certain network device has turned off, broken, or otherwise become unavailable or unreliable, the computing environment 320 may instruct the hub to prevent any data from being transmitted to the computing environment 320 from that network device. Such a process may be beneficial to avoid receiving data that is inaccurate or that has been influenced by an uncontrolled environment. As another example, computing environment 320 can communicate with a bridge, switch, router or gateway and influence which device within the system (e.g., system 200) the component selects as a destination. In some embodiments, computing environment 320 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 320 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
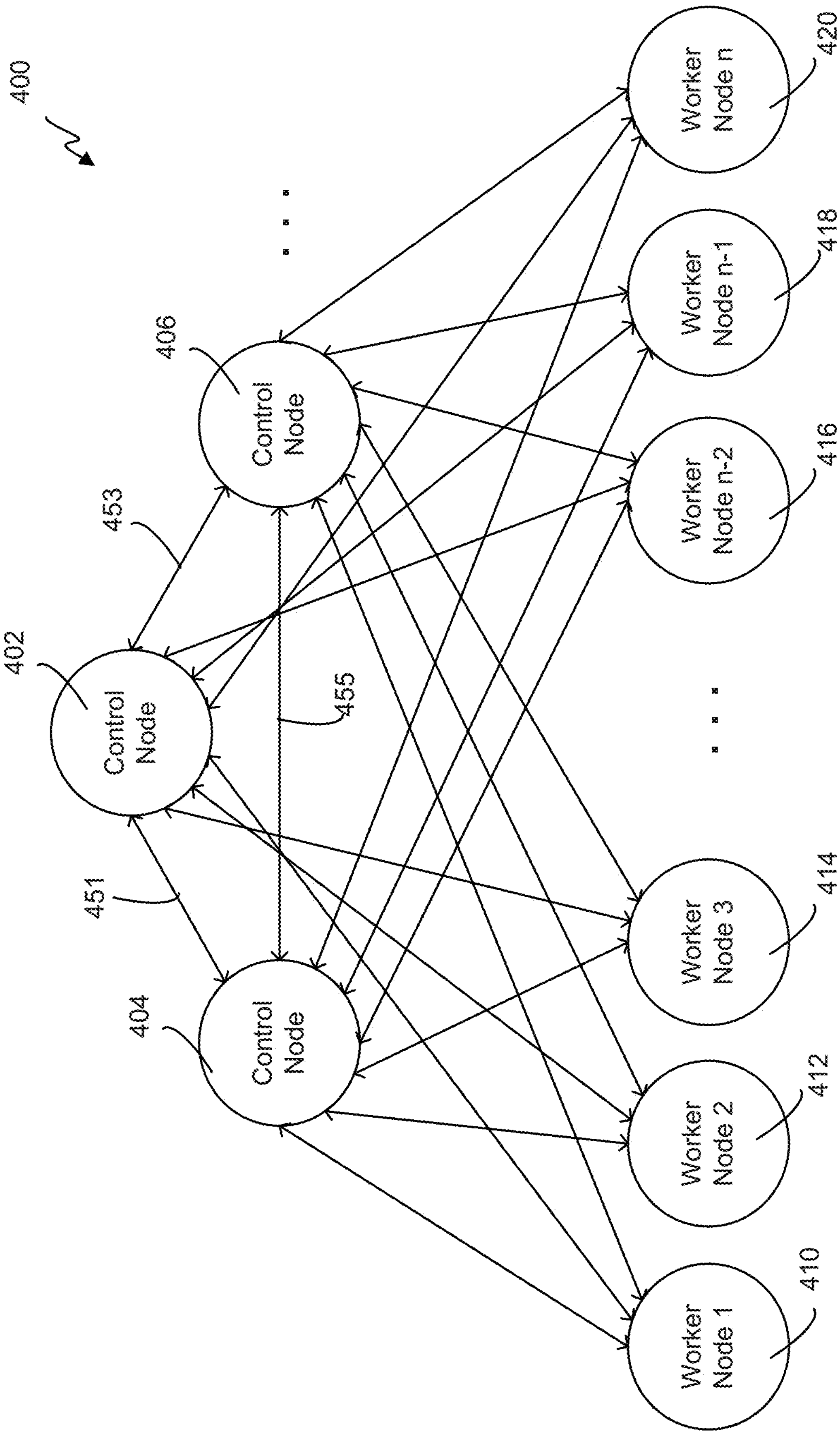
FIG. 4 illustrates a communications grid computing system including a variety of control and worker nodes, according to at least one embodiment of the present technology.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a Hadoop data node).

Control nodes may maintain knowledge of the status of the nodes in the grid (i.e., grid status information), accept work requests from clients, subdivide the work across worker nodes, coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
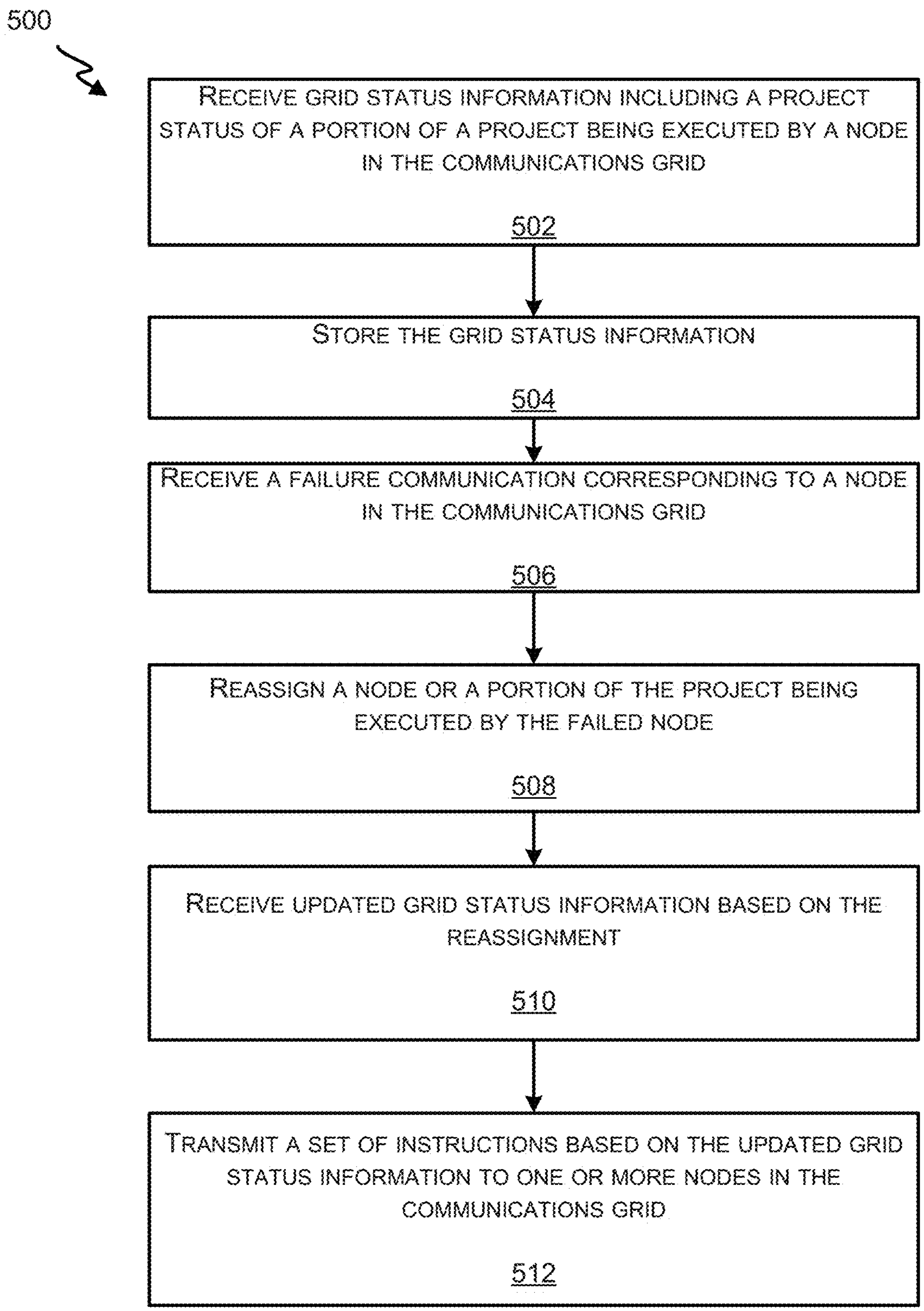
FIG. 5 illustrates a flow chart showing an example process for adjusting a communications grid or a work project in a communications grid after a failure of a node, according to at least one embodiment of the present technology.

FIG. 5 illustrates a flow chart 500 showing an example process for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
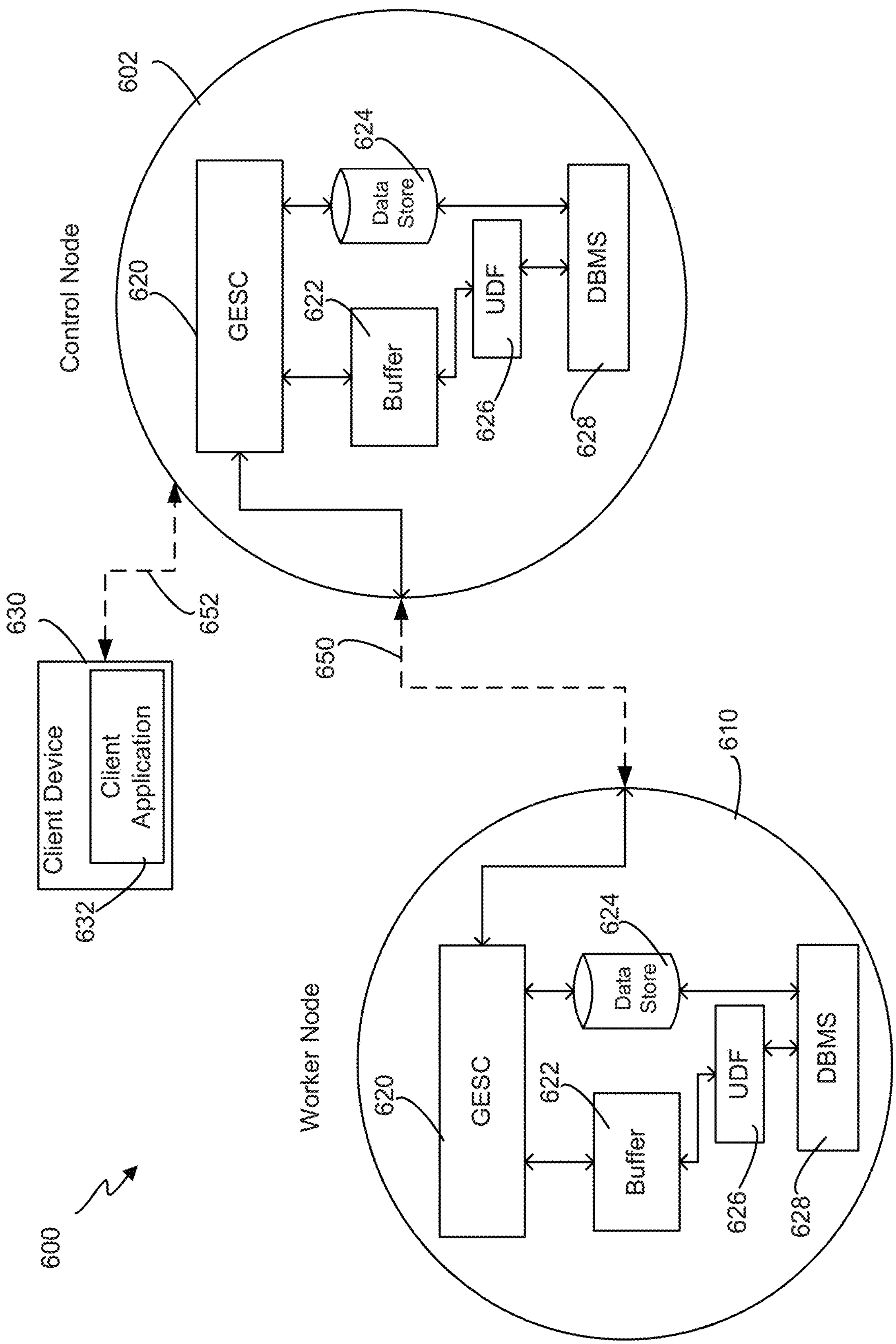
FIG. 6 illustrates a portion of a communications grid computing system including a control node and a worker node, according to at least one embodiment of the present technology.

FIG. 6 illustrates a portion of a communications grid computing system 600 including a control node and a worker node, according to embodiments of the present technology. Communications grid 600 computing system includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes a database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
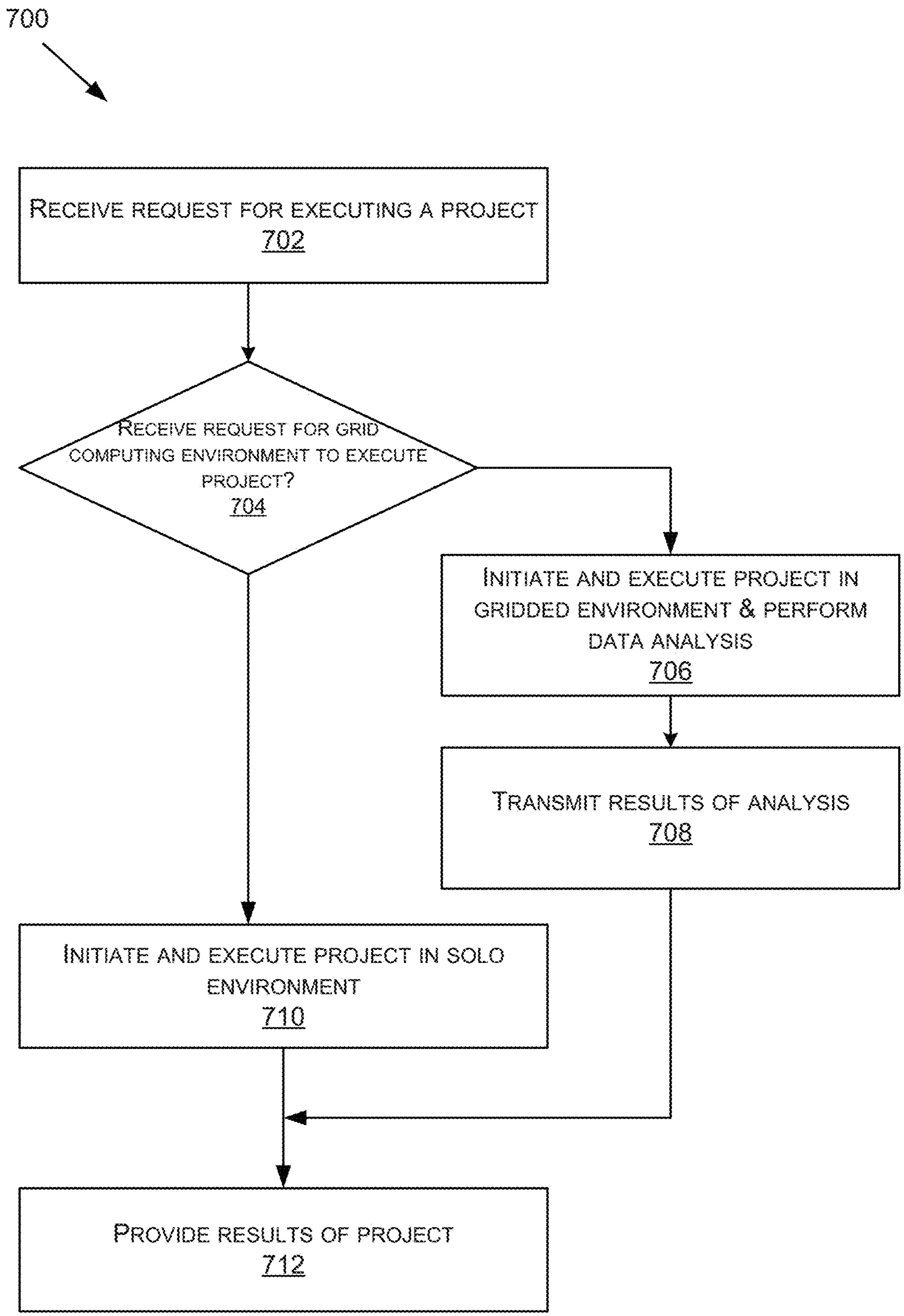
FIG. 7 illustrates a flow chart showing an example process for executing a data analysis or processing project, according to at least one embodiment of the present technology.

FIG. 7 illustrates a flow chart 700 showing an example method for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a*-*c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024_a-c_. For example, subscribing client A 1004, subscribing client B 1006, and subscribing client C 1008 may send the received event block object to event subscription device A 1024_a_, event subscription device B 1024_b_, and event subscription device C 1024_c_, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
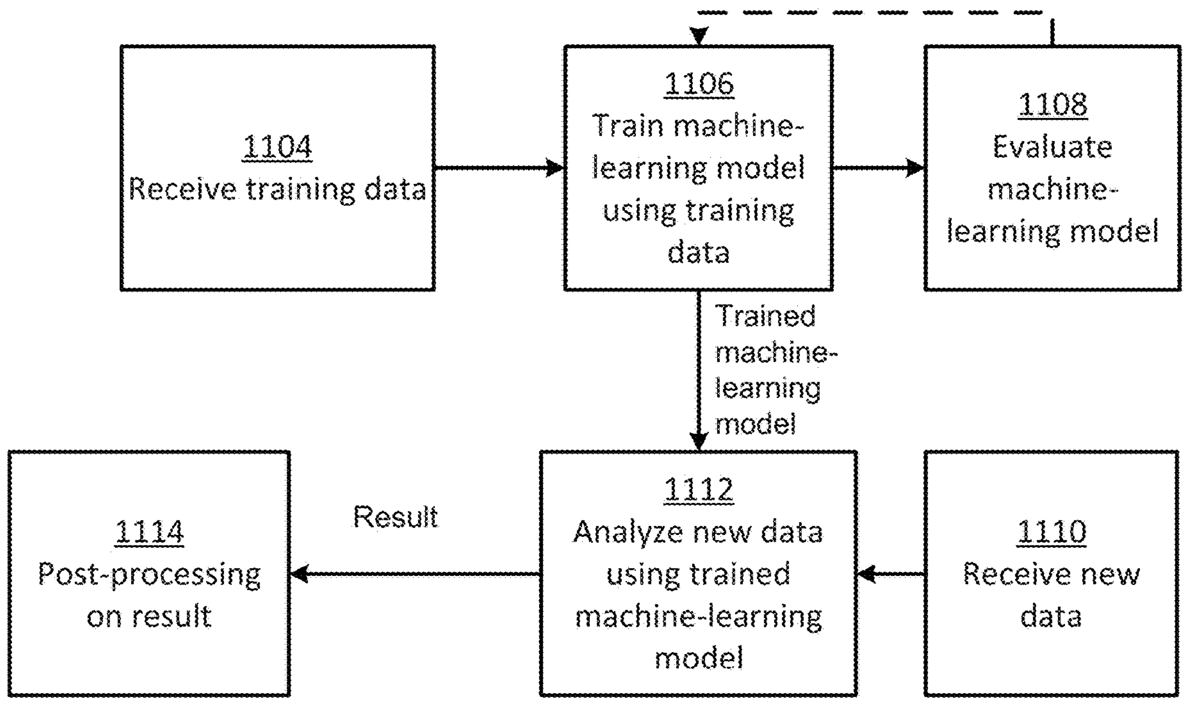
FIG. 11 illustrates a flow chart of an example of a process for generating and using a machine-learning model according to at least one embodiment of the present technology.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector operator (LASSO) classifiers, and support vector machines; (iv) clusterers, such as k-means clustering, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, North Carolina.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1104, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1106, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1108, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 1106, where the machine-learning model can be further trained using additional training data or otherwise modified to improve accuracy. If the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
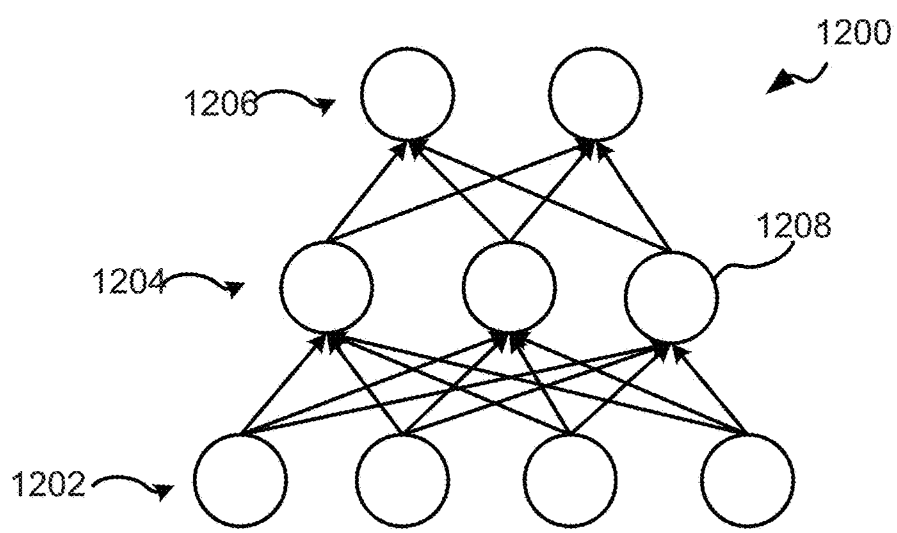
FIG. 12 illustrates an example of a machine-learning model as a neural network according to at least one embodiment of the present technology.

A more specific example of a machine-learning model is the neural network 1200 shown in FIG. 12. The neural network 1200 is represented as multiple layers of interconnected neurons, such as neuron 1208, that can exchange data between one another. The layers include an input layer 1202 for receiving input data, a hidden layer 1204, and an output layer 1206 for providing a result. The hidden layer 1204 is referred to as hidden because it may not be directly observable or have its input directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons and connections between the neurons can have numeric weights, which can be tuned during training. For example, training data can be provided to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 and a desired output of the neural network 1200. Based on the gradient, one or more numeric weights of the neural network 1200 can be updated to reduce the difference, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, every neuron only propagates an output value to a subsequent layer of the neural network 1200. For example, data may only move one direction (forward) from one neuron to the next neuron in a feed-forward neural network.

In other examples, the neural network 1200 is a recurrent neural network. A recurrent neural network can include one or more feedback loops, allowing data to propagate in both forward and backward through the neural network 1200. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer of the neural network 1200. Each subsequent layer of the neural network 1200 can repeat this process until the neural network 1200 outputs a final result at the output layer 1206. For example, the neural network 1200 can receive a vector of numbers as an input at the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the following equation:

$$y=\max(x,0)$$

where y is the output and x is an input value from the weighted vector. The transformed output can be supplied to a subsequent layer, such as the hidden layer 1204, of the neural network 1200. The subsequent layer of the neural network 1200 can receive the transformed output, multiply the transformed output by a matrix of numeric weights and a nonlinearity, and provide the result to yet another layer of the neural network 1200. This process continues until the neural network 1200 outputs a final result at the output layer 1206.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide(GaAs)) devices. Furthermore, these processors may also be employed in heterogeneous computing architectures with a number of and a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
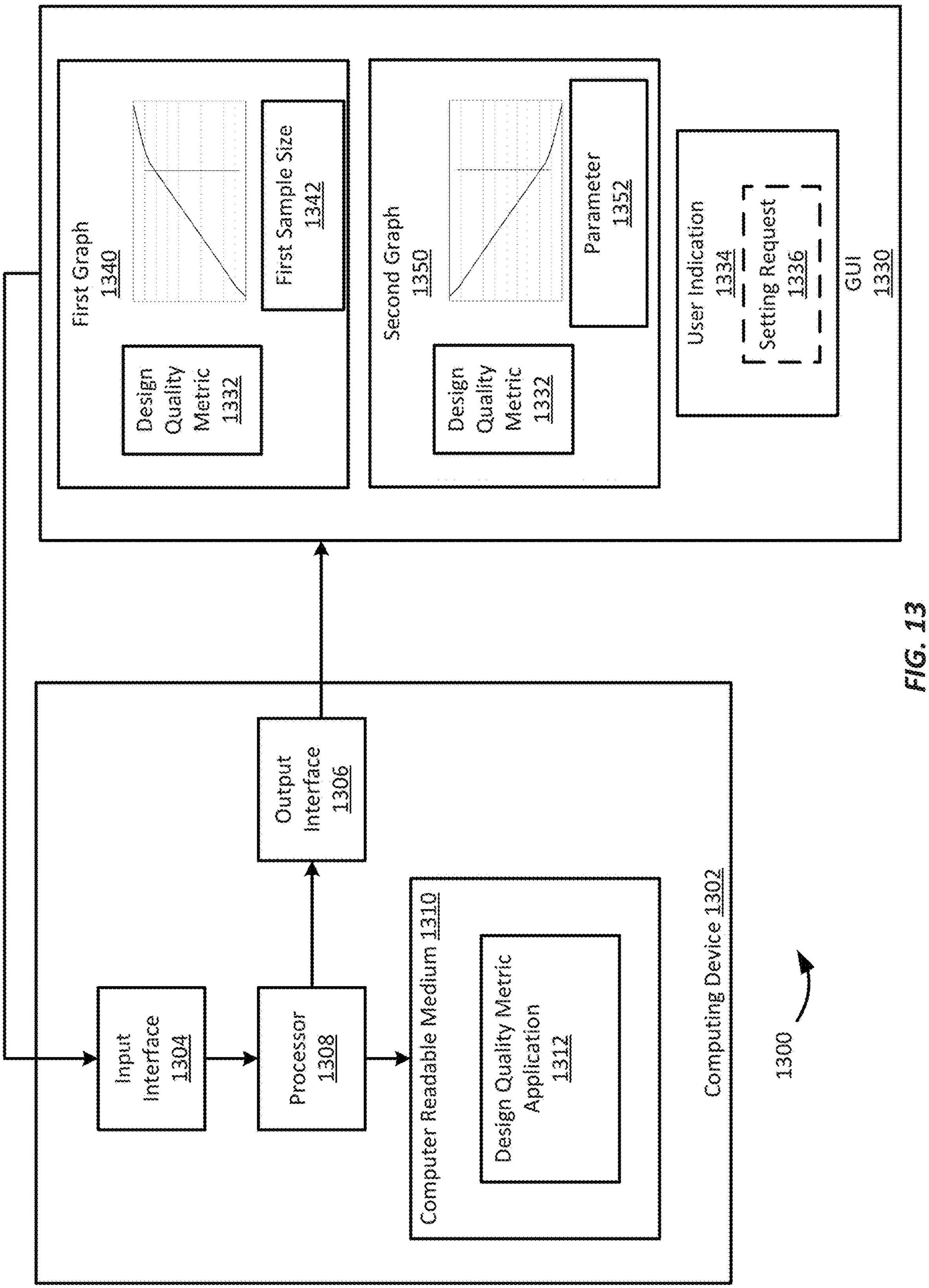
FIG. 13 illustrates a block diagram of a system for providing an interactive graphical user interface according to at least one embodiment of the present technology.

FIG. 13 illustrates a block diagram of a system 1300 for providing an interactive graphical user interface 1330. System 1300 includes a computing device 1302 and the graphical user interface 1330. The computing device 1302 has one or more input interfaces 1304 and one or more output interfaces 1306 for exchanging information with graphical user interface 1330. For instance, the system 1300 is configured to exchange information between devices in the system (e.g., via wired and/or wireless transmission). For example, a network (not shown) can connect one or more devices of system 1300 to one or more other devices of system 1300. Alternatively, or additionally, the system is integrated into one device (e.g., a touch screen for entry and display of information for graphical user interface 1330) and the one or more input interfaces 1304 and the one or more output interfaces 1306 are internal interfaces.

In one or more embodiments, the computing device obtains using the computing device 1302 and/or the graphical user interface 1330 settings for a design of an experiment. For instance, the experiment may be a type of testing such as a clinical trial, an industrial experiment, or an observational study (e.g., collecting data for a survey). An experiment may observe one or more members in a group. For instance, a clinical trial may observe multiple people treated with a consistent experimental protocol across trial participants (e.g., the participants all get the same dosage amount in the trial). Alternatively, an experiment may observe multiple groups (e.g., to test categorical factors that differ between the groups). For instance, trial participants of a clinical trial at different sites may be in different groups or trial participants getting two different dosage amounts may be in different groups. Settings for the experiment may indicate a sample size for one or more groups in the experiment. The design can be constructed for the experiment (e.g., before data collection according to the design). The settings can include a first sample size indicating a numerical amount of members for a first group of the experiment and/or additional parameters pertaining to the first group. In this example, graphs for only one group are shown. However, experiments can have multiple groups and in other examples described herein there can be more graphs pertaining to more groups.

Additionally, or alternatively, the settings include a design quality metric that assesses a quality of the design for the experiment (e.g., prior to conducting the experiment). For instance, if the experiment design involves hypothesis testing, there may be a null hypothesis and an alternative hypothesis. For example, if the experiment is a survey test to test heights in a population, the null hypothesis may be that the population will have an average of six feet or more and the alternative hypothesis is that the height will be less than six feet. Power can be a design quality metric because it can indicate the probability of rejecting the null hypothesis when, in fact, it is false (i.e., the probability of making a correct decision that the experiment population is different from what is assumed in hypothesis testing). A higher power would indicate a better design. Testing can be simulated such that the outcome will be the alternative hypothesis. Power can be an indication of how well the simulated experiment rejected the null hypothesis as expected. For instance, based on simulated hypothesis outcomes, the experiment indicates a rejection if outcome of the experiment is different than the hypothesis outcome 80 percent of the time. As another example, a design quality metric could indicate one or more of error indications or uncertainty indications. Design quality metrics can be based on a sample size of one or more groups observed as part of the experiment. For instance, generally as sample size increases, power metrics also increase as there are more opportunities to observe the expected outcomes.

In one or more embodiments, the graphical user interface 1330 displays a first graph 1340 of the design quality metric as a function of the first sample size and displays a second graph 1350 of the design quality metric 1332 as a function of a parameter 1352 pertaining to the first group. The graphical user interface 1330 can be interactive. For instance, the computing device can receive, using the graphical user interface, a user indication 1134 to change one or more of the settings. The user indication 1134 may comprise a setting request for a computer-generated setting for the design of the experiment (e.g., based on other user-defined settings). The computing device 1302 can update, in the graphical user interface 1330, both the first graph 1340 and the second graph 1350 accounting for the user indication 1134. For instance, if the first sample size 1342 changes in graph 1340, then the design quality metric 1332 or parameter 1352 can change in graph 1350.

The computing device 1302 has a computer-readable medium 1310 and a processor 1308. Computer-readable medium 1310 is an electronic holding place or storage for information so the information can be accessed by processor 1308. Computer-readable medium 1310 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 1308 executes instructions (e.g., stored at the computer-readable medium 1310). The instructions can be carried out by a special purpose computer, logic circuits, or hardware circuits. In one or more embodiments, processor 1308 is implemented in hardware and/or firmware. Processor 1308 executes an instruction, meaning it performs or controls the operations called for by that instruction. The term "execution" is the process of running an application or the carrying out of the operation called for by an instruction. The instructions can be written using one or more programming language, scripting language, assembly language, etc. Processor 1308 in one or more embodiments can retrieve a set of instructions from a permanent memory device and copy the instructions in an executable form to a temporary memory device that is generally some form of RAM, for example. Processor 1308 operably couples with components of computing device 1302 (e.g., input interface 1304, with output interface 1306 and with computer-readable medium 1310) to receive, to send, and to process information.

In one or more embodiments, computer-readable medium 1310 stores instructions for execution by processor 1308. In one or more embodiments, one or more applications stored on computer-readable medium 1310 are implemented in software (e.g., computer-readable and/or computer-executable instructions) stored in computer-readable medium 1310 and accessible by processor 1308 for execution of the instructions. For example, in one or more embodiments, the computer-readable medium 1310 comprises instructions for a design quality metric application 1312 for obtaining settings and displaying graphs related to the design quality metric. For instance, the computer-readable medium 1310 may generate settings and/or simulate experiments to determine a design quality metric (e.g., before conducting an experiment). For instance, in hypothesis testing, the computing device 1302 may generate hypothesis outcome for the experiment (e.g., from simulating the experiment), and the design quality metric can indicate a probability related to the hypothesis outcome (e.g., based on a parameter or metric used to generating the hypothesis outcome, and/or indicate a variation from the hypothesis outcome).

One or more applications stored on computer-readable medium 1310 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 1302 or system 1300. For instance, in one or more embodiments, there are one or more input devices or output devices (e.g., for obtaining the settings or displaying the graphical user interface 1330). As another example, the same interface supports both input interface 1304 and output interface 1306. For example, a touch screen provides a mechanism for user input and for presentation of output to the user. Alternatively, the input interface 1304 has more than one input interface that uses the same or different interface technology. Alternatively, or additionally, the output interface 1306 has more than one output interface that uses the same or different interface technology.

In one or more embodiments, a computing system (e.g., the system 1300 and/or computing device 1302) implements a method as described herein (e.g., a method shown in FIG.

Figure 14:
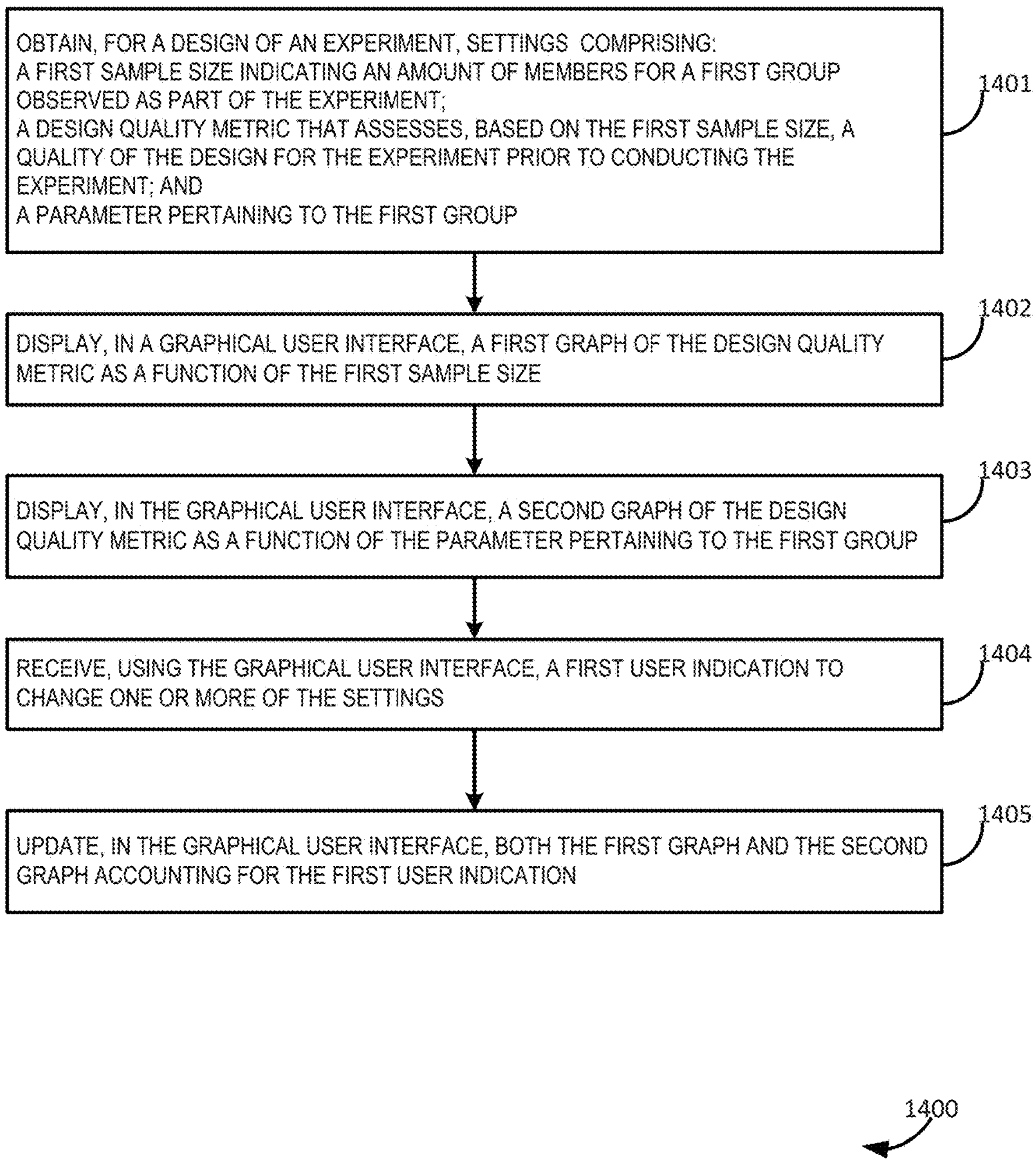
FIG. 14 illustrates a flow diagram for updating a graphical user interface according to at least one embodiment of the present technology.

14). FIG. 14 illustrates a flow diagram for updating a graphical user interface according to a method 1400. The method 1400 comprises an operation 1401 of obtaining, for a design of an experiment, settings. The settings comprise a first sample size indicating an amount of members for a first group observed as part of the experiment. For example, if the experiment is testing properties of a semiconductor, the sample size may be the amount of semiconductors tested in the experiment. The settings comprise a design quality metric that assesses, based on the first sample size, a quality of the design for the experiment prior to conducting the experiment. By providing a design quality metric, the user can explore different settings (e.g., increase or decrease the sample size) to best design the experiment before going through the expense and labor of conducting the experiment (e.g., destroying the semiconductors). The settings comprise a parameter pertaining to the first group. This parameter can be considered an additional parameter in that it is a parameter that is additional to the first sample size or design quality metric. It can weigh on the design quality metric or sample size. For instance, the parameter may indicate variability in the experimental material such as a noise parameter for the experiment. As another example, the parameter may relate to the testing method such as the difference to detect or assumed proportion for null or alternative hypothesis in hypothesis testing.

By observing different inputs or scenarios affecting the design, the experimenter can use embodiments to optimize a design (e.g., by observing graphical representations of the design inputs). For instance, the method 1400 comprises an operation 1402 of displaying, in a graphical user interface, a first graph of the design quality metric as a function of the first sample size. The method 1400 comprises an operation 1403 of displaying, in the graphical user interface, a second graph of the design quality metric as a function of the parameter pertaining to the first group. The method 1400 comprises an operation 1404 of receiving, using the graphical user interface, a first user indication to change one or more of the settings. The method 1400 comprises an operation 1405 of updating, in the graphical user interface, both the first graph and the second graph accounting for the first user indication. For example, the update can be one or more computer-generated manipulation of a graph in response to a user manipulation of another graph in the graphical user interface to explore different design scenarios. One of ordinary skill in the art will appreciate that the operations described herein with respect to a first group can be expanded to support multiple groups and multiple parameters.

Figure 15:
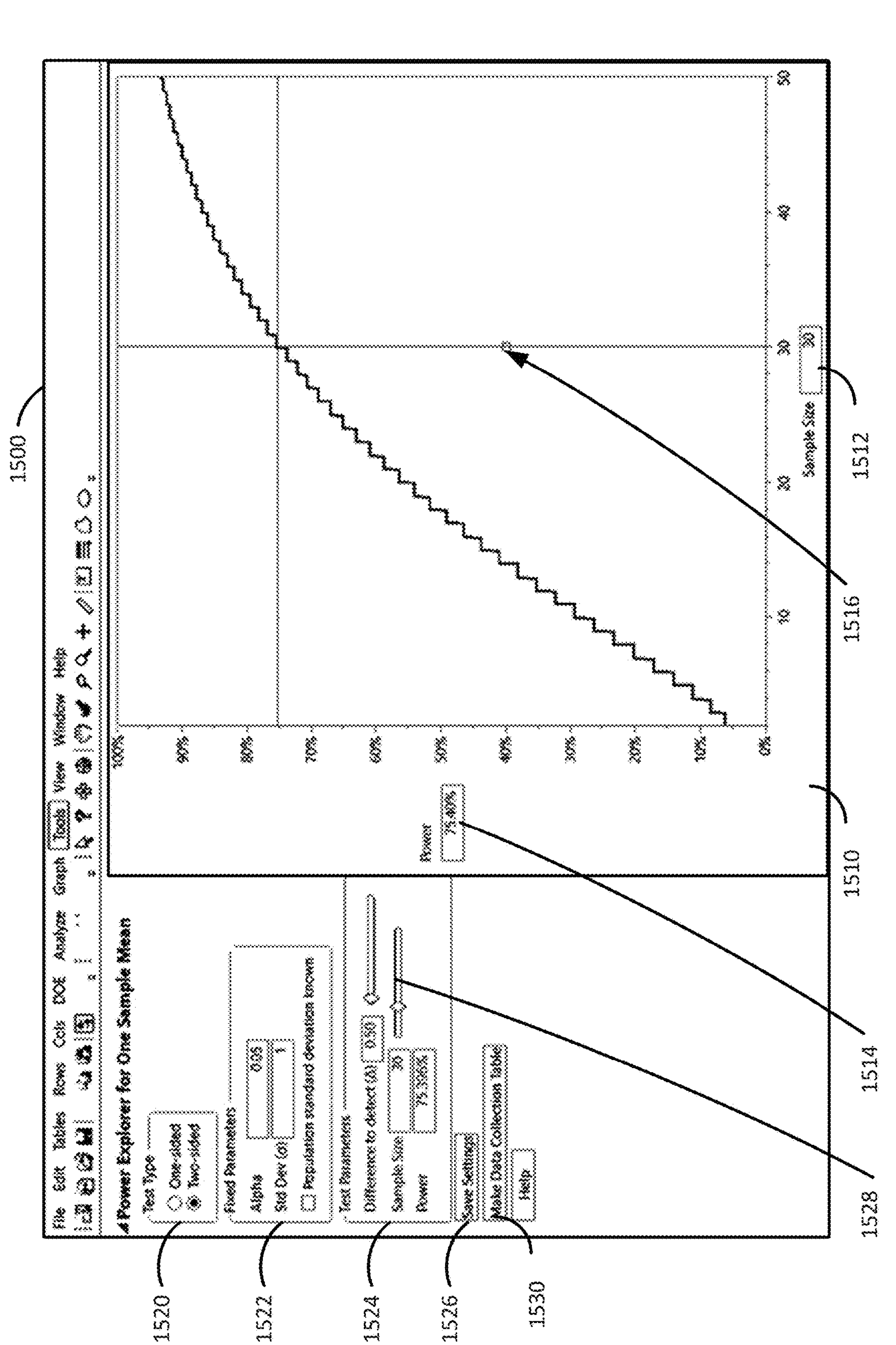
FIG. 15 illustrates an example interactive graphical user interface for exploring power for an experiment design according to at least one embodiment of the present technology.

FIG. 15 illustrates an example interactive graphical user interface 1500 for exploring a design quality metric of power for an experiment design. An interactive power versus sample size plot is provided in graph 1510 to help inform users of potential tradeoffs between power and sample size. The curve in the graph 1510 is shown with steps because sample size has discrete values. A user can edit the sample size, using textbox 1512, or the power, using textbox 1514, to see how it will affect the plot. The user can edit values which may impact the power curve. For instance, the user can adjust the test type using controls 1520, adjust fixed parameters 1522, and adjust test parameters 1524. For some key metrics users can use sliders (e.g., slide 1528) to more easily and gradually explore how one metric impacts the power curve. Users can also directly interact with the power curve via a “handle” 1516 (white square on graph 1510), which allows users to slide or step up and down the curve to assess sensitivity. In one or more embodiments described herein, rather than edit a textbox, the user can directly manipulate a graph (e.g., moving a handle or moving a slider). One of ordinary skill in the art will appreciate that these techniques can be used interchangeably in embodiments described herein to explore different scenarios according to different settings.

Using the Save Settings button 1526 preserves the values in the current display of the graphical user interface 1500. For instance, the user can change the design quality metric, and the computing system can update one or more of a first sample size or parameter (e.g., noise or difference to detect). The user can go back to the previous design quality metric if the updates are not desired. Difference to detect is a parameter that indicates the minimum amount to detect a difference between a hypothesized value and the actual value. For instance, if the test is to detect heights in a population, and the hypothesized value is 6 feet or greater, the difference to detect may be 3 inches, meaning in assessing the quality of the experiment the computing system does not fault rejection within 3 inches of 6 feet because the experiment test is considering that not scientifically significant. However, if the computing system observes a rejection (or failure to reject) of five feet 9 inches, that would be scientifically significant to assessing the design quality.

Other features of the graphical user interface 1500 include the ability to create a Data Collection table using button 1530. For example, the computing system can produce a data table in response with the number of rows equal to the sample size currently displayed and an empty response column ready to be filled with data from conducting an experiment according to the design.

Figure 16A:
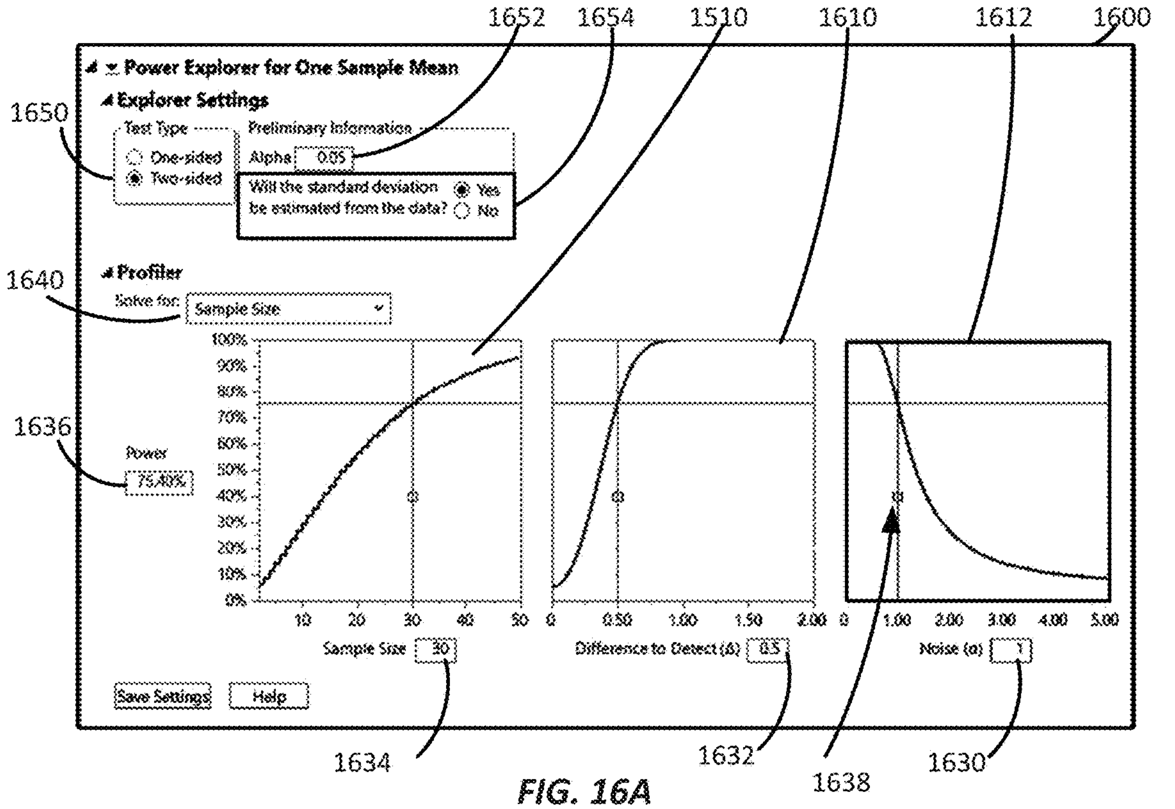
FIGS. 16A-16B illustrate an example interactive graphical user interface for exploring power, difference to detect, and noise for an experiment design according to at least one embodiment of the present technology.
Figure 16B:
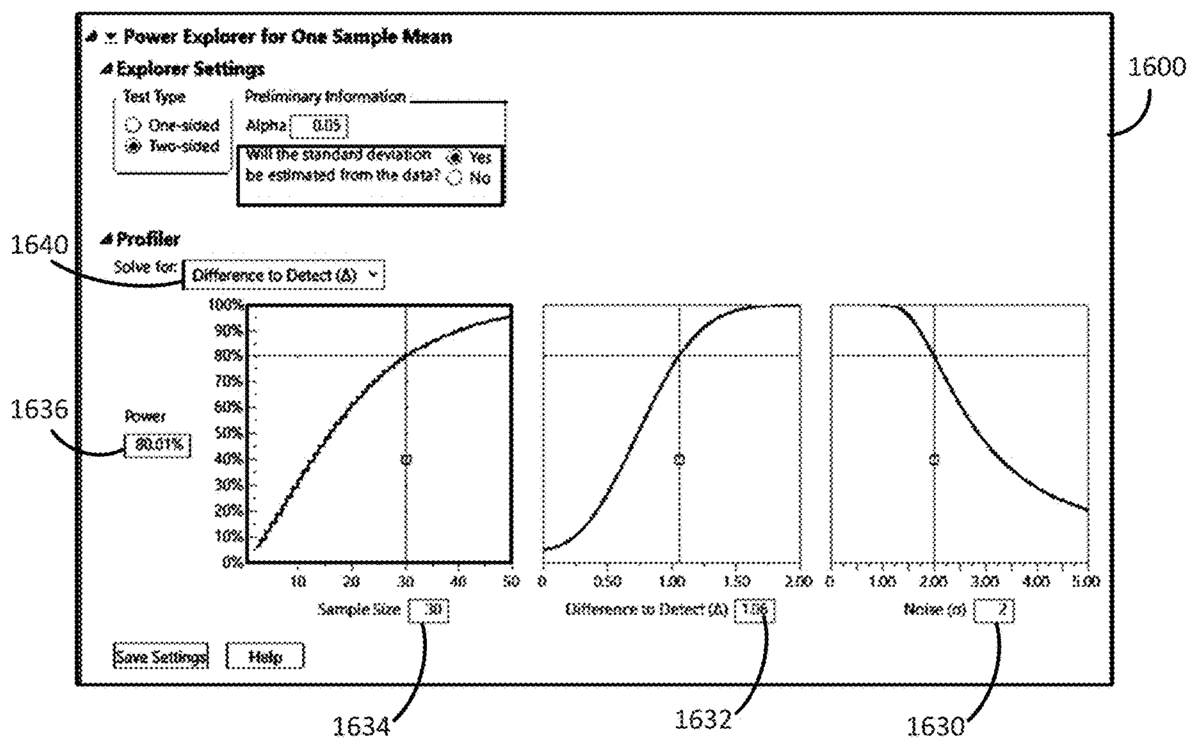

FIGS. 16A-16B illustrate an example interactive graphical user interface 1600 for exploring multiple settings graphically (e.g., power, difference to detect, and noise for an experiment design). Graphical user interface 1600 can be considered an enhancement of the graphical user interface 1500 in FIG. 15. For instance, graphical user interface 1500 shows graph 1510 displaying power versus sample size and this graph 1510 is also shown in graphical user interface 1600. However, one or more test parameters 1524 are given their own interactive graph in the graphical user interface 1600 (e.g., proximate to one another). For instance, graph 1610 shows a plot of power versus difference to detect. Additional parameters can also be displayed. For instance, graph 1612 shows a plot of noise versus power. Key metrics, such as anticipated noise in the sample (usually measured through standard deviation) and the difference one deems scientifically significant to detect may not be fully known at the time of planning, and so it may be useful to allow users the ability to “explore” these options through a more interactive interface as shown in FIG. 16A.

Users can use handles (e.g., handle 1638) and/or textbox (e.g., textbox 1634) in each graph to explore sensitivity to that particular parameter. Further, users can request computer-generated settings. For instance, a user can use the control 1640 (i.e., the drop down Solve For menu) to select which parameter they would like to solve for after inputting a particular value for other settings, keeping all other parameters at their current settings. For example, FIG. 16B shows graphical user interface 1600 after the user has selected to solve for a difference to detect in control 1640. The computing system receives a setting request for a computer-generated setting for the design of the experiment based on the user selection. The setting request can indicate a first setting (e.g., the user has changed the noise from “1” to “2” in textbox 1630). The user has given other settings such as a sample size of 30 in textbox 1634. The computing system may receive the other settings by receiving a user-defined setting or a pre-configured setting. For instance, the sample size of 30 may be a default value that the user accepts by issuing the setting request, or could be typed in by the user.

In the example shown in FIGS. 16A-16B, the user has also changed the power to a setting of "80%" in textbox 1636. However, in solving for these values the computing system had to generate a setting value close to the 80% to find a solution, which is why the textbox 1636 now shows a value of "80.01%". In response to these settings and the setting request the computing system can provide a computer-generated setting. For instance, solving for difference to detect to give 80% or greater power yields a value of 1.06 in textbox 1632. Defined parameters such as a noise value or a standard deviation can be used for computing the design quality metric.

In one or more embodiments, settings can be changed as needed by the user to explore settings (e.g. user-defined selections for settings) and the graphical user interface 1600 will update in response. As an example, the user can request a computing system further update a graph in view of a parameter (e.g., using the control 1640 to select difference to detect in FIG. 16B). Then the computing system can receive a second user indication to change another setting such as sample size, and a third setting (e.g., a design quality metric like power) could be updated different than the original 80% defined by the user (which resulted in 80.01%) in view of the change to sample size.

In some situations, the computing system can be set up (e.g., using advanced user preference options) or pre-configured to find a setting as close to requested settings by finding a solution that achieves a provided value or a value greater than the provided value (e.g., it may be advantageous to have greater power). For instance, the computing system found a value of 80.01% for power in FIG. 16B. Additionally, or alternatively, the computing system can be configured to find a setting as close to requested settings by finding a solution that achieves a provided value or a value less than the provided value (e.g., this may be advantageous for sample size where there is a greater cost to additional sample size members). Additionally, or alternatively, the computing system can be configured to find a setting within a range. For instance, with interval calculations as a design quality metric, it may be better to have a tighter interval range than a larger one (e.g., a narrower interval than a wider interval). Additionally, or alternatively, limits may be set to how low or how high a value can go. For instance, sample size may have a limit of at least 2 members and a maximum of 200,000. As another example, the computing system can be dynamically set to lock a particular setting in finding other settings. If the computing system cannot exactly generate a value keeping other requested settings constant, the computing system will not change a locked setting and will change a different setting to approximate the requested settings. For instance, each of the settings or graphs can be interactive so the user can select a power control to lock the power control at exactly 80% to ensure that a third setting like noise is augmented to find a solution to the difference to detect rather than changing the power setting.

In one or more embodiments, a user can have control over other settings. For example, in graphical user interface 1600 the user can set a test type setting 1650 indicating whether the test type is one-sided or two-sided. A one-sided test looks in only one direction of a hypothesized result. For example, if an experiment related to heights in a population, and the hypothesis is a mean of 6 feet, a one-sided test would look at heights greater than 6 feet (or less than 6 feet), and a two-sided test would look at heights on both sides. Additionally, or alternatively, the user can set an error estimation setting (e.g., an alpha error setting 1652, which is a probability ranging from 0 to 1 indicating the acceptable probability of rejecting a null hypothesis when it is true or type 1 error). Additionally, or alternatively, the user can set a standard deviation estimation setting 1654 (e.g., indicating whether the standard deviation should be estimated from the data). These options give the user greater control over the design of the experiment.

Figure 17A:
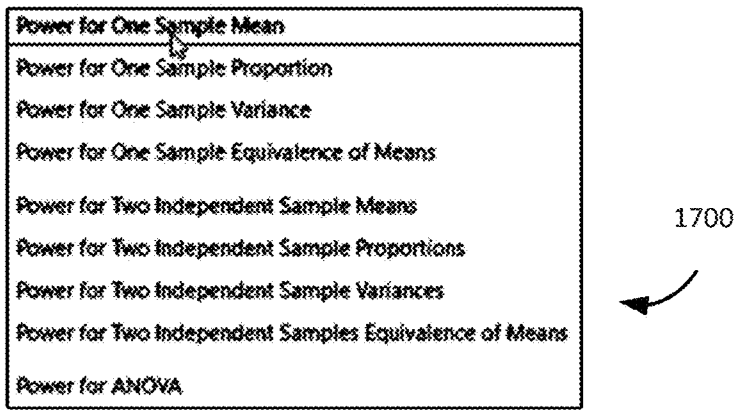
FIGS. 17A-17E illustrate example interactive graphical user interfaces for exploring power and proportions for a two-sided test type according to at least one embodiment of the present technology.

FIGS. 17A-17E illustrate example interactive graphical user interfaces for exploring power and proportions for a two-sided test type. FIG. 17A shows different power analysis options 1700 for user selection. For instance, a power for one sample mean is selected such that the computing system will determine a design quality metric that is the power for a specified difference from a single mean. For instance, an experiment could relate to testing heights in a population. The null hypothesis could indicate the population will be six feet or greater and the alternative hypothesis is that the population will be less than six feet. More complicated experiments may use different power analysis options. For instance, an experiment could be clinicians testing a drug to see how it would affect blood pressure. The null hypothesis could indicate there is no significant difference in different cities conducting the experiment, and the alternative hypothesis is there is a significant difference between cities. In this experiment it may be better to use the two sample means option or the ANOVA option. In one or more embodiments, generating a graph comprises simulating an experiment (e.g., so the computing system can receive a hypothesis outcome for the experiment without having to conduct the clinical trial first).

Figure 17B:
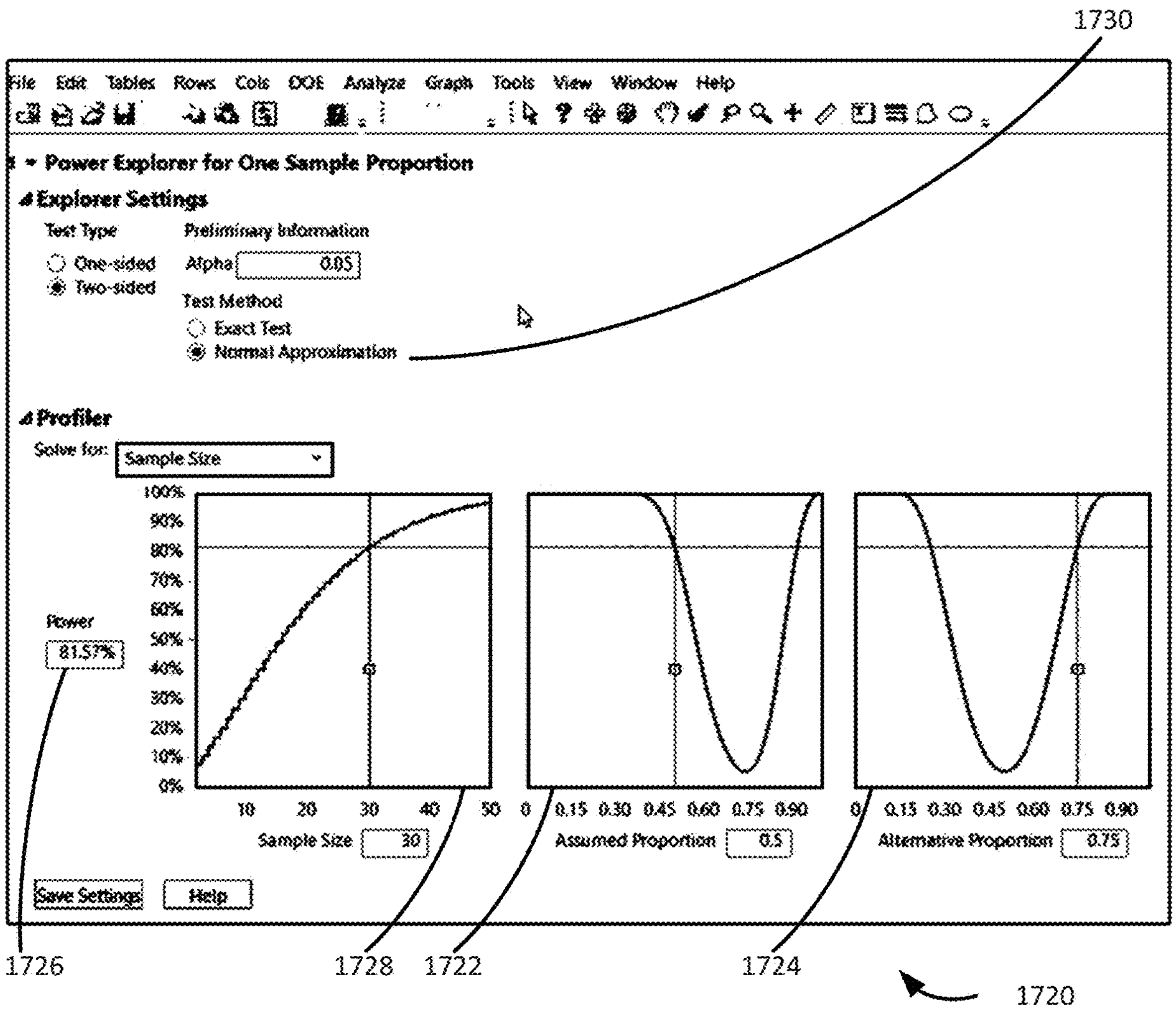

FIG. 17B illustrates a graphical user interface 1720 for a power analysis. The design quality metric in textbox 1726 indicates a power probability related to the hypothesis outcome. The graphical user interface has interactive graph 1722 and interactive graph 1724 showing parameters related to proportions for the hypothesis outcome. For instance, graph 1722 shows a hypothesized proportion of outcomes for the experiment that meet the hypothesis outcome (i.e., an assumed proportion). Graph 1724 shows an alternative proportion of outcomes for the experiment that do not meet the hypothesis outcome.

Embodiments herein can be considered a profiler approach. Profilers are tools that can be used to create a specialized set of plots in which changing one plot changes the other plots. In the case of design quality metrics, there can be multiple inputs affecting the design quality metric. Using a profiler approach to design quality metrics (e.g., power and interval calculations) better reflects the nature of the problem where there are multiple inputs. Where there are multiple inputs, it may be more useful to view the problem through the impact and interplay of these multiple inputs rather than focusing on only one or two (e.g., by having interactive graphs for multiple inputs for the design quality metric). For instance, using only the graph 1728 it is possible to see reduction in power with an increase in sample size. Using additional graphs (e.g., graph 1722 and graph 1724), that insight is extended further, showing that there is also discretization in the effect of the assumed proportion (p0) on power. Here, a small change in p0 does not affect the resulting power, while that same change in pA (the alternative proportion) could potentially result in a 5% drop in power. Depending on the goals of the experiment, this difference could be substantial.

Figure 17C:
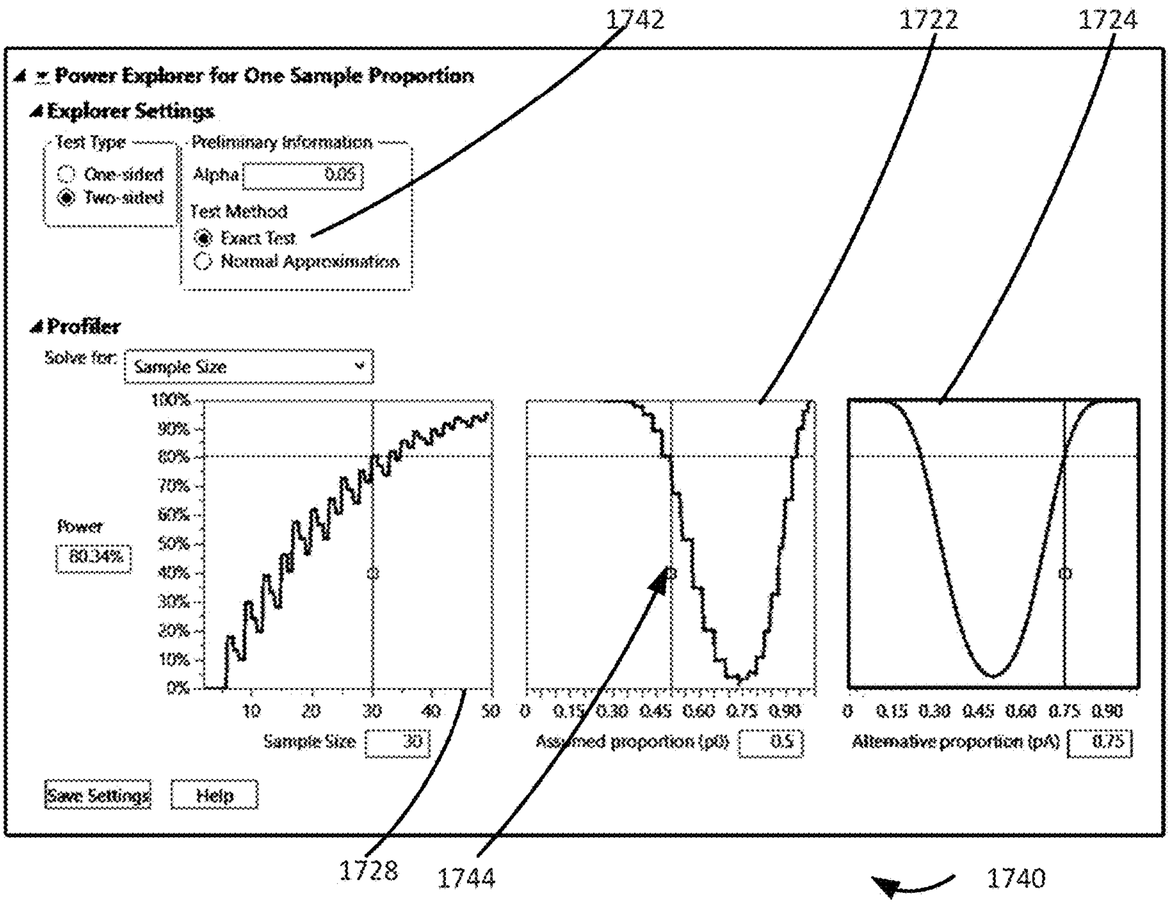

In FIG. 17B, the test method of normal approximation 1730 is selected. A normal approximation will result in smoother curves (e.g., as shown in graph 1728) than the exact test method. The user can adjust these settings for testing to see how this would affect the graphs. For instance, FIG. 17C shows a graphical user interface 1740 with the exact test method 1742 selected. As shown, the graph 1728 has updated showing more definition in the behavior of sample size versus power. Using this perspective, a user can see that increasing sample size, in some cases, may decrease power even though in general increasing sample size is generally associated with an increase in power. This can help a user make precise decisions around sample size.

Figure 17D:
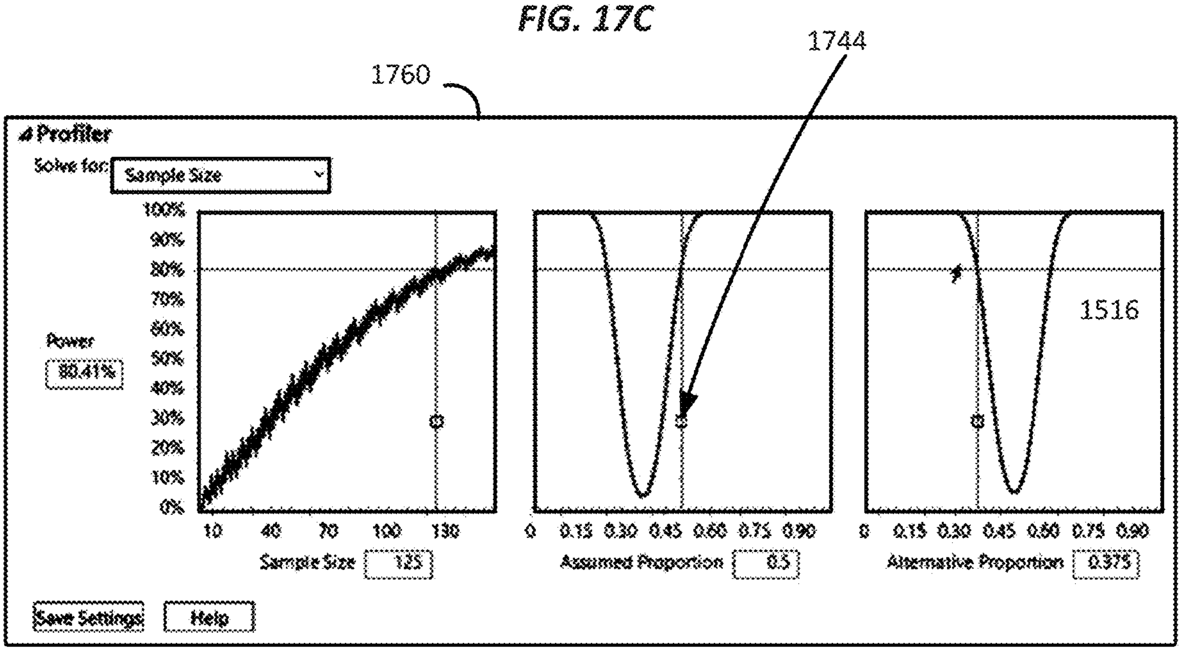
Figure 17E:
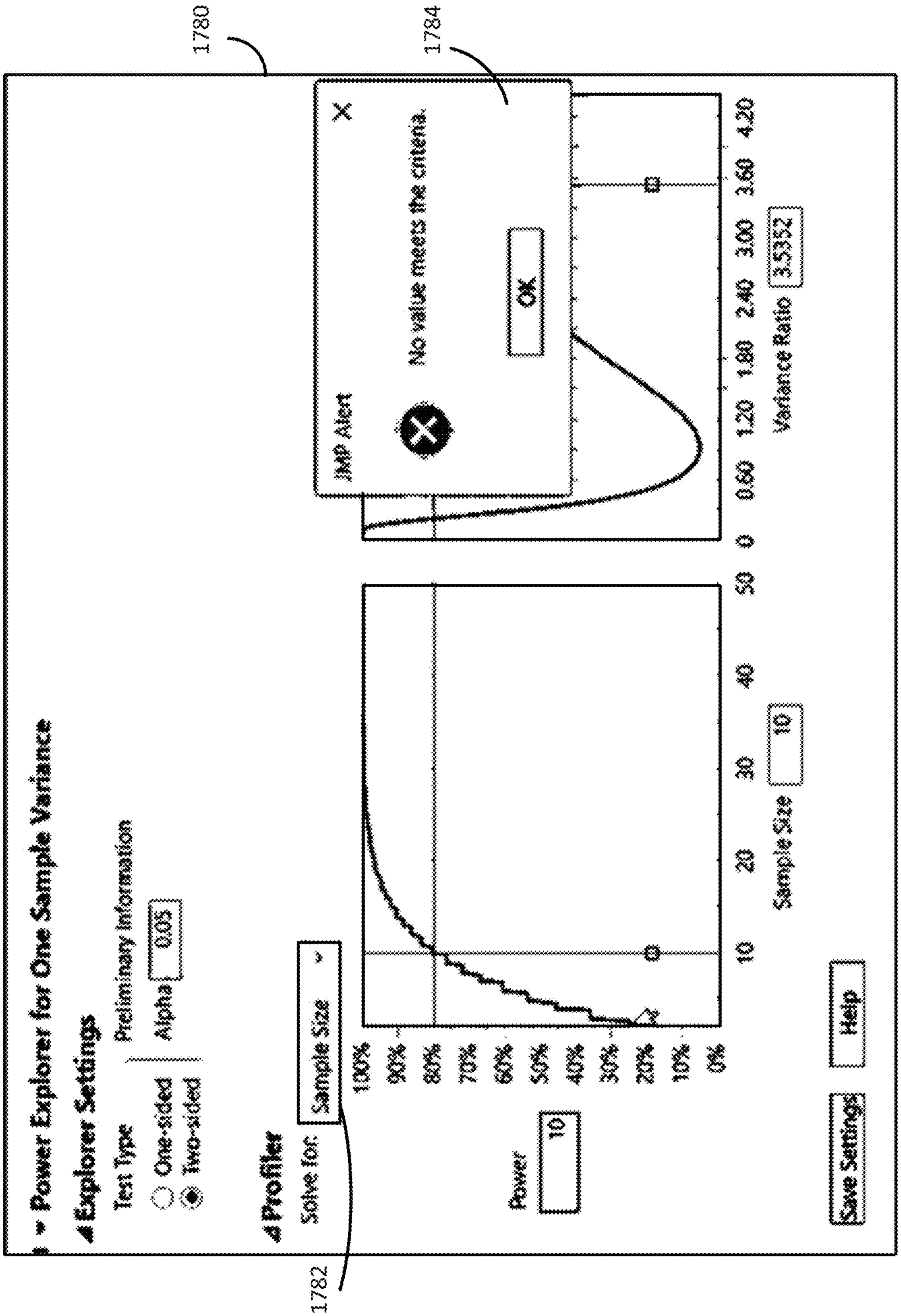

As shown by the graphs in graphical user interface 1740, represented behavior curves can represent valleys (e.g., the valleys shown in the curve of graphs 1722 and graph 1724) or hills. One or more embodiments can still solve for values amongst these behaviors. For instance, in FIG. 17C, the user has indicated for the computing system to solve for sample size with an 80% power and assumed proportion of 0.5. If the user wants the computing system to solve for sample size but have the assumed proportion value be on the other side of the curve in graph 1722, the user can move the handle 1744 to the right size of the curve in graph 1722 and send a setting request for sample size again. Using the handle 1744 to drag and drop can be useful because the user does not even need to get the assumed proportion very close to the 80% just on the other side. FIG. 17D shows an updated sample size calculation (moved up from 30 to 125 members) for 80% power with the handle now on the right side in graph 1722.

In one or more embodiments, the computing system can indicate issues with providing a computer-generated setting. For instance, in the example in FIG. 17E, the computing system has received a user indication to change one or more of the settings by receiving a setting request for a computer-generated setting for the design of the experiment to satisfy a user-defined goal for another setting for the design of the experiment. In this case the user has asked for a computer-generated sample size using the solve-for control 1782. The user has set power to be 10 and a variance ratio to be 3.5352 by either accepting pre-configured or previously solved for settings or by defining the settings in the graphical user interface 1780.

The computing system determines that satisfying the setting request would violate a configured allowable option for a setting of the settings or a configured processing constraint for generating the computer-generated setting. In this example, the sample size for that power would need to be below 10 which may be a pre-defined limit. The computing system can generate an error message (e.g., error message 1784) in response to the setting request indicating that the computing system will not generate the computer-generated setting. As another example, complying with the request may require a processing burden and the computing system may indicate this concern to the user. Accordingly, one or more embodiments provide computer assistance in exploring options for a design of an experiment.

Figure 18:
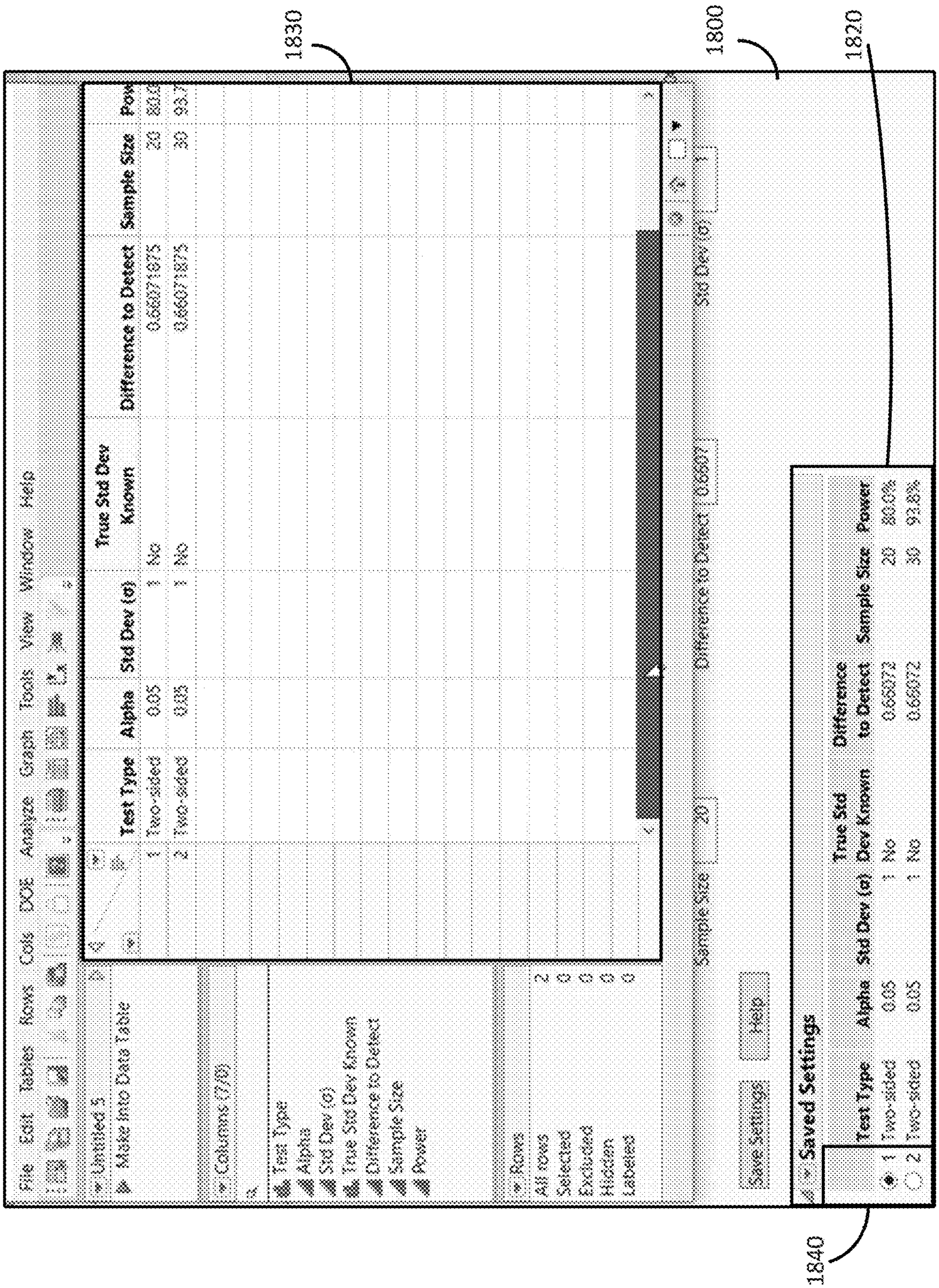
FIG. 18 illustrates an example of saving information pertaining to an experiment design according to at least one embodiment of the present technology.

FIG. 18 illustrates an example of saving information pertaining to an experiment design (e.g., different setting scenarios the user is considering for a design). In one or more embodiments, the computing device saves settings described herein as saved settings, updates one or more graphs and saves updated settings used to produce the updated graphs. The computing system can generate and display a table in the graphical user interface for comparing differences between the saved settings and the updated settings. For instance, graphical user interface 1800 shows a table 1820 of saved settings for user selection or export to another electronic format (e.g., worksheet 1830). The user can select between saved settings to reload them in the graphical representations. For instance, as shown toggle controls 1840 in table 1820 can be used to send a user indication to change the updated settings (in row 2) to the saved settings (in row 1). The user may also wish to compare design quality metrics.

Figure 19:
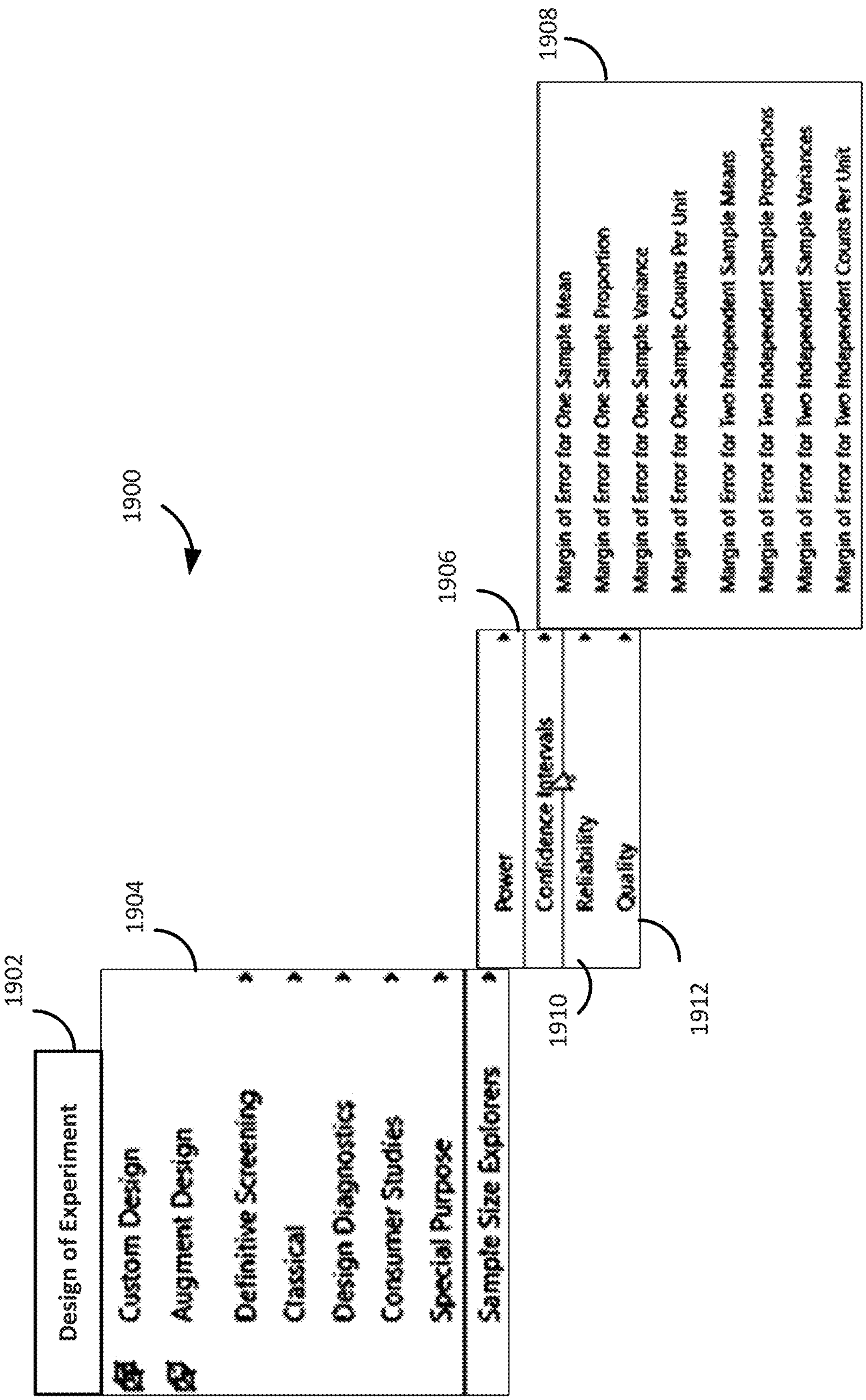
FIG. 19 illustrates example design quality metrics for an experiment design according to at least one embodiment of the present technology.

In one or more embodiments, an experiment may need multiple testing groups (e.g., controlling for blocking factors related to different sites or days for testing). FIG. 19 illustrates example design quality metrics for an experiment design. The user can select a design quality metric using design of experiment controls 1902. For instance, the user can select different power design quality metric 1906 as shown in embodiments herein. Additionally, or alternatively, the user can select from different confidence interval options 1908, reliability options 1910, or quality options 1912. For example, confidence intervals can indicate a margin or interval of error in experiment outcome, or an uncertainty in experiment outcome.

Figure 20A:
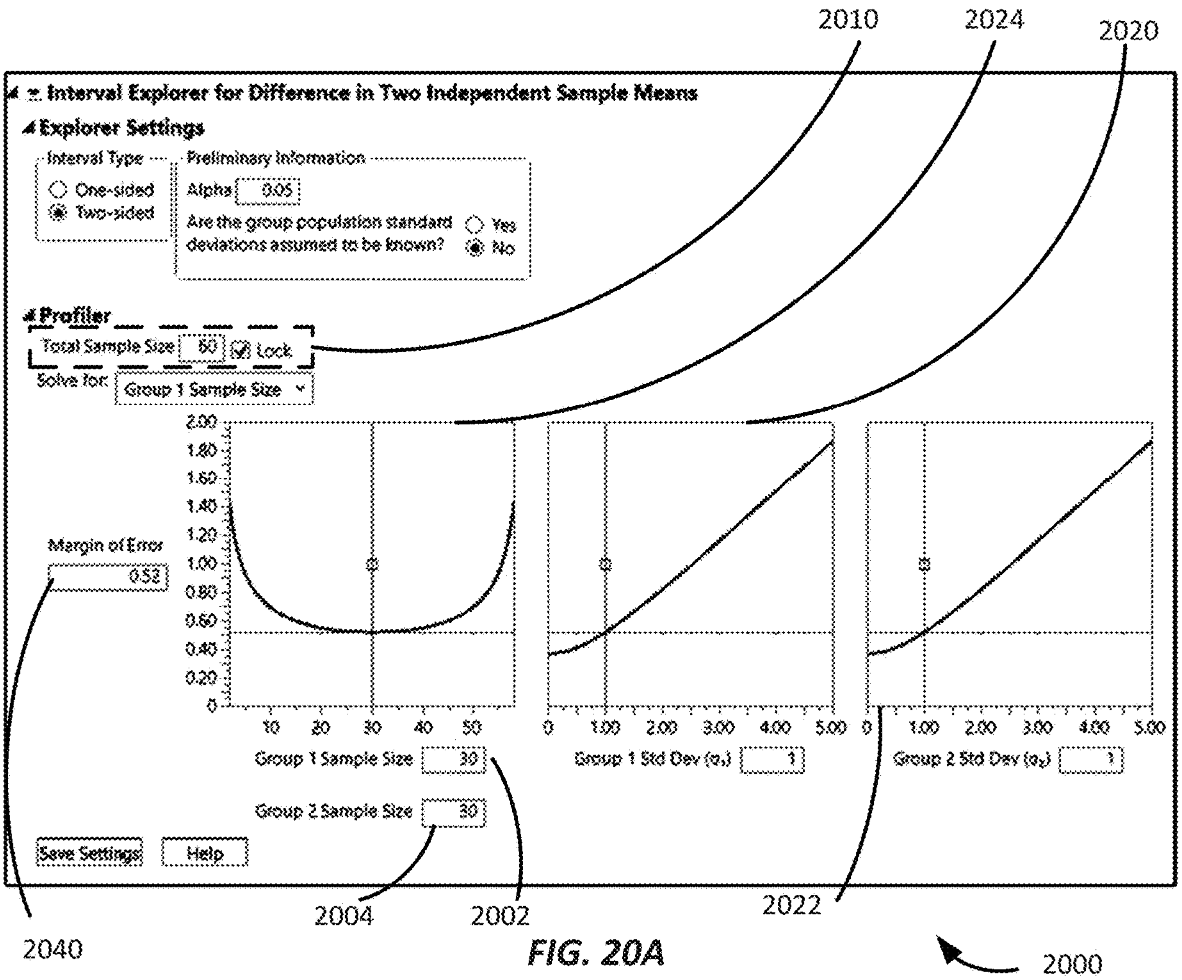
FIGS. 20A-20B illustrate an example interactive graphical user interface for exploring margin of error for an experiment design involving two groups according to at least one embodiment of the present technology.
Figure 20B:
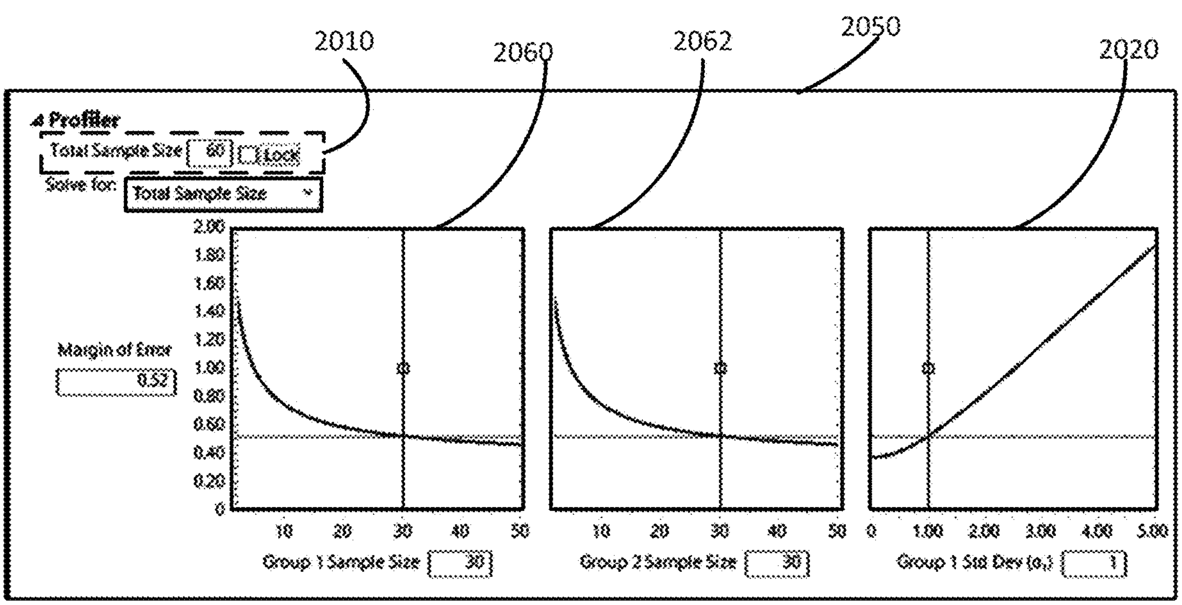

FIGS. 20A-20B illustrate an example interactive graphical user interface 2000 for exploring margin of error for an experiment design involving two groups. In FIG. 20A, the computing system receives a setting indicating a first sample size of an amount of members of a first group as shown in textbox 2002 and an additional setting showing a second sample size indicating an amount of members for a second group of an experiment as shown in textbox 2004. In some designs, the total sample size may be capped (e.g., a total number of participants in an experiment) so that if one group is to have more members, the other group must have fewer. The graphical user interface has a lock control 2006 so the computing system can receive a lock indication 2010 indicating to lock a total sample size for the experiment. This lock indication 2010 indicates the total sample size and a check box to indicate to lock at that sample size. The total sample size includes the first sample size and the second sample size so that by changing one it will change another sample size of the other group. For example, in FIG. 20A, the total sample size is locked at "60" and both sample sizes are the same at "30".

In one or more embodiments, the computing system displays graphs with parameters pertaining to one or more of the groups (e.g., graph 2020 pertains to group 1 standard deviation and graph 2022 pertains to group 2 standard deviation). One or more embodiments, also allow a user to see the effect of having different group sample sizes rather than visualizing power in terms of a total sample sizes. For instance, if the computing system receives, using the graphical user interface 2000, a first user indication to change the first sample size by adjusting the textbox 2002 (e.g., changing the textbox 2002 to have "40" members), then the computing system would adjust the textbox 2004 of the second group (e.g., to have "20" members to keep the sample size the same according to the lock indication). In response the computing system can update a graph pertaining to the second group in the graphical user interface (e.g., changing the sample size of the second group depicted in graph 2024 or changing the group 2 standard deviation in graph 2022). By visualizing the different sample graph updates on a single graph, the graphical user interface can represent the constraint of the total sample size on the different group samples. Users can visibly see the tradeoffs in a design quality metric (e.g., power or margin of error) with having unequal group sizes.

FIG. 20B shows a portion 2050 of the graphical user interface 2000 after the lock indication 2010 is unchecked so that the sample sizes are no longer locked. Graphs 2020 and graph 2022 are moved over in the graphical user interface 2000 to make room for graph 2060 showing the design quality metric (margin of error 2040) as a function of group 1 sample size and graph 2062 showing the design quality metric as a function of the second sample size. Graph 2020 shows design quality metric as a function of a parameter (standard deviation) pertaining to the first group. Graph 2022 would still be within the graphical user interface 2000 (although not shown within the portion 2050) indicating the design quality metric as a function of the parameter pertaining to the second group. Accordingly, there could be 4 or more graphs displayed within the graphical user interface 2000. The user or computing system can directly change the sample sizes of different groups without a limitation of keeping a same total sample size.

Figure 21:
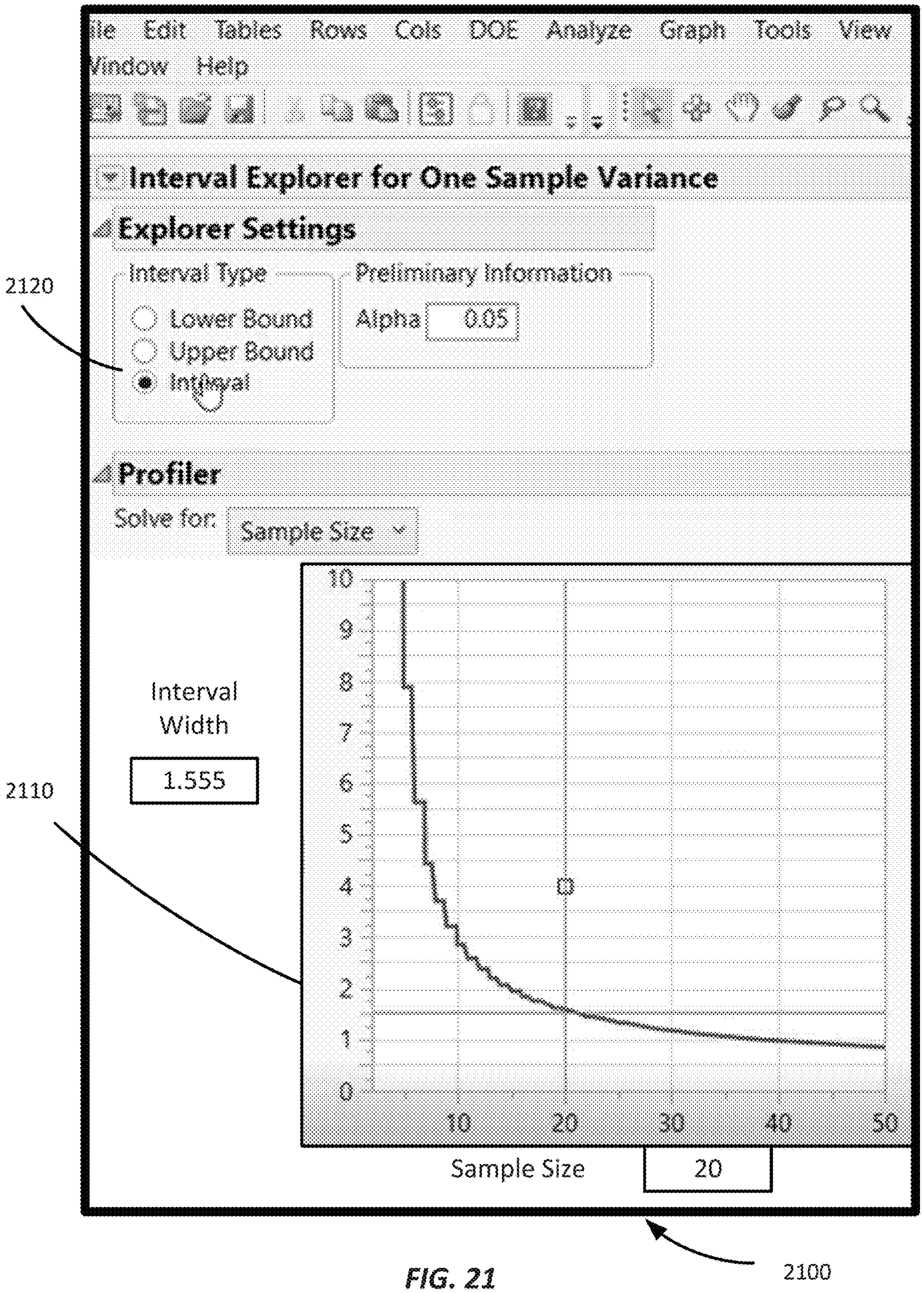
FIG. 21 illustrates an example interactive graphical user interface for exploring interval width according to at least one embodiment of the present technology.

Techniques described herein can apply to different design quality metrics. For example, FIG. 21 illustrates a portion 2100 of an example interactive graphical user interface for exploring interval width. The design quality metric in this case is interval width. Interval width is shown as a function of sample size in graph 2110. The user can adjust the interval type 2120 (e.g., showing the full interval as selected here or a lower bound or upper bound).

Figure 22:
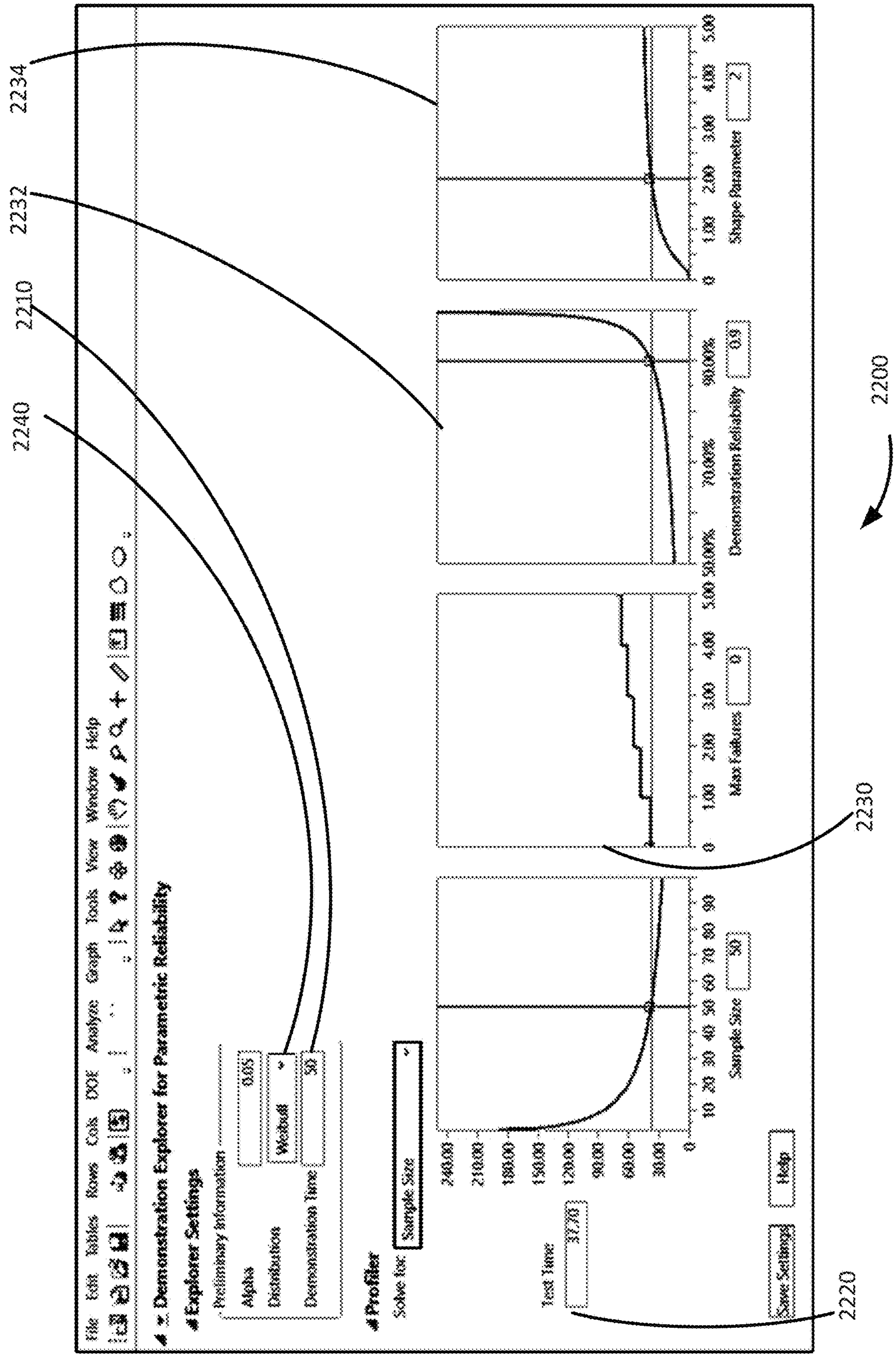
FIG. 22 illustrates an example interactive graphical user interface for exploring reliability for an experiment design according to at least one embodiment of the present technology.

As another example, FIG. 22 illustrates an example interactive graphical user interface 2200 for exploring reliability for an experiment design. In this example, the computing system receives a demonstration time period 2210 (e.g., time period over which to conduct a demonstration of the operation of one or more products). For instance, an experiment can relate to testing to ensure a likelihood that one or more products will meet a demonstration requirement within the demonstration time period 2210. For instance, if the experiment is to test capacitors in a demonstration to see if they can survive 100,000 cycles and if a sample size of 50 capacitors is shown in the demonstration to run for this many cycles with no failures in the demonstration, then it demonstrates a certain reliability. Products can be pre-tested to ensure that they will be able to meet the demonstration. For example, test time 2220 gives a time period for conducting the pretesting to ensure the products pass the demonstration within the demonstration time period 2210.

In this example, the test time 2220 is a design quality metric indicating a "test time" for the experiment to determine the reliability requirements will be met in a later demonstration. For instance, the test time 2220 can be a computer estimated time to test to ensure that during a later demonstration the products will meet requirements within the allowed time for the demonstration. The computing system can receive additional settings such as a distribution for samples of the groups for simulating the testing (e.g., a Weibull distribution 2240) for determining the test time 2220.

As shown in graphical user interface 2200, the computing system can receive one or more reliability requirements for conducting the experiment. For instance, the graphical user interface 2000 shows settings indicating maximum values during the testing time (e.g., maximum failures in graph 2230), demonstration reliability metrics (e.g., demonstration reliability in graph 2232), and a distribution parameter (e.g., shape parameter in graph 2234). In a lifetime distribution, there are generally two parameters that control the distribution: a scale parameter and a shape parameter. The scale parameter essentially controls a location of the distribution where the values generally concentrate. The shape parameter controls a shape of the distribution. Typically, the lower the value of the shape parameter, the more skewed it is, where higher values mean it is more symmetric. Similar to a standard deviation for a normal distribution, a shape parameter can relate to how noisy the lifetime distribution might be.

Visualization of the reliability can be particularly helpful in test planning because some inputs, such as the maximum number of failures, cannot necessarily be controlled during testing. However, knowing beforehand what changes might occur during testing can allow test planners to build in options for the experiment to account for unforeseen circumstances or account for situations real-time during testing. For example, if during testing a single failure is observed, the test planners can put in the option to increase the testing time for the remaining items on test to ensure demonstration requirements are met. Another key insight from this view is noticing that increases in the shape parameter value do not necessarily result in drastic changes in the test time (at the current settings of the other variables). This would give test planners confidence in their plan since the shape parameter may not be known precisely prior to planning.

Figure 23A:
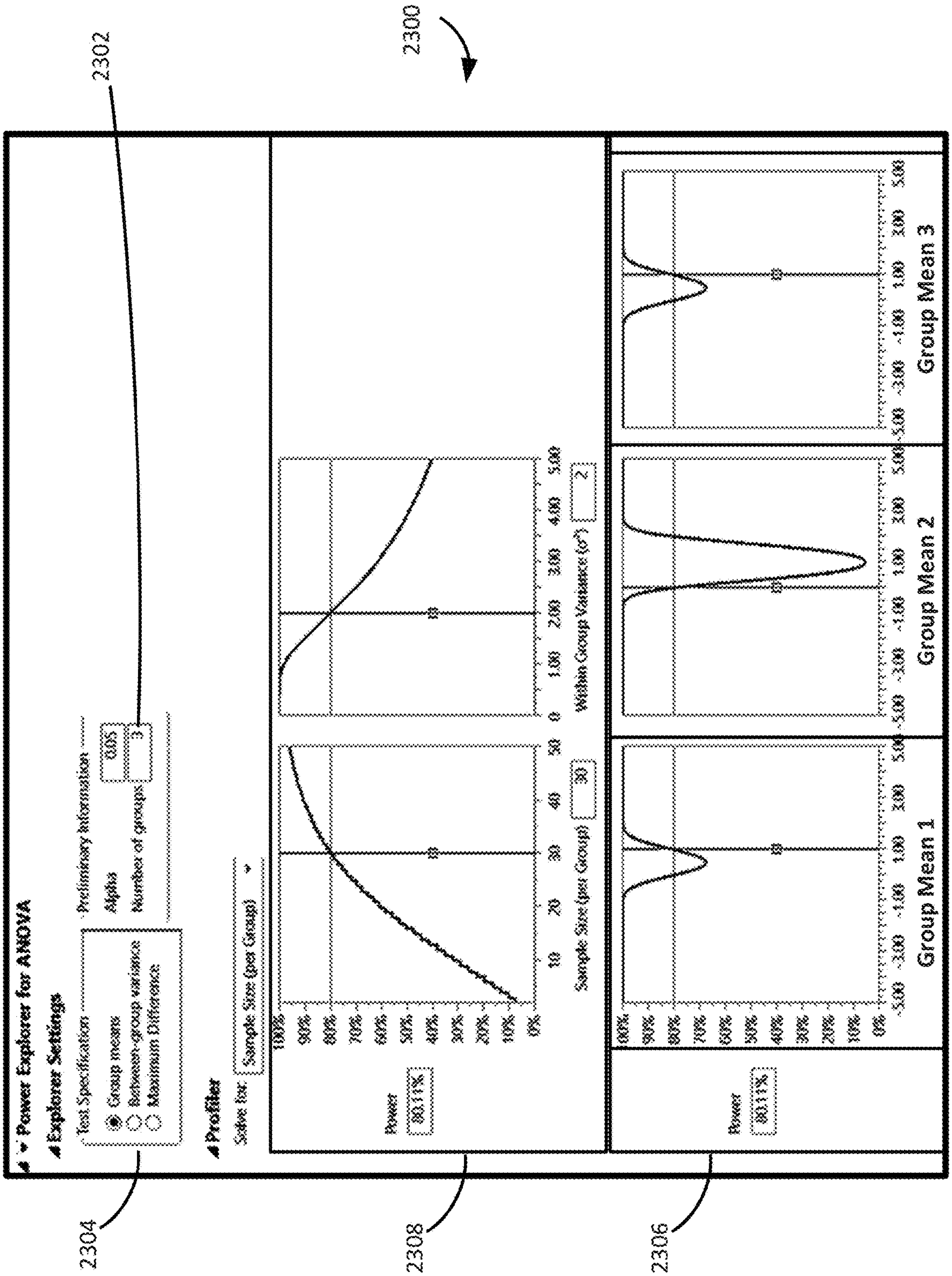
FIGS. 23A-23D illustrate example interactive graphical user interfaces for exploring design quality for multiple groups in an experiment according to at least one embodiment of the present technology.
Figure 23B:
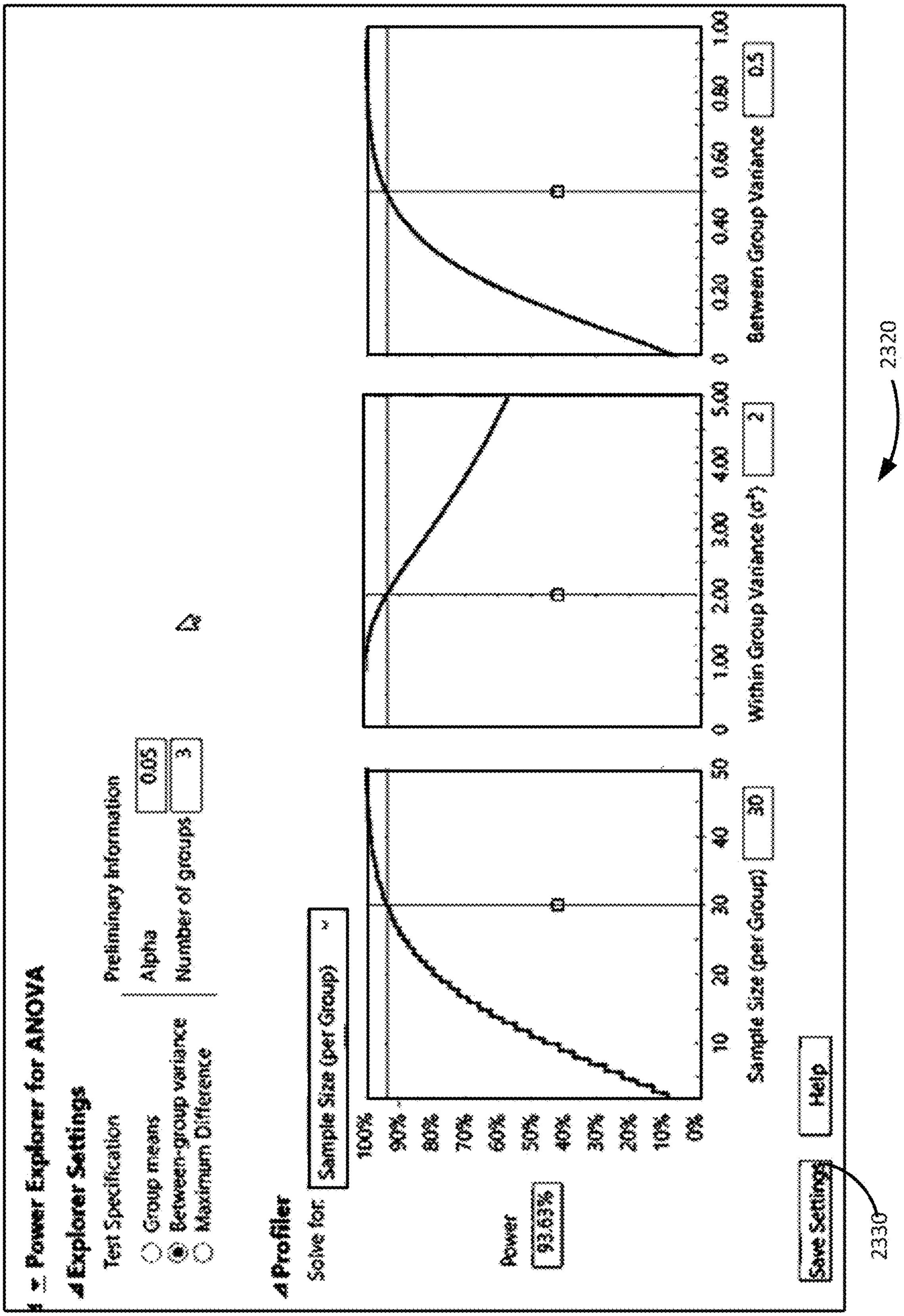

FIGS. 23A-23D illustrate another example interactive graphical user interfaces for exploring design quality for multiple groups in an experiment. In FIG. 23A, the graphical user interface 2300 has a group indication 2302 indicating a set of groups. In this example, the set of groups is indicated to have three groups, but in other examples it could have more or fewer groups. The user can also adjust settings indicating test specifications 2304 (e.g., ways to specify the differences between groups). For example, graphical user interface 2300 shows three ways in which to specify the differences between groups: either directly through specification of individual group means (e.g., a default option), through between-group variance, or through a maximum difference between group means. Depending on the test specification selected, the computing system can receive a user indication to adjust one or more of: a mean of a particular group; a between group variance; and a difference between means of the set of groups. The computing system can update graphs in a graphical user interface accounting for the test specifications 2304. For instance, the user has selected group means and the graph portion 2306 show group means pertaining to each of the groups.

In graphical user interface 2300, the profiler is split into two rows. The first row in a graph portion 2308 allows users to see and interact with the relationship between power, group sample size (assumed equal for all groups), and within group variance. The second row in graph portion 2306 shows the relationship between power and each group mean.

Figure 23C:
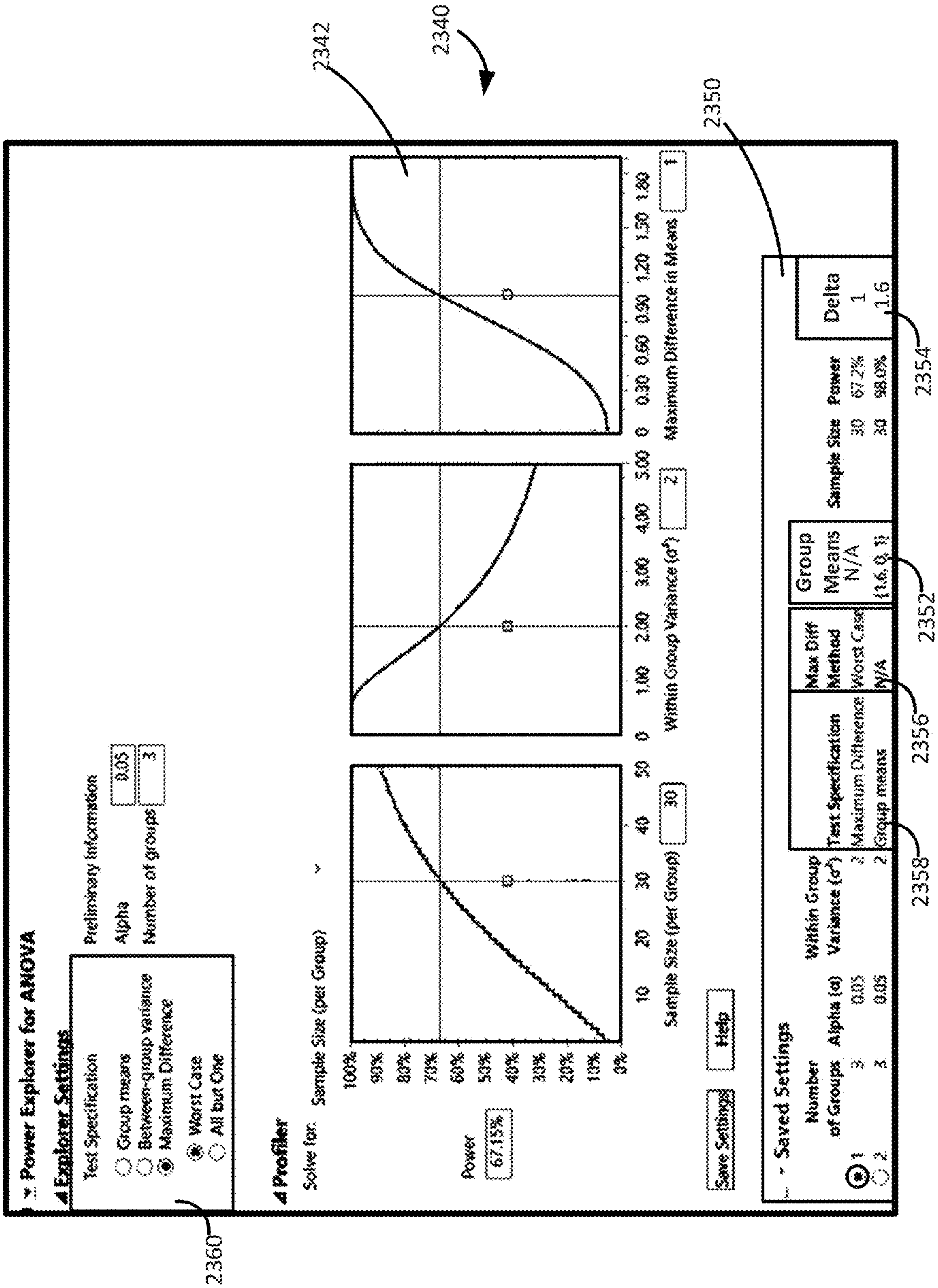

As with examples before, setting controls 2330 can be used to save settings to compare test options (e.g., to revert back to saved settings). For instance, as shown in FIG. 23C, the user can use the table 2350 to toggle back to a maximum difference worst case option. The worst case is shown in a graphical user interface 2340 in FIG. 23C indicating there is a group that can have a high mean, a group that can have a low mean, and all others at the level of the grand mean (i.e., are the same in a middle mean between the high mean and the low mean). In this case since there are only 3 groups, there could be a single low, middle, and high mean.

The table 2350 may indicate a set of group means or information about the group means. For instance, in this first selected example the delta column 2354 shows a value of 1 because there is a difference of 1 in the means as shown in graph 2342. In the unselected example, the group means column 2352 shows a set of means {1.6, 0, 1} with a "1" shown in delta column 2354 representing the difference between the low mean of 0 and the high mean of 1.6.

Figure 23D:
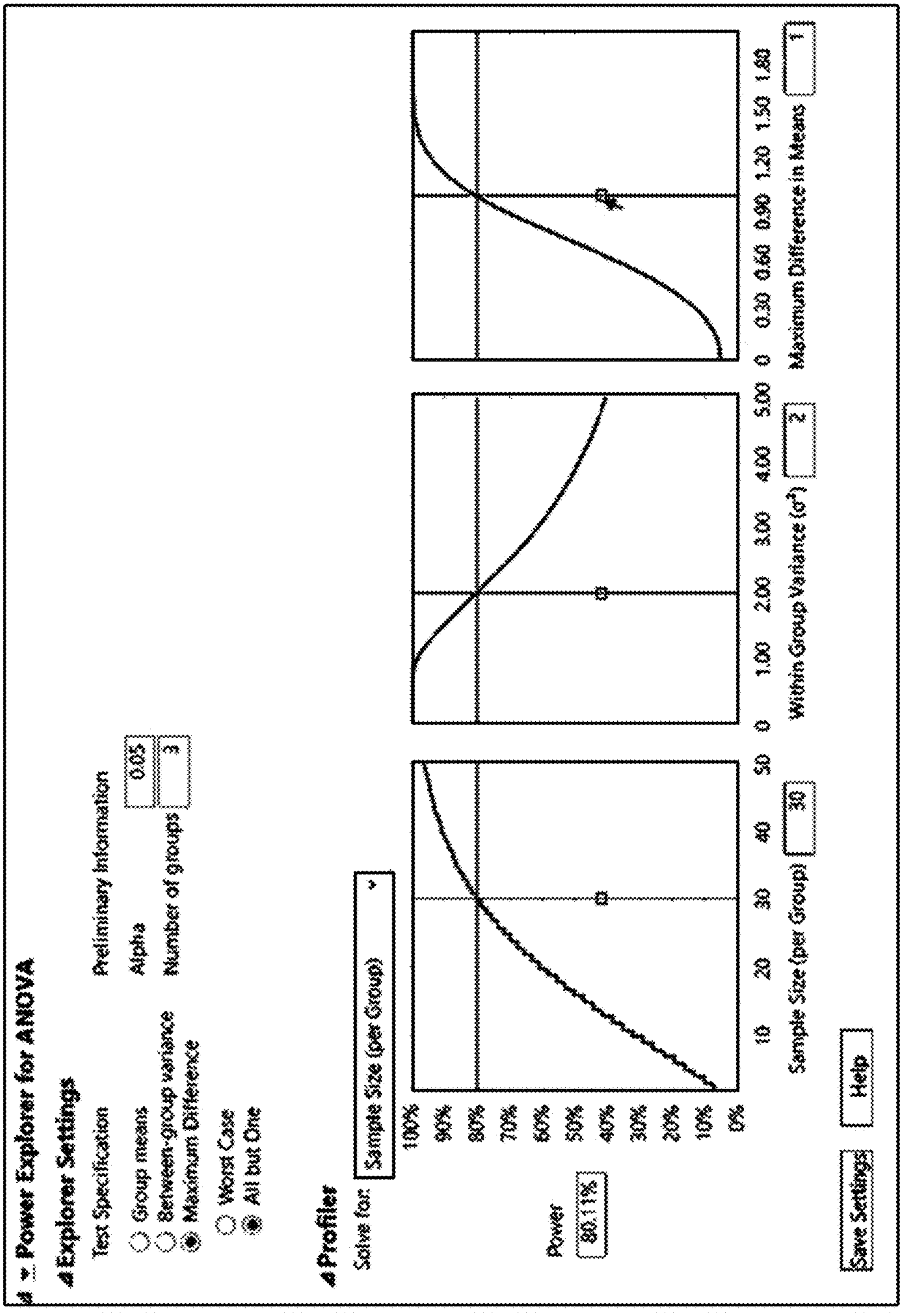

As shown in the table 2350 in FIG. 23C, depending on the test specification selected, additional options may be provided to a user. For instance, in the max difference method column 2356 "N/A" is shown for some selected test specifications that would not apply according to the test specified in test specification column 2358. For instance, maximum difference has two further options shown: "worst case" and "all but one" in the graphical user interface in area 2360. In FIG. 23D "all but one" is selected in graphical user interface 2370 indicating all but one mean is at the same level.

In some industries, particularly the defense industry, there exist specifications for experiment sizes which involve the use of a power threshold, such as 80%. For instance, tests must show that the experiment will meet this threshold before it can be approved for implementation. Typically, these thresholds are determined based on a maximum difference criterion, such as worst-case or all-but-one as described above. However using other options like the group means option, users can explore different settings which may yield more power for their circumstance or perhaps be less conservative than the maximum difference approach. Accordingly one or more embodiments help users design experiments by adjusting settings within a graphical user interface to see how this affects a design quality metric.

The previously described embodiments provide an interactive graphical user interface for a computer profiler tool configured to determine a design quality metric (e.g. power, margin, reliability, etc.) based on one or more settings and parameters provided, for instance, by a user. For example, a designer may utilize the computer profiler tool to design an experiment that meets certain design goals or requirements. For example, the designer may have a hypothesis for an outcome of an experiment. In these cases, the designer may design an experiment to exceed a power at which the experiment will indicate a rejection if the outcome is different than that of the hypothesis. In another example, the designer may utilize the computer profiler tool to determine a margin of error or uncertainty in the outcome of the experiment.

However, the present disclosure is not limited solely to determining a design quality metric based on obtained settings and parameters. In other embodiments, which are described more fully below, the present disclosure configures the computer profiler tool to determine an input parameter (i.e., an input value) given a desired response (i.e., a desired design quality metric). That is, given a value for a specified setting of the input parameters, the previous embodiments calculate a value for a design quality metric associated with the setting. In contrast to those previous embodiments, however, the embodiments described below are given a user-specified value for the design quality metric, and based on that value, calculate the value for an input parameter associated with the design quality metric.

Figure 24:
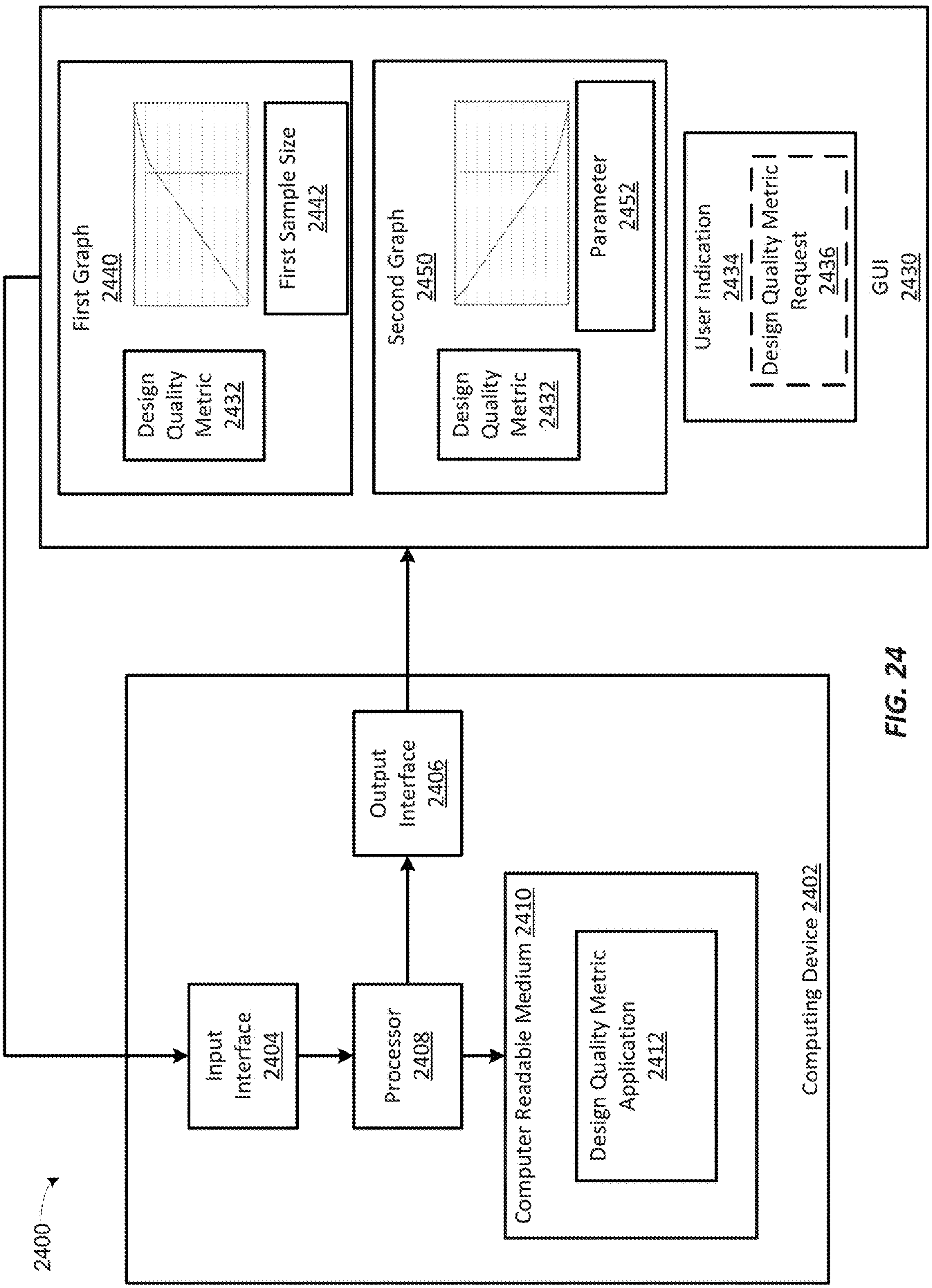
FIG. 24 illustrates a block diagram of a system for providing an interactive graphical user interface according to at least one embodiment of the present technology.

FIG. 24 illustrates a functional block diagram of a system 2400 configured to determine an input parameter based on a given desired design quality metric according to embodiments of the present disclosure. As seen in FIG. 24, system 2400 includes a computing device 2402 and a graphical user interface 2430. The computing device 2402 has one or more input interfaces 2404 and one or more output interfaces 2406 for exchanging information with the graphical user interface 2430. For instance, system 2400 is configured to exchange information between devices in the system (e.g., via wired and/or wireless transmission). For example, a network (not shown) can connect one or more devices of system 2400 to one or more other devices of system 2400. Alternatively, or additionally, system 2400 is integrated into a single device (e.g., a touch screen for entry and display of information for graphical user interface 2430) and the one or more input interfaces 2404 and the one or more output interfaces 2406 are internal interfaces.

In one or more embodiments, computing device 2402 obtains a request for a desired design quality metric 2436 for a design of an experiment. This value (e.g., a power value, a margin of error, a reliability factor, etc.) is obtained via the computing device 2402 itself and/or the interactive graphical user interface 2430. Then, based on this value, the computing device 2402 determines a value for a selected input parameter (e.g., first sample size 2442) that is needed to achieve the requested design quality metric 2436.

An experiment may observe one or more members in a group. For instance, a clinical trial may observe multiple people treated with a consistent experimental protocol across trial participants (e.g., the participants all get the same dosage amount in the trial). Alternatively, an experiment may observe multiple groups (e.g., to test categorical factors that differ between the groups). For instance, trial participants of a clinical trial at different sites may be in different groups or trial participants getting two different dosage amounts may be in different groups. Input parameters for the experiment may indicate a sample size for one or more groups in the experiment. The design can be constructed for the experiment (e.g., before data collection according to the design). The input parameters can include a first sample size indicating a numerical amount of members for a first group of the experiment and/or additional parameters pertaining to the first group. In the example illustrated in FIG. 24, graphs for only one group are shown. However, those of ordinary skill in the art should readily appreciate that this is merely for illustrative purposes. According to the present disclosure, experiments can have multiple groups and there can be more graphs pertaining to more groups.

Additionally, or alternatively, the requested or desired design quality metric 2436 is a value that assesses a desired quality of the design for the experiment (e.g., prior to conducting the experiment). For instance, if the experiment design involves hypothesis testing, there may be a null hypothesis and an alternative hypothesis. For example, if the experiment is a survey test to test heights in a population, the null hypothesis may be that the population will have an average of six feet or more and the alternative hypothesis is that the height will be less than six feet. In such cases, power can be the desired design quality metric 2436 because it can indicate the probability of rejecting the null hypothesis when, in fact, it is false (i.e., the probability of making a correct decision that the experiment population is different from what is assumed in hypothesis testing). A higher power value would indicate a better design.

Power can also be an indication of how well a simulated experiment would reject the null hypothesis as expected. For instance, based on simulated hypothesis outcomes, the experiment may indicate a rejection if the outcome of the experiment is different than the hypothesis outcome 80% of the time. As another example, a design quality metric could indicate one or more error indications or uncertainty indications. Design quality metrics can be based on a sample size of one or more groups observed as part of the experiment. For instance, generally as sample size increases, power metrics also increase as there are more opportunities to observe the expected outcomes. Regardless of the particular desired or requested design quality metric 2436, however, embodiments of the present disclosure start with the requested or desired design quality metric 2436, and based on that value, determine an input parameter (e.g., the sample size of one or more groups that would need to be observed as part of the experiment) that would yield that value. Additionally, in one or more embodiments, once the input parameter has been determined, the computer device 2402 of the present embodiments controls the graphical user interface 2430 to display and/or update a first graph 2440 of the design quality metric 2432 as a function of the first sample size 2442 and a second graph 2450 of the design quality metric 2432 as a function of a parameter 2452 pertaining to the first group.

The graphical user interface 2430 can be interactive. For instance, the computing device 2402 can receive, using the graphical user interface 2430, a user indication 2434 to change (or set) the design quality metric 2436 for an experiment to a specific desired value. Then, based on that provided value, the computing device 2402 is configured to determine the input parameter (e.g., the first sample size 2442) that yields the value provided for the design quality metric, and update the graph representing the relationship that exists between the design quality metric 2432 and the determined input parameter in graphical user interface 2430.

As seen in FIG. 24, both the first graph 2440 and the second graph 2450 are updated to account for the provided design quality metric 2432. For instance, given a value for the desired design quality metric, computing device 2402 determines the first sample size 2442 and updates graph 2440 to reflect that relationship between the desired design quality metric 2432 and the determined first sample size 2442. Additionally, however, the change in the design quality metric 2432 and/or the first sample size 2442 may also cause a change in the value for parameter 2452. In these cases, computing device 2402 is configured to determine a new value for parameter 2452 according to the design quality metric 2432 and/or the first sample size 2442, and update graph 2450 to reflect the relationship that exists between the value provided for the design quality metric 2432 and the new value determined for parameter 2452.

The computing device 2402 has a computer-readable medium 2410 and a processor 2408. Computer-readable medium 2410 is an electronic holding place or storage for information so the information can be accessed by processor 2408. Computer-readable medium 2410 can include, but is not limited to, any type of random access memory (RAM), any type of read only memory (ROM), any type of flash memory, etc. such as magnetic storage devices (e.g., hard disk, floppy disk, magnetic strips), optical disks (e.g., compact disc (CD), digital versatile disc (DVD)), smart cards, flash memory devices, etc.

Processor 2408 executes instructions (e.g., stored at the computer-readable medium 2410). The instructions can be carried out by a special purpose computer, logic circuits, or hardware circuits. In one or more embodiments, processor 2408 is implemented in hardware and/or firmware. Processor 2408 executes an instruction, meaning it performs or controls the operations called for by that instruction. The term “execution” is the process of running an application or the carrying out of the operation called for by an instruction. The instructions can be written using one or more programming languages, scripting languages, assembly languages, etc. Processor 2408 in one or more embodiments can retrieve a set of instructions from a permanent memory device and copy the instructions in an executable form to a temporary memory device that is generally some form of RAM, for example. Processor 2408 operably couples with components of computing device 2402 (e.g., input interface 2404, with output interface 2406 and with computer-readable medium 2410) to receive, to send, and to process information.

In one or more embodiments, computer-readable medium 2410 stores instructions for execution by processor 2408. In one or more embodiments, one or more applications stored on computer-readable medium 2410 are implemented in software (e.g., computer-readable and/or computer-executable instructions) stored in computer-readable medium 2410 and accessible by processor 2408 for execution of the instructions. For example, in one or more embodiments, the computer-readable medium 2410 comprises instructions for design quality metric application 2412 for receiving a value for the design quality metric (e.g., from a user) and for determining a value of an input parameter associated with the design quality metric based on the received value for the design quality metric. In at least one embodiment, the computer-readable medium 2410 also comprises instructions for design quality metric application 2412 to generate, update, and display graphs 2440 and 2450 related to the design quality metric and the determined input parameter. For instance, the computer-readable medium 2410 may generate settings, input parameters, and/or simulate experiments to determine the first sample size 2442 and/or parameter 2452 from the provided value for design quality metric (e.g., before conducting an experiment). For instance, in hypothesis testing, the computing device 2402 may receive a value from a user, for example, for a design quality metric that indicates a desired hypothesis outcome for an experiment. Such an outcome would indicate a response of system 2400 after executing a computer simulation. In these cases, the received value for the design quality metric can indicate a probability related to the hypothesis outcome. According to embodiments of the present disclosure, the computing device 2402 then determines a value for an input parameter associated with the design quality metric (e.g., the first sample size 2442 and/or parameter 2452) based on the received value for that design quality metric and update graphs 2440 and 2450, accordingly.

One or more applications stored on computer-readable medium 2410 can be implemented as a Web application. For example, an application can be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

In one or more embodiments, fewer, different, and additional components can be incorporated into computing device 2402 or system 2400. For instance, in one or more embodiments, there are one or more input devices or output devices (e.g., for obtaining the value for the desired design quality metric or displaying the graphical user interface 2430). As another example, the same interface supports both input interface 2404 and output interface 2406. For example, a touch screen provides a mechanism for user input and for presentation of output to the user. Alternatively, the input interface 2404 has more than one input interface that uses the same or different interface technology. Alternatively, or additionally, the output interface 2406 has more than one output interface that uses the same or different interface technology.

Figure 25A:
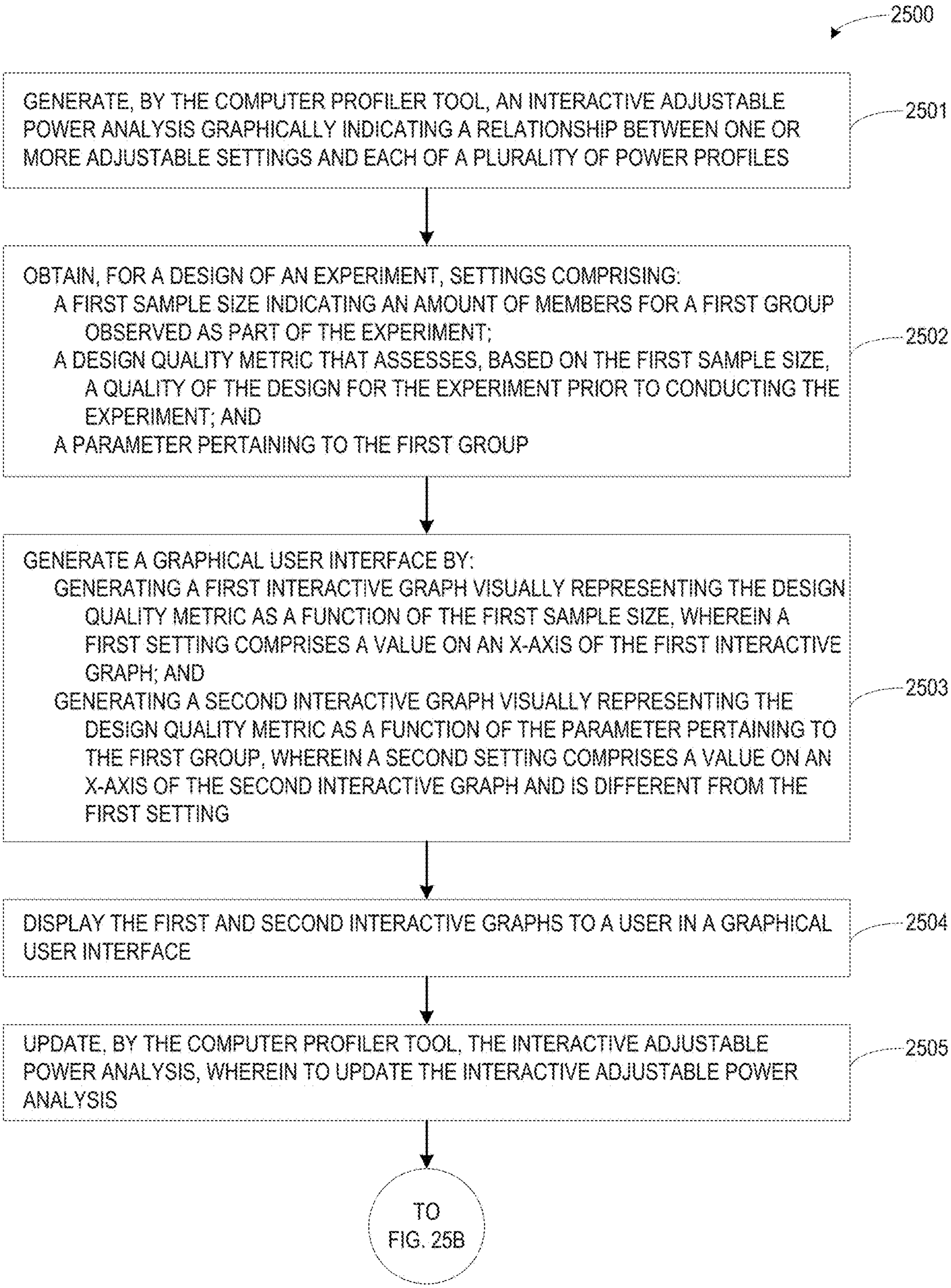
FIGS. 25A-25B illustrate flow diagrams for updating a graphical user interface according to at least one embodiment of the present technology.
Figure 25B:
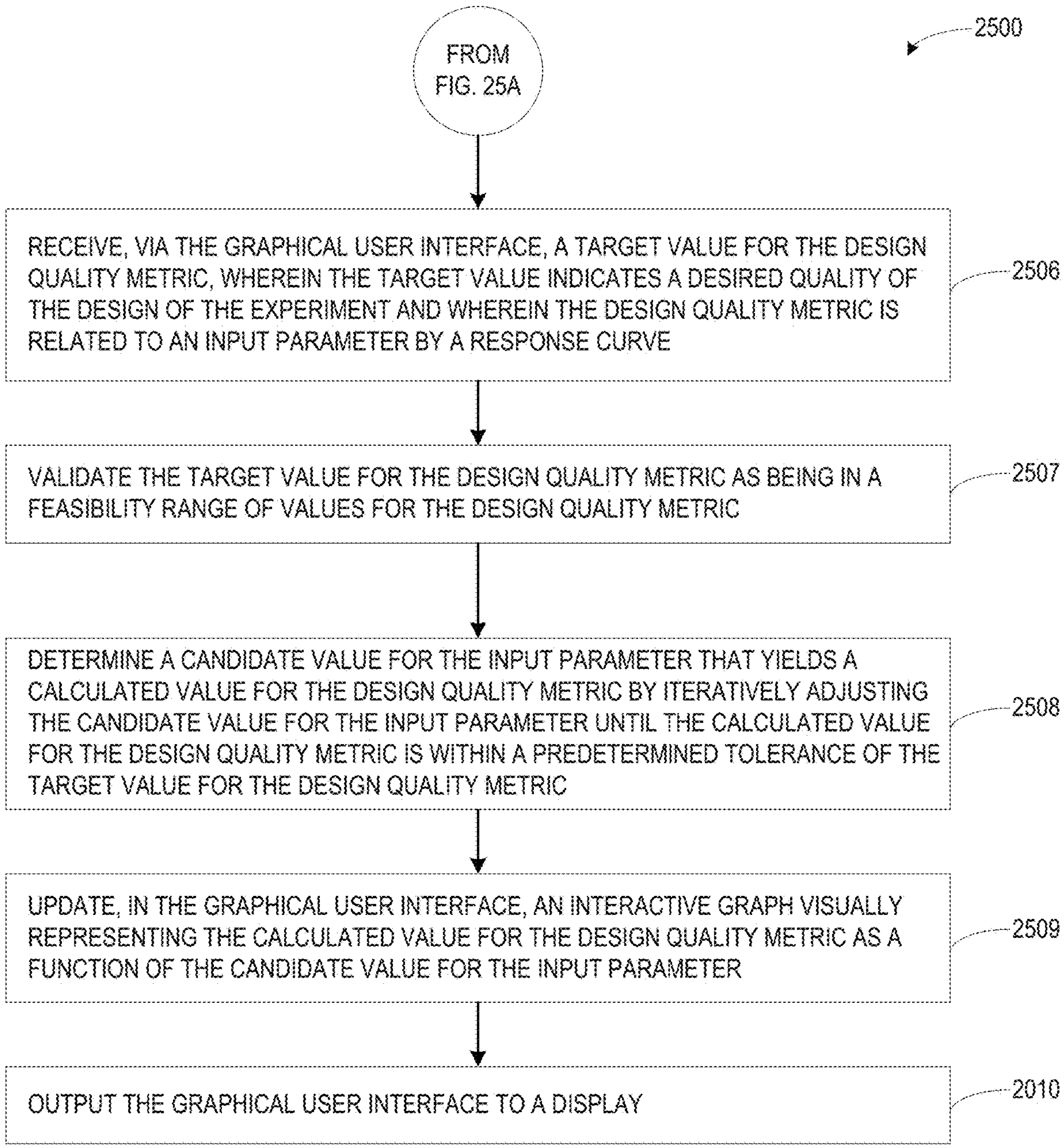

In one or more embodiments, a computing system (e.g., the system 2400 and/or computing device 2402) implements a method as described herein (e.g., a method shown in FIGS. 25A-25B). More particularly, FIGS. 25A-25B illustrate a flow diagram for updating a graphical user interface according to a method 2500. As seen in these figures, method 2500 comprises an operation 2501 of generating an interactive adjustable power analysis graphically indicating a relationship between one or more adjustable settings and each of a plurality of power profiles. To accomplish this, method 2500 comprises an operation 2502 of obtaining settings for a design of an experiment. The settings may, for example, comprise a first sample size indicating an amount of members for a first group observed as part of the experiment. For example, if the experiment is testing properties of a semiconductor, the sample size may be the amount of semiconductors tested in the experiment. The settings may also comprise a design quality metric that assesses, based on the first sample size, a quality of the design for the experiment prior to conducting the experiment. By providing a design quality metric, the user can explore different settings (e.g., by increasing or decreasing the sample size) to best design the experiment before going through the expense and labor of conducting the experiment (e.g., destroying the semiconductors). The settings may also comprise a parameter pertaining to the first group. This parameter can be considered an additional parameter in that it is in addition to the first sample size or design quality metric. It can weigh on the design quality metric or sample size. For instance, the parameter may indicate variability in the experimental material such as a noise parameter for the experiment. As another example, the parameter may relate to the testing method such as the difference to detect or assumed proportion for null or alternative hypothesis in hypothesis testing.

By observing different inputs or scenarios affecting the design, the experimenter can use embodiments to optimize a design (e.g., by observing graphical representations of the design inputs). For instance, the method 2500 comprises an operation 2503 of generating an interactive graphical user interface by generating first and second interactive graphs visually representing the design quality metric as a function of the first sample size, and of the parameter, respectively. The first setting comprises a value on an x-axis of the first interactive graph and the parameter comprises a value on an x-axis of the second interactive graph. Method 2500 then comprises an operation 2504 to display the first and second graphs in the graphical user interface.

Particularly, in this embodiment, the first graph illustrates the design quality metric as a function of the first sample size, while the second graph illustrates the design quality metric as a function of the parameter pertaining to the first group. The method 2500 then comprises an operation 2505 of updating, in the graphical user interface, both the first graph and the second graph accounting for a first user indication (e.g., a desired design quality metric). For example, the update can be one or more computer-generated manipulations of a graph in response to a user manipulation of another graph in the graphical user interface to explore different design scenarios. Additionally, or alternatively, the update can be a computer-generated manipulation of a plurality of graphs (e.g., one or both of the first and second graphs) based on the provided design quality metric and the settings or parameters that are determined based on the provided design quality metric. One of ordinary skill in the art will appreciate that the operations described herein with respect to a first group can be expanded to support multiple groups and multiple parameters.

To accomplish the updating according to the present disclosure, method 2500 (in FIG. 25B) comprises an operation 2506 of receiving, via the graphical user interface, a target value for the design quality metric. The target value indicates a desired quality of the design of the experiment, and the design quality metric is related to an input parameter (e.g., the first sample size) by a response curve (e.g., the first graph 2440). Then, method 2500 comprises an operation 2507 of validating the target value for the design quality metric as being within a feasibility range of values for the design quality metric. According to the present embodiments, the feasibility range of values is bounded by the maximum and minimum values for the design quality metric.

More specifically, each design quality metric has a corresponding absolute minimum value and absolute maximum value. For example, as stated above, power is a design quality metric. The absolute minimum and absolute maximum values therefore may be 0-100 to represent 0% power to 100% power. Similarly, the absolute minimum and absolute maximum values for reliability (another design quality metric) may be 50 and 80, respectively, to represent a 50% to 80% reliability factor. Regardless of the particular values, however, validation according to the present embodiments ensures that the target value for the design quality metric is between these two values, or equal to at least one of these two values.

Provided the target value is validated (i.e., determined to be in the feasibility range), method 2500 comprises an operation 2508 of determining a candidate value for the input parameter that yields a calculated value for the design quality metric. In one embodiment, the candidate value is determined by iteratively adjusting the candidate value for the input parameter until the calculated value for the design quality metric is within a predetermined tolerance of the target value for the design quality metric. Once the candidate value for the input parameter is determined, method 2500 comprises an operation 2509 of updating, in the graphical user interface, the interactive graph visually representing the calculated value for the design quality metric as a function of the candidate value for the input parameter. Method 2500 also comprises an operation 2010 of outputting the graphical user interface, including the updated graph, to a display.

Figures 26A, 26B:
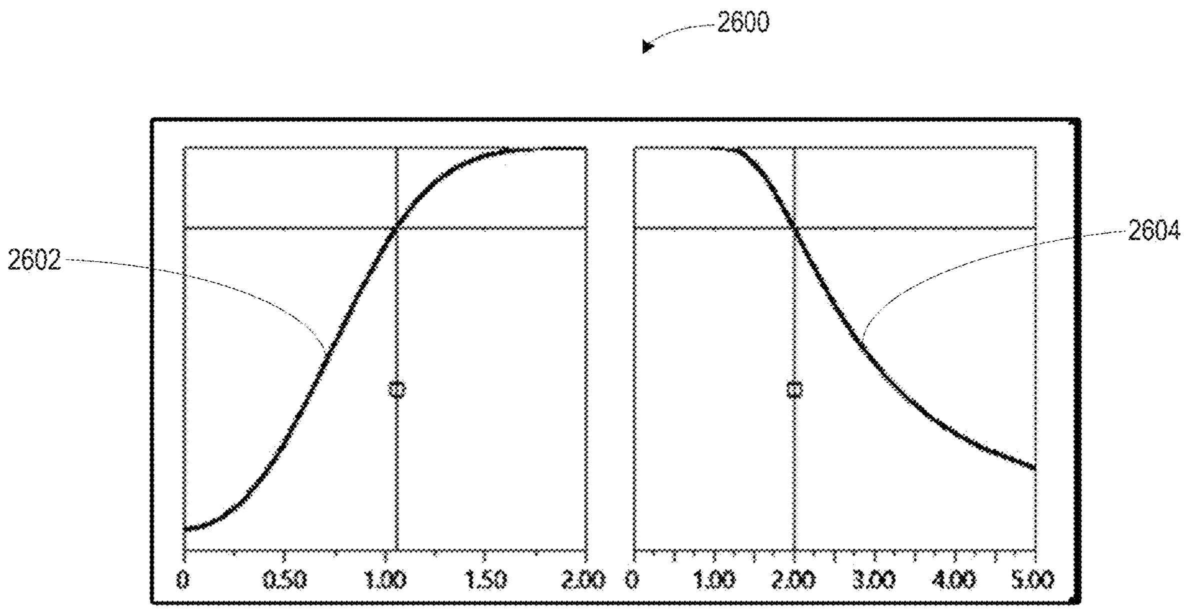
FIGS. 26A-26B illustrate examples of increasing and decreasing monotonic graphs, respectively, according to one embodiment of the present technology.

According to the present embodiments, validating the target value as being in the feasibility range is based on a shape of the response curve. Such response curves can be monotonic or non-monotonic. For example, FIGS. 26A and 26B illustrate a response curve 2600 as being a "monotonic" response curve. Such curves graphically illustrate the monotonic relationship that exists between two values (e.g., power and sample size). The values on a monotonic response curve that increases (e.g., response curve 2602) will not decrease. Similarly, the values on a monotonic response curve that decreases (e.g., response curve 2604) will not increase. In either case, however, there may be local areas on the response curve in which the values remain the same. That is, while the values on a response curve generally increase (such as with response curve 2602) or decrease (response curve 2604), there can be local areas on the response curve that are flat indicating neither an increase or a decrease in value.

Figures 27A, 27B:
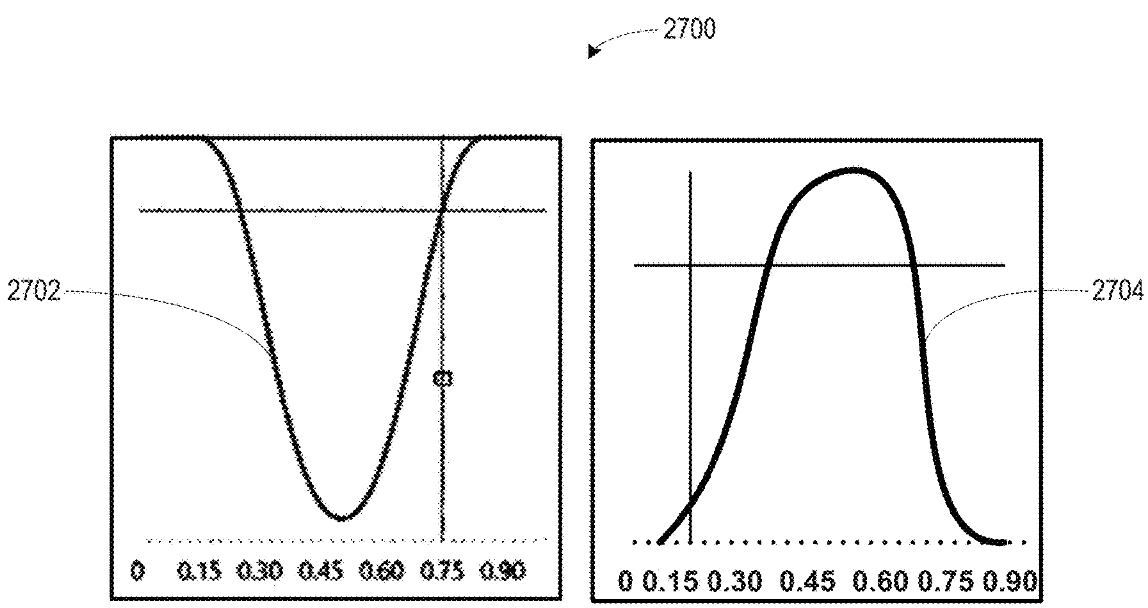
FIGS. 27A-27B illustrate example non-monotonic graphs formed as a valley and a hill, respectively, according to one embodiment of the present technology.

FIGS. 27A-27B illustrate a response curve 2700 as being a "non-monotonic" response curve. Non-monotonic response curves illustrate the non-monotonic relationship that exists between two values (e.g., power and sample size) and are different than monotonic curves in that non-monotonic curves have both increasing and decreasing values. Generally, non-monotonic curves can be shaped, at least partially, like a "valley" in which the response curve opens "up," (e.g., response curve 2702) or a "hill" in which the response curve opens down (response curve 2704). It is possible to have a response curve that is both monotonic and non-monotonic. For example, a given response curve can have an overall increasing or decreasing monotonic trend, but still have one or more local areas along the curve that are non-monotonic (e.g., shaped like a hill or a valley).

Figure 28A:
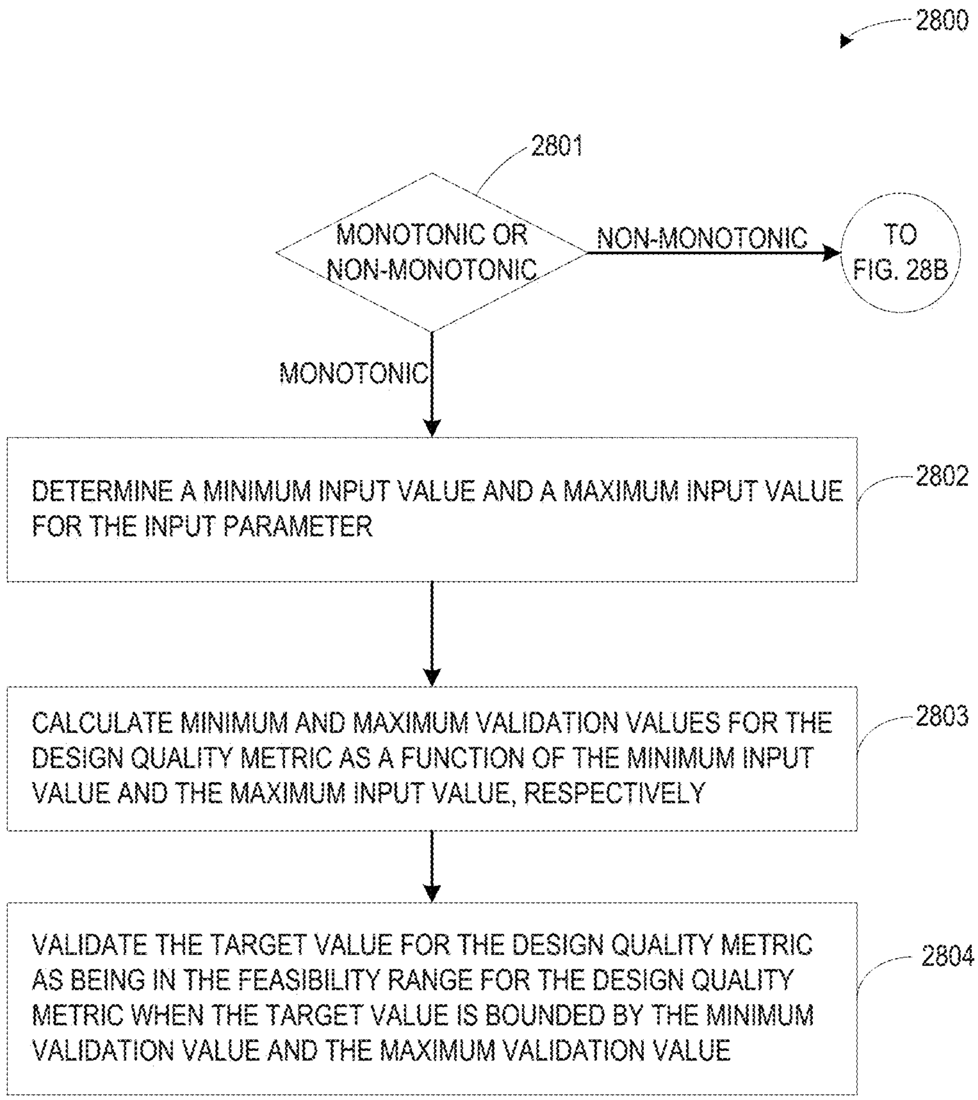
FIGS. 28A-28C are flow diagrams illustrating an example method for validating a target value for a design quality metric according to one embodiment of the present technology.
Figure 28B:
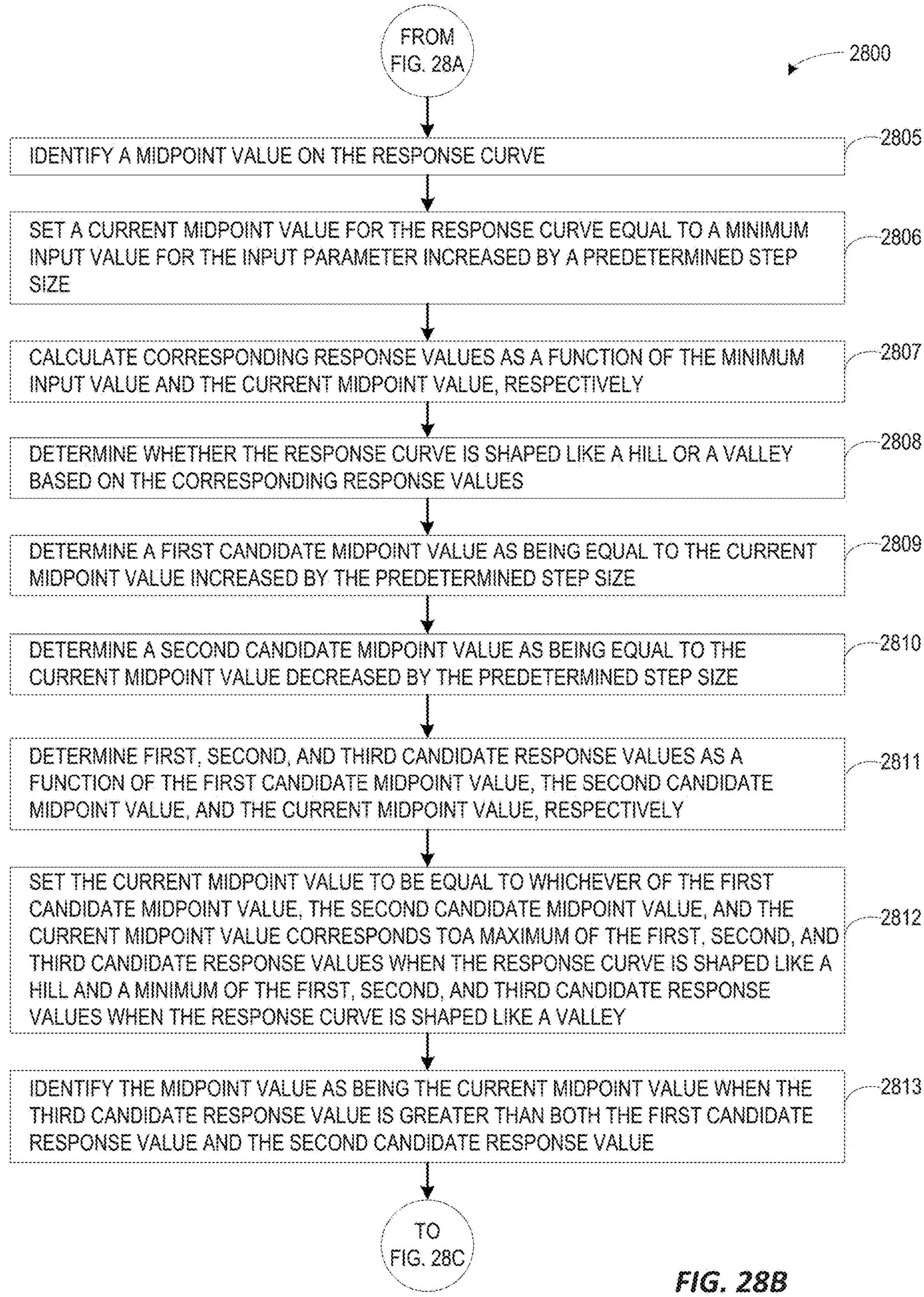
Figure 28C:
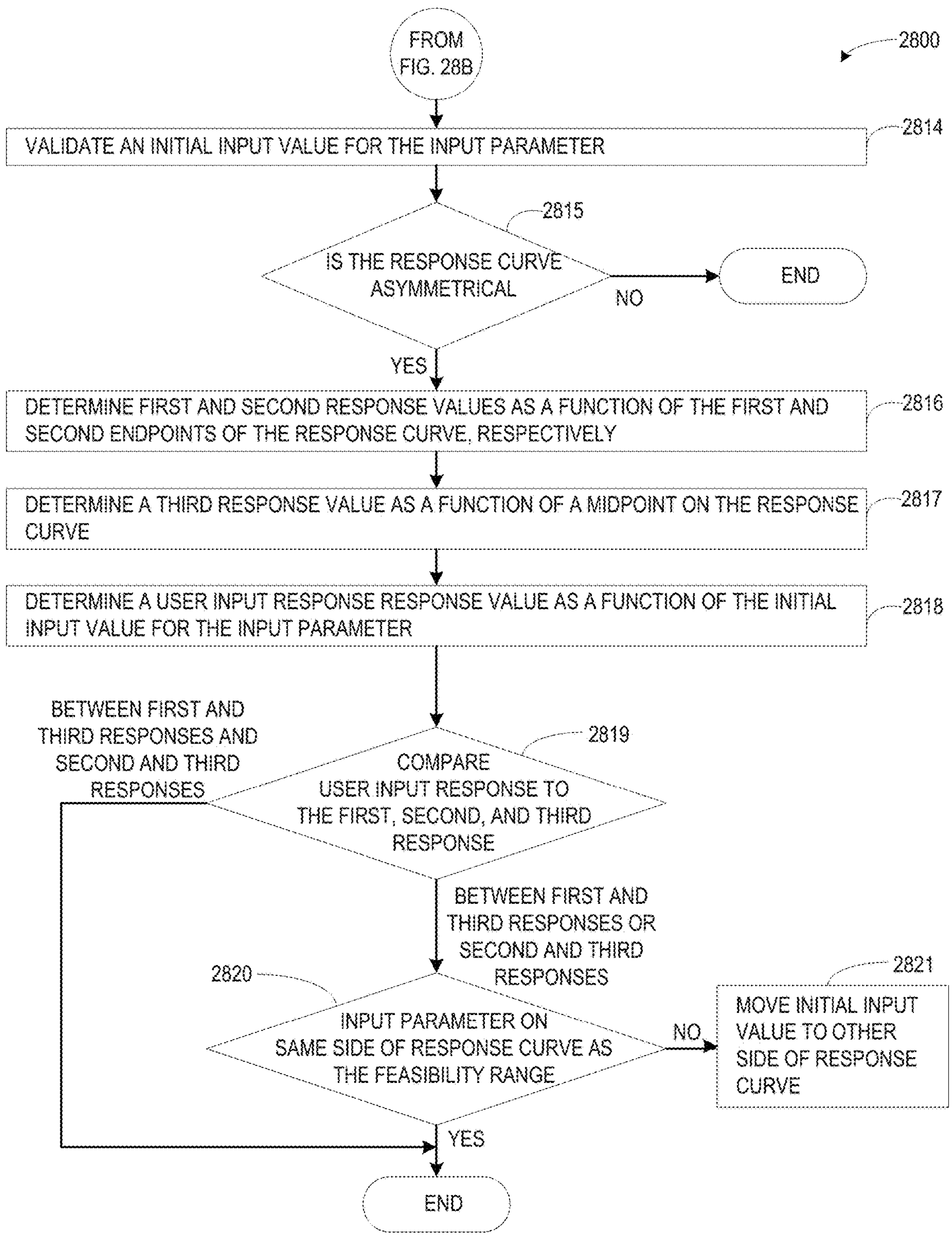

FIGS. 28A-28C are flow diagrams illustrating a method 2800 by which a target value may be validated based on whether the response curve is monotonic or non-monotonic according to embodiments of the present disclosure. As seen in FIG. 28A, method 2800 comprises an operation 2801 of determining whether a given response curve is a monotonic curve or a non-monotonic curve. By way of example only, such information may be known a priori and obtained from memory storage by computing device 2402. If it is determined that the response curve is a monotonic curve, method 2800 comprises an operation 2802 of determining a minimum input value and a maximum input value for the input parameter. For example, in some embodiments, the values for both the minimum input value and the maximum input value are known a priori to computing device 2402. In such cases, computing device 2402 may be configured to retrieve these values from memory. In other embodiments, the minimum and maximum input values are comprised in the instructions executed by computing device 2402 when performing method 2800. In still other embodiments, one or both of these values may be provided by a user via the interactive graphical user interface 2430. Regardless of how the values are obtained, however, both the minimum input value and the maximum input value correspond to respective points on the response curve. Method 2800 then comprises an operation 2803 of calculating respective minimum and maximum validation values for the design quality metric at the minimum input value and the maximum input value. In other words, the computing device 2402 calculates the minimum response value for the design quality metric as a function of the minimum input value, and the maximum validation value for the design quality metric as a function of the maximum input value. With the minimum and maximum response values determined, method 2800 comprises an operation 2804 of validating the target value for the design quality metric as being within the feasibility range for the design quality metric. In one embodiment, for example, the target value provided for the design quality metric is compared to the minimum and maximum validation values that were calculated for the minimum and maximum input values, respectively. A determination is then made as to whether the target value is between, or equal to at least one of, the minimum validation value and the maximum validation value. If so, the target value provided for the design quality metric is validated. Otherwise, the target value is not validated. In these latter situations, computing device 2402 can be configured to generate and display an alert informing the user that the entered target value is not in the feasibility range.

FIGS. 28B-28C illustrate a method for validating the target value as being in the feasibility range when the response curve is non-monotonic. In these cases, the response curve is either shaped like a "valley" in which the response curve opens upwardly, or like a "hill" in which the response curve opens downwardly. Therefore, method 2800 will first determine whether the response curve is shaped like a hill or a valley by determining the apex of the graph (i.e., the topmost point in a graph shaped like a hill) or the vertex of the graph (i.e., the bottommost point in a graph shaped like a valley). In some embodiments, the shape of the response curve is known. In these cases, computing device 2402 can obtain the apex or vertex values from memory, or alternatively, from a user via the graphical user interface 2430. Regardless, when such values are known, computing device 2402 can use them to determine the feasibility range for the target value.

If the apex or vertex is not known, however, the present embodiments configure the computing device 2402 to locate those points on the graph. For example, as seen in FIG. 28B, method 2800 comprises an operation 2805 for identifying a midpoint value on the response curve. To identify the midpoint value, method 2800 comprises an operation 2806 to set a current midpoint value to be a minimum input value for the input parameter increased by a predetermined step size. Thus:

$$MV_{CURRENT}=MIV_{IP}+S$$

wherein: $MV_{CURRENT}$ is the current midpoint value;

$MIV_{IP}$ is the minimum input value for the input parameter; and

S is a predetermined step size.

Then, in an operation 2807, method 2800 calculates corresponding response values as a function of $MV_{CURRENT}$ and $MIV_{IP}$, respectively. The corresponding response values are also on the response curve. Next, based on a comparison of the calculated response values, method 2800 determines whether the response curve is shaped like a hill or a valley in an operation 2808. For example, in one embodiment, if the response value calculated for $MV_{CURRENT}$ is greater than the response value calculated for $MIV_{IP}$, the response curve is shaped like a hill. If the response value calculated for $MV_{CURRENT}$ is less than the response value calculated for $MIV_{IP}$, however, the response curve is shaped like a valley. If the two values are equal, it is possible that there is a flat area of the response curve. In these situations, the current value of $MV_{CURRENT}$ is again increased by the predetermined step size and operations 2807 and 2808 are repeated.

Once the shape of the response curve has been determined, method 2800 comprises operations 2809, 2810 to determine first and second candidate midpoint values $MV_{CAND1}$ and $MV_{CAND2}$ as:

$$MV_{CAND1}=MV_{CURRENT}+S, \text{ and}$$

$$MV_{CAND2}=MV_{CURRENT}-S.$$

Particularly, in this embodiment, the candidate midpoint values $MV_{CAND1}$ and $MV_{CAND2}$ are determined to be values that are a step size above the current midpoint value $MV_{CURRENT}$, and a step size below the current midpoint value $MV_{CURRENT}$, respectively. According to at least one embodiment of the present disclosure, the predetermined step size is the same as the predetermined tolerance, although it is possible for the predetermined step size to be different than the predetermined tolerance. In an operation 2811, method 2800 determines a plurality of candidate response values as functions of respective midpoint values. Particularly, in this embodiment, method 2800 determines:

a first candidate response value ($RV_{CAND1}$) as a function of the first candidate midpoint value $MV_{CAND1}$;

a second candidate response value ($RV_{CAND2}$) as a function of the second candidate midpoint value $MV_{CAND2}$; and a third candidate response value ($RV_{CAND3}$) as a function of the current midpoint value $MV_{CURRENT}$.

In an operation 2812, method 2800 then determines a new value for the current midpoint value $MV_{CURRENT}$ (i.e., updates the value of $MV_{CURRENT}$) based on the determined candidate response values $RV_{CAND1}$, $RV_{CAND2}$, $RV_{CAND3}$, and on the determined shape of the response curve. For example, in one embodiment of the present disclosure, method 2800 determines and updates the value for $MV_{CURRENT}$ as:

$$MV_{CURRENT}=\text{MAX}(RV_{CAND1},RV_{CAND2},RV_{CAND3})$$

when the response curve is shaped like a hill, and $$MV_{CURRENT}=\text{MIN}(RV_{CAND1},RV_{CAND2},RV_{CAND3})$$

when the response curve is shaped like a valley. In an operation 2813, with $MV_{CURRENT}$ determined, method 2800 identifies the midpoint value of the response curve as being equal to $MV_{CURRENT}$ when the value for $RV_{CAND3}$ is greater than the values for both $RV_{CAND1}$ and $RV_{CAND2}$. If the value for $RV_{CAND3}$ is not greater than the values of at least one of $RV_{CAND1}$ and $RV_{CAND2}$, method 2800 repeats operations 2809-2812 until the value for $RV_{CAND3}$ is greater than the values of both $RV_{CAND1}$ and $RV_{CAND2}$.

As stated above, the step size S used to set $MV_{CAND1}$ and $MV_{CAND1}$ in this embodiment is the same as the tolerance used for the input parameter. Additionally, by default, the computing device 2402 will utilize the value of the input parameter (i.e., at $MV_{CURRENT}$) as an initial input value to determine an initial candidate value for the design quality metric. If the initial candidate value that is calculated as a function of $MV_{CURRENT}$ is feasible, and if the response curve is shaped either as a hill or a valley, an additional check is needed to determine whether the initial input value is or is not on the appropriate side of the response curve (i.e., the "same side" of the response curve where the feasibility range lies).

For example, as seen in FIG. 28C, method 2800 comprises an operation 2814 to validate the initial input value that will be used to determine the candidate value for the design quality metric. In this embodiment, method 2800 comprises an operation 2815 to determine whether the response curve is symmetrical, in which the values for the endpoints of the response curve are equal, or asymmetrical, in which the values for the endpoints of the response curve are unequal (e.g., the value of one of the endpoints of the response curve is greater than or less than the value of the other endpoint of the response curve). If the values of the two endpoints are equal, the response curve is determined to be symmetrical. Otherwise, the response curve is considered to be asymmetrical.

If the response curve is symmetrical, method 2800 ends as the response for the initial input value is in the feasibility range. If, however, the response curve is asymmetrical (e.g., the values of the two endpoints are unequal), method 2800 will determine whether the response for the initial input value is in the feasibility range.

Therefore, in an operation 2816, method 2800 determines first and second response values as a function of the two endpoints of the response curve, respectively. In an operation 2817, method 2800 determines a third response value as a function of the value at the apex (or vertex) of the response curve. Method 2800 then determines a user input response value as a function of the initial input value for the input parameter in an operation 2818 and compares the response values in an operation 2819. Responsive to determining at operation 2819 that the response value calculated for the initial input value is between the first and third response values and the second and third response values, method 2800 ends as the response value for the initial input value is in the feasibility range. Responsive to determining that response value calculated for the initial input value is between either the first and third response values or the second and third response values, however, method 2800 determines, in an operation 2820, whether the initial input value and the feasibility range are on the "same side" of the response curve. If not, method 2800 moves the initial input value to the other side of the response curve in an operation 2821 so that it is on the same side of the response curve as the feasibility range. If so, however, method 2800 ends.

Thus, there are two possible ranges into which the initial input value can fall. The first range is on one side of the response curve and is defined by the first and third response values (i.e., the response values corresponding to a midpoint of the asymmetric response curve, such as the apex/vertex of the asymmetric response curve, and one endpoint of the asymmetric response curve and), while the second range is on the opposite side of the response curve and is defined by the second and third response values (i.e., the response values corresponding to the midpoint of the asymmetric response curve, such as the apex/vertex of the asymmetric response curve, and the other endpoint of the asymmetric response curve). If the user input response falls within both ranges, then there is no need to move the initial input value. However, if the user input response falls within only one of the first and second ranges, and if the initial input value is not on the same side of the response curve as the feasibility range, then the initial input value is moved from one of the first and second sides of the response curve) to the other of the first and second sides of the response curve.

Figure 33:
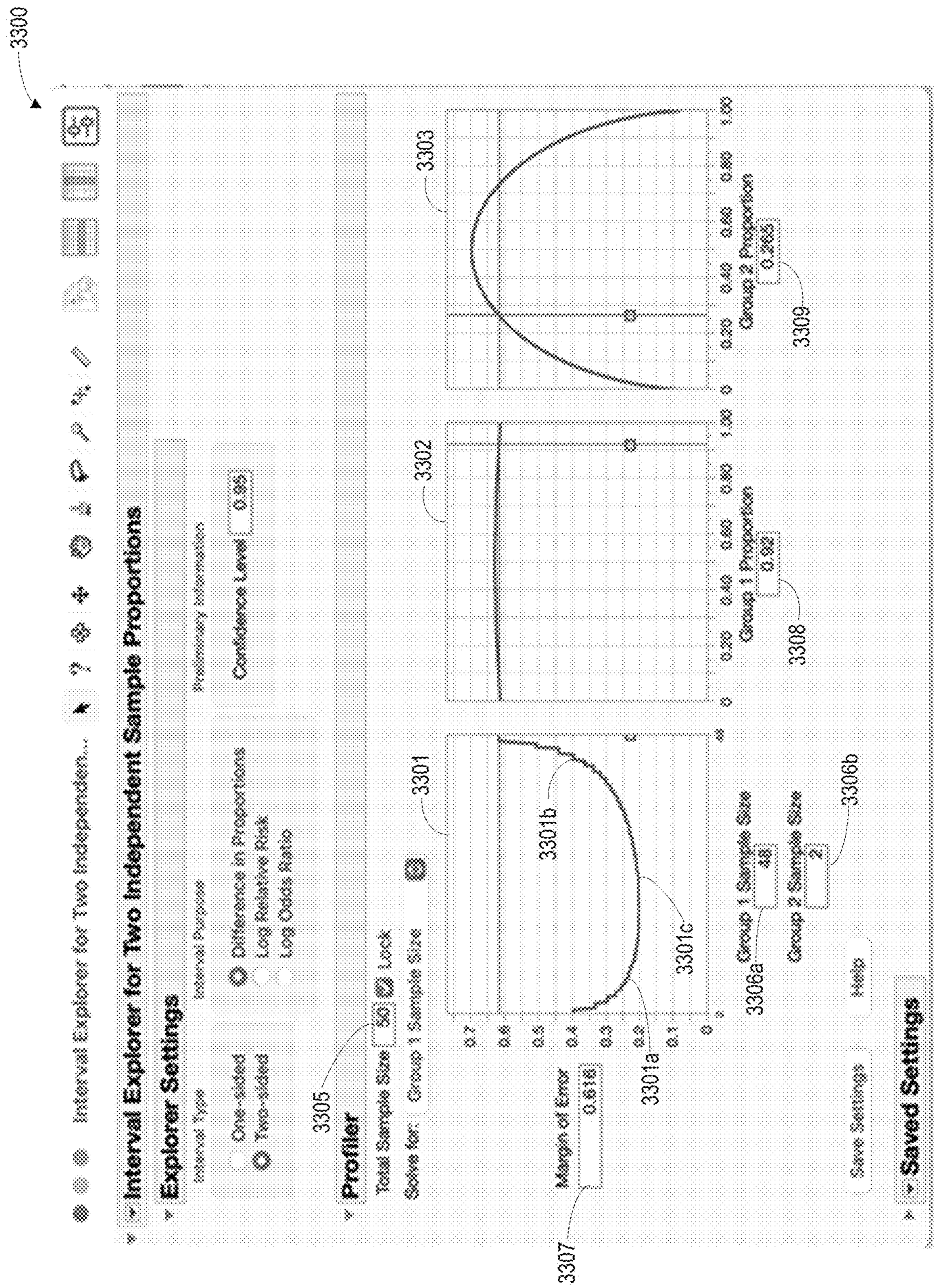

As an illustrative example, consider an asymmetric response curve, such as the one shown in graph 3301 of FIG. 33. In at least some embodiments, the first and second ranges divide the input space into two "sides" 3301*a*, 3301*b*, respectively, with the split being at vertex 3301*c* (or peak when the response curve is shaped like a hill). According to the present disclosure, if the first range on side 3301*a* contains the target value for the desired design quality metric, but the second range on side 3301*b* does not, then a check is made to determine whether the response value for the initial input value is on side 3301*a*. If so, the present embodiments will determine the value for the input parameter based on the range corresponding to side 3301*a*. Otherwise, the present embodiments will "kick" or "move" the initial input value to the other side of the response curve (i.e., side 3301*b*) and determine the value for the input parameter based on the range corresponding to side 3301*b*.

Returning to FIG. 29, it is a flow diagram of a method 2900 for determining a value for the input parameter that yields a value that is within a predefined tolerance of the target value for the design quality metric. By way of example only, consider a situation in which the designer wants to know which sample size will yield a target value of 80% power for the design quality metric of the experiment. In such cases, method 2900 comprises an operation 2901 to determine the direction of the response curve. In at least one embodiment, this determination is based on whether a relationship between the design quality metric and the input is monotonic or non-monotonic (i.e., the response curve is a monotonic response curve or a non-monotonic response curve). Then, in an operation 2902, method 2900 determines a calculated value for the design quality metric as a function of a candidate value for the input parameter. In an operation 2903, method 2900 evaluates the calculated value to determine whether that value is within the predetermined tolerance of the target value for the design quality metric. If not, method 2900 comprises an operation 2904 to adjust the candidate value for the input parameter by modifying the candidate value by a predetermined step size.

Figure 29:
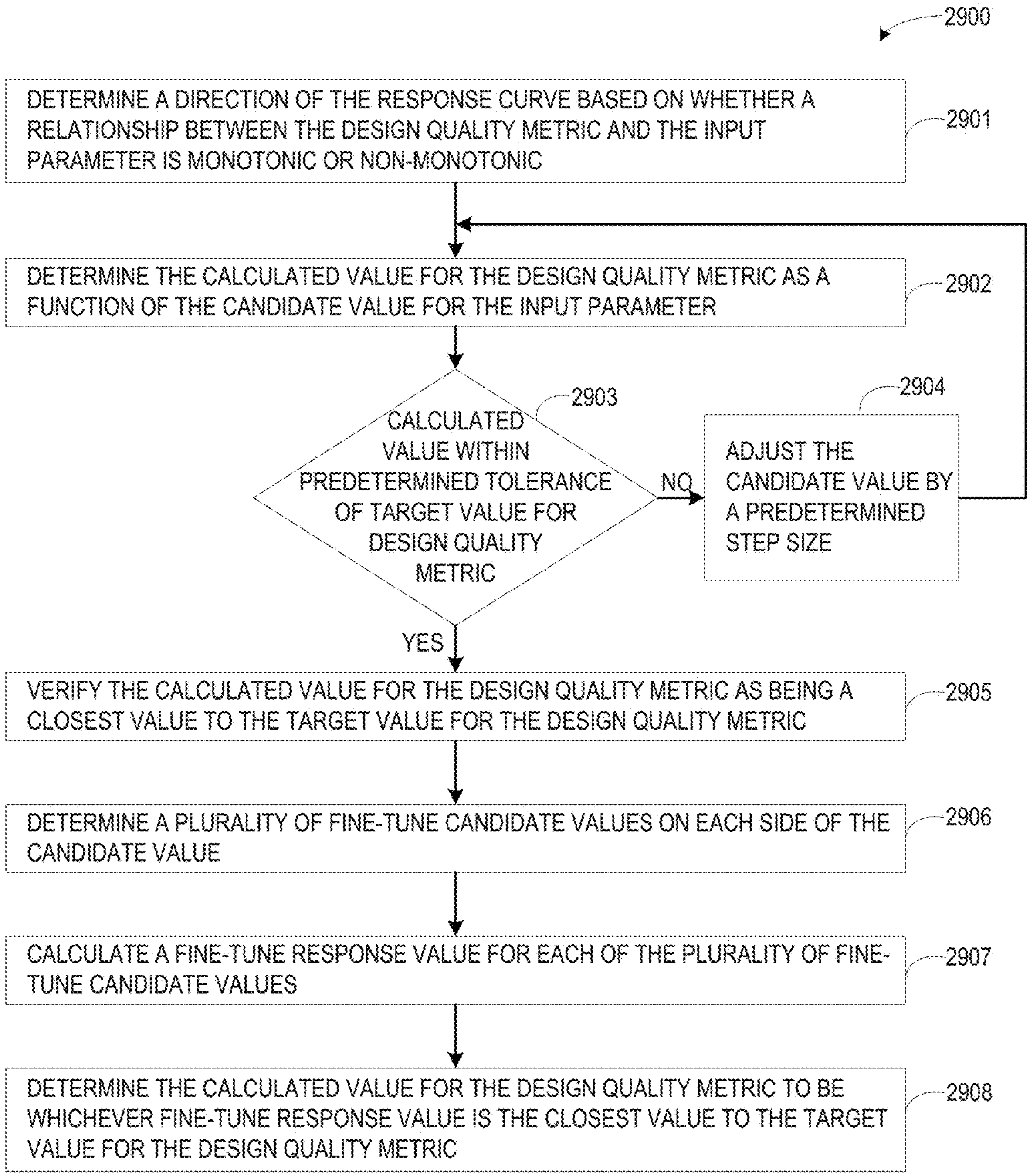
FIG. 29 is a flow diagram illustrating an example method for determining a value for an input parameter for a given a target value for the design quality metric according to one embodiment of the present technology.

As seen in FIG. 29, this is an iterative process in which operations 2902, 2903, and 2904 are iteratively performed until the calculated value for the design quality metric is within the predetermined tolerance of the target value for the design quality metric. When it is determined that the calculated value for the design quality metric is within the predetermined tolerance of the target value, method 2900 comprises an operation 2905 to verify the calculated value for the design quality metric as being a value that is closest to the target value for the design quality metric.

For example, in one embodiment, method 2900 comprises an operation 2906 to determine a plurality of fine-tune candidate values for the input parameter on each side of the candidate value for the input parameter. In an operation 2907, method 2900 calculates a corresponding response value for each of the fine-tune candidate values. In an operation 2908, method 2900 determines the calculated value for the design quality metric to be the fine-tune response value that is closest to the target value for the design quality metric. This closest value may or may not be equal to the user's desired design quality metric (i.e., the provided target value) but is within a specified tolerance of the target value.

Figure 30:
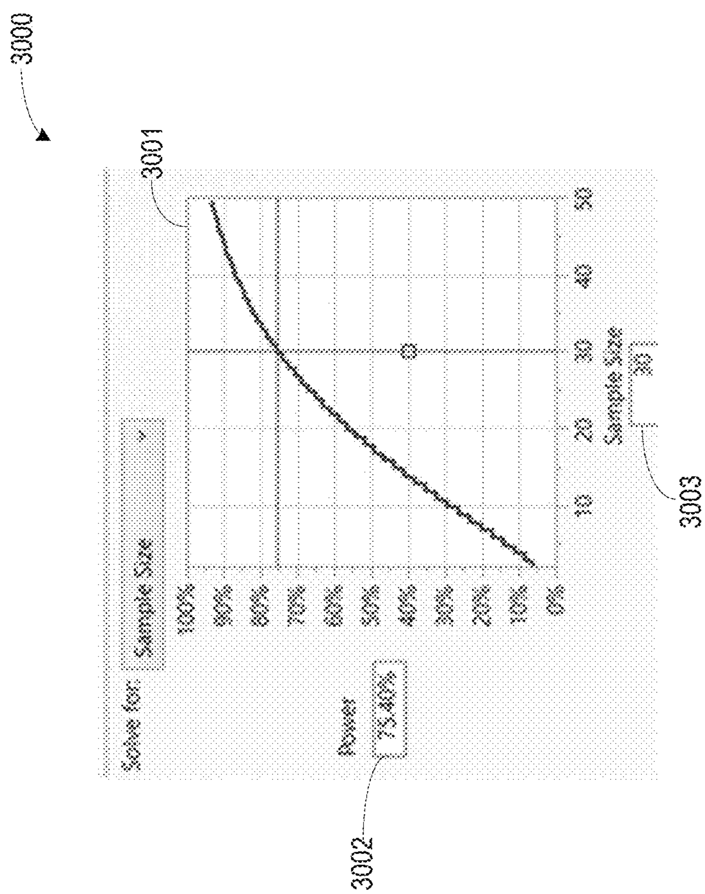
FIGS. 30-34B illustrate example interactive graphical user interfaces for determining the value of an input parameter for a given a target value of the design quality metric according to embodiments of the present technology.

FIGS. 30-34B illustrate exemplary interactive graphical user interfaces generated according to embodiments of the present disclosure. With reference to FIG. 30, consider a situation where a user (e.g., a researcher) wants to determine a sample size 3003 (i.e., the input parameter) that yields a target value 3002 of at least 80% power in an experiment. In these cases, the researcher would provide the target value 3002 of 80. Then, as described previously, computing device 2402 would determine the sample size 3003 that will yield a power of 80%, or a power that is as close to 80% as possible.

As seen in FIG. 30, the current sample size value is 30, which yields a power of 75.40%. The desired power, however, is 80%. Therefore, the researcher would modify the power to the target value of 80. This can be accomplished, for example, by the researcher interacting with the graphical user interface to change the current value of 75.40% to 80%. So entered, computing device 2402 first checks to determine whether a power of 80% is feasible. As stated above, computing device 2402 may determine this by performing method 2800 of FIGS. 28A-28C.

Next, the algorithm starts with the current value of 30 for the input parameter. However, as seen in FIG. 30, the current response for the design quality metric at that value is 75.4%. The response curve of graph 3001 is monotonic and increasing. Therefore, computing device 2402 increases the value of the input parameter (i.e., sample size) by a predetermined step size to a new value of 60. However, an input parameter value of 60 would yield a power of 96.78%, which overshoots the desired target value of 80% for the response. Therefore, computing device 2402 decreases the predetermined step size by a value of 30/4 (rounded down to 7) to 53. A sample size of 53 yields a response of 94.65%, and thus, is still too high. Therefore, computing device 2402 repeats decreasing the input parameter value (i.e., the sample size) by the newly determined step size of 7 and determining the power for that sample size until the sample size reaches 32.

With the sample size at this value (i.e., 32), computing device 2402 determines that the sample size of 32 yields a power of 78.23%. Having overshot the desired target value again, computing device 2402 increases the value for input parameter by the newly determined step size of 7 to 39 to yield a power of 86.05%. Again, the target value of 80 has been overshoot. Thus, computing device 2402 decreases the predetermined step size by a value of 7/4 (rounded down to 1). Computing device 2402 then iteratively decreases the value of the input parameter by 1 and solves for the input parameter until the input parameter value is 33. A value of 33, however, yields a power of 79.54%, which is under the 80% target value. In these cases, computing device adjusts the input parameter value by the predetermined step size (i.e., 1) to 34, which yields a power of 80.78%. Computing device 2402 can, in some embodiments, again reduce the predetermined step size by 1/4 (i.e., 0.25). However, since a value of 0.25 is less than the predetermined tolerance of 1, the method stops. Further, since the response curve is well behaved (i.e., an increasing monotonic curve), there's no need for any extra operations to determine whether the calculated power value of 80.78% is closest to the desired target value of 80%. Additionally, the calculated power value of 80.78% is slightly above the desired target value of 80%. Therefore, there is no need for computing device 2402 to further adjust the value of the input parameter. Computing device 2402 then sets the value of the input parameter (i.e., the sample size) to 34 and updates all graphs on the interactive graphical user interface based on those calculated values (i.e., 80.78% and 34, respectively).

Figure 31:
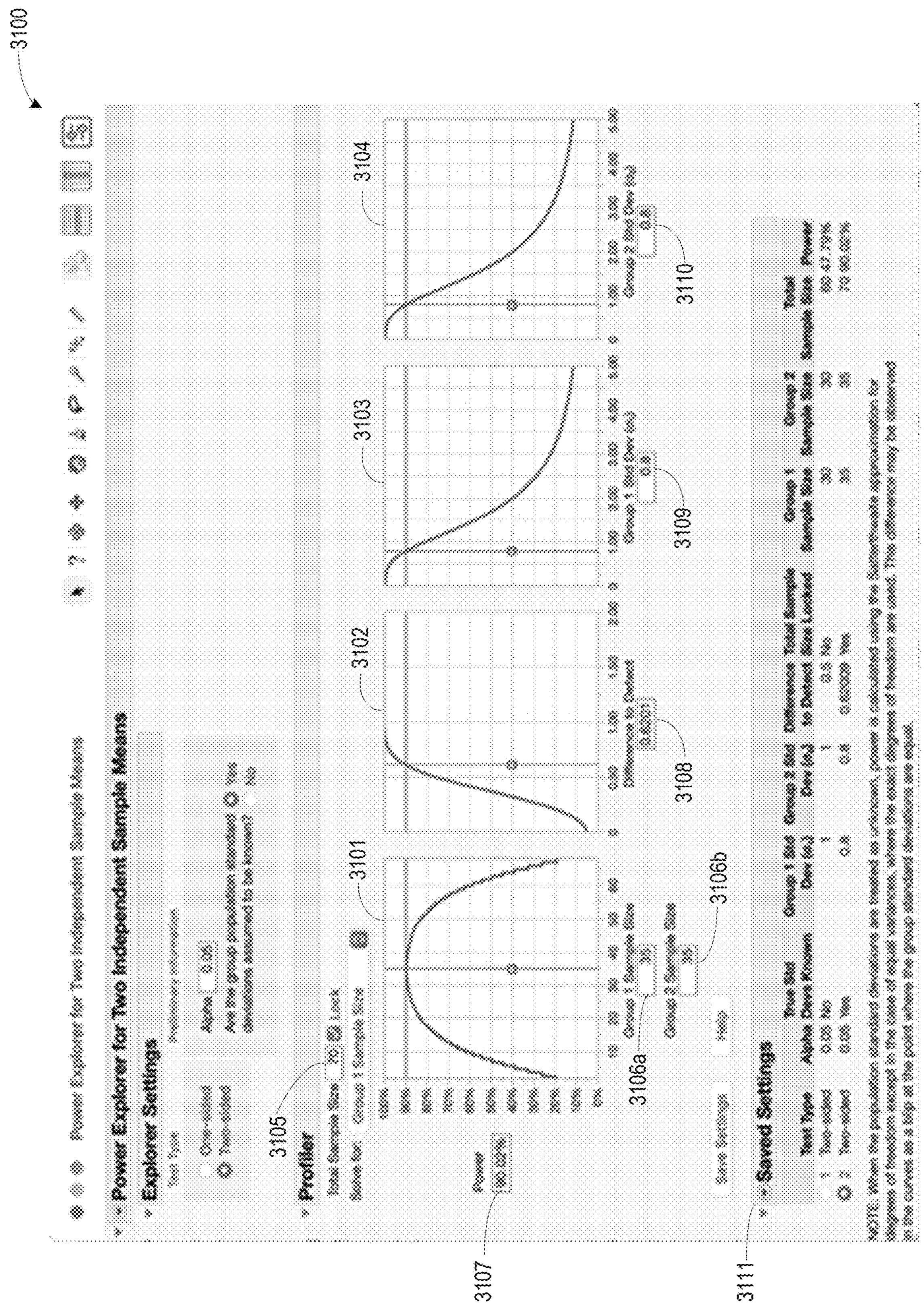

Referring now to FIG. 31, the interactive graphical user interface 3100 is generated to include a plurality of graphs 3101, 3102, 3103, and 3104. Graph 3101 is shaped like a "valley" and reflects a non-monotonic relationship between the power 3107 and the sample sizes 3106*a*, 3106*b* for multiple groups. Graphs 3102, 3103, and 3104 are monotonic curves that reflect corresponding monotonic relationships between the power 3107, the Difference to Detect 3108, and the standard deviations 3109, 3110 for multiple groups, respectively. More particularly, graph 3102 reflects an increasing monotonic curve, while graphs 3103 and 3104 illustrate decreasing monotonic curve.

With the above in mind, consider a scenario in which a researcher wants to assess the efficacy of a new drug for controlling high blood pressure in comparison to an old drug. To accomplish this, the researcher may design an experiment to compare the average blood pressure readings of two groups of patients indicated here as Group A 3006*a* and Group B 3006*b*. Group A consists of patients taking the old drug, while Group B consists of patients taking the new drug. However, as is often the case, the researcher only has enough funding to cover a total sample size 3105 of 70 patients. Regardless of the constrained sample size, though, the researcher would like the study to realize a power 3107 of 90%.

Other information is also assumed to be known. For example, based on similar, previously conducted studies, it can be assumed that the patients in both Groups A and B come from populations whose standard deviations are largely similar. Thus, the sample sizes of each group 3106*a*, 3106*b* should be equal at 35 patients each. Additionally, based on a previously conducted pilot study, for example, the population standard deviation of each group 3109, 3110 is assumed to be known as 0.8. The remaining unknown is the Difference to Detect 3108— i.e., the difference between the two group averages that is deemed practically significant given the values of sample sizes 3106*a*, 3106*b* and the standard deviations 3109, 3110 for both groups of patients, respectively.

As described above, some embodiments of the present disclosure are configured to allow researchers to design experiments in order to determine the power value 3107 based on the values for the sample size 3106*a*, 3106*b* of each group, a Difference to Detect 3108, and standard deviations 3109, 3110 for each group. However, in this case, the researcher is constrained by cost and would like to determine the minimum Difference to Detect 3108 between Groups A and B that can be feasibly detected given values for the sample sizes 3106*a*, 3106*b*, the standard deviations 3109, 3110, and a desired target power of 90%. Accordingly, embodiments of the present disclosure configure the computing device 2402 to determine this information for the researcher.

FIG. 31 illustrates the interactive graphical user interface 3100 as generated. The values in the first row of the Saved Settings table 3111 reflect the default input parameters upon launching the computer profiler tool. According to the present embodiments, the researcher, for example, would change the input parameters to reflect the problem described above and request that the computer profiler tool determine a Difference to Detect for a power of 90%. Particularly, the researcher would enter the known or desired values for the power 3107 (i.e., 90%), sample sizes 3106*a*, 3106*b* (i.e., 35 for each group), and a standard deviation 3109, 3110 for each group (i.e., 0.8 for each group). Given these values, the computer profiler tool is configured according to the embodiments described above to solve for the Difference to Detect 3108 and update graph 3102 to reflect that solution. As seen in FIG. 31, the minimum Difference to Detect 3108 that the researcher can detect given the specified settings 3106*a*, 3106*b*, 3109, and 3110 with 90% power 3107 for this experiment is approximately 0.62. Additionally, the computer profiler tool of the present embodiments is configured to update graphs 3101, 3103, and 3104, to reflect the changed relationships between the power 3107 and input parameters 3106*a*, 3106*b*, 3109, and 3110 based on solving for the Difference to Detect 3108.

Figure 32:
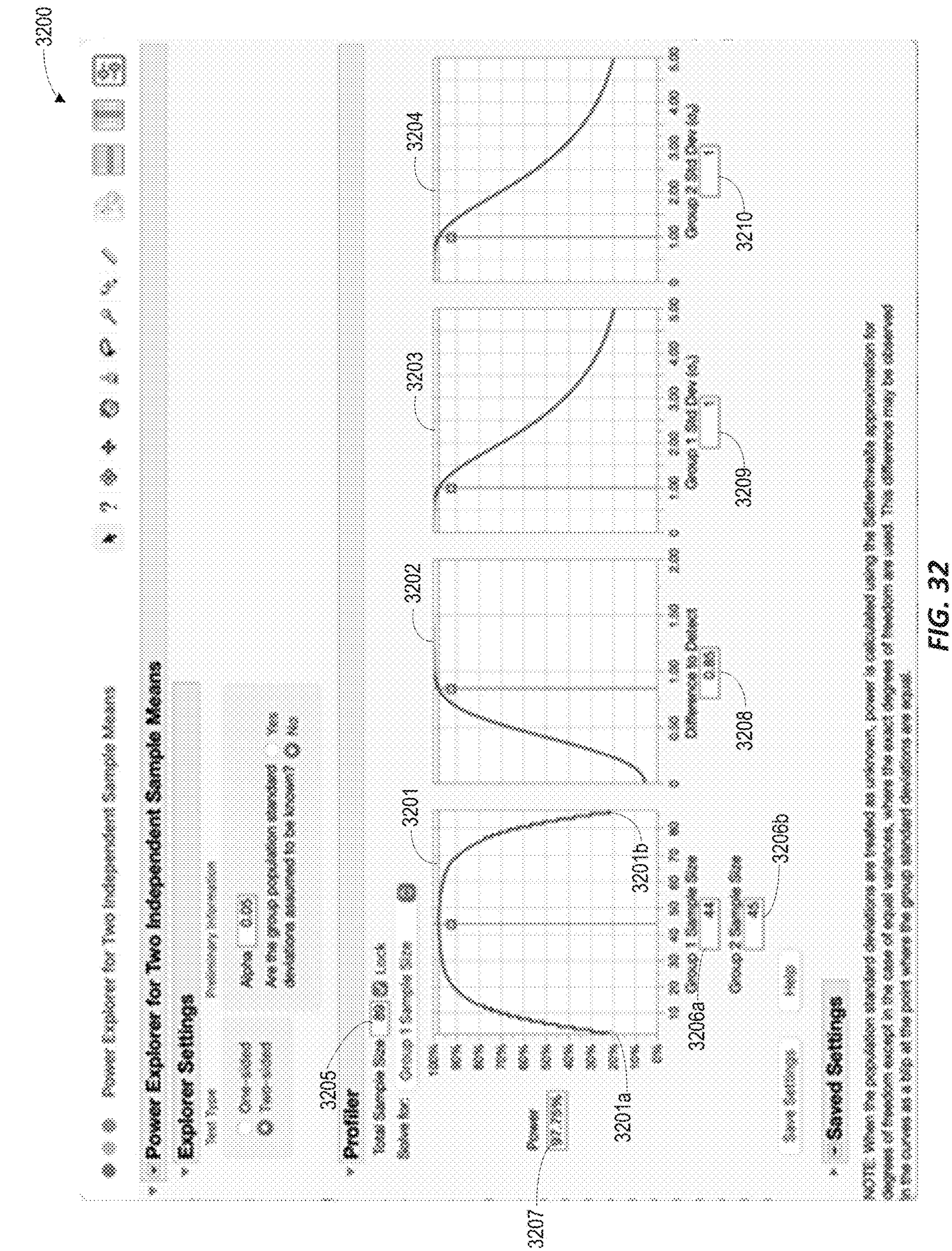

FIG. 32 illustrates an interactive graphical user interface 3200 generated according to an embodiment of the present disclosure. In this embodiment, the total sample size 3205 is fixed at 89. The Difference to Detect 3208 is set to 0.85, and the standard deviations 3209 and 3210 are each set to a value of 1. If the researcher wants to determine a sample size 3206*a* for Group A that would result in a desired power (i.e., a target value) of 90%, the computer profiler tool of the present disclosure is configured to solve for sample size 3206*a* based on the target value of 90%, as previously described. Once solved, the computer profiler tool of the present disclosure would then update the sample size 3206*b* as they are related by the total sample size 3205.

Additionally, in at least one embodiment, the computer profiler tool of the present disclosure may be configured to further update the values for the Difference to Detect 3208 and the standard deviations 3209 and 3210, as well as their corresponding graphs 3202, 3203, and 3204 based on the target value of 90% for the desired power, as previously described. For example, in one embodiment, once the computer profiler tool has solved-for the desired sample size 3206*a*, 3206*b* and updated corresponding graph 3201, the computer profiler tool might then be configured to solve for the Difference to Detect 3208 and update corresponding graph 3202. The computer profiler tool could then solve for the Group 1 standard deviation 3209 and update corresponding graph 3203, and then follow that by solving for the Group 2 standard deviation 3210 and update corresponding graph 3204. This is, however, simply an embodiment and those of ordinary skill in the art will readily appreciate that the values for the different input parameters and their corresponding graphs may be updated in any order.

As seen in FIG. 32, the response curve for graph 3201 is shaped like a hill, and as such, represents a non-monotonic relationship between a target value for power of 90% and the sample size. Additionally, the response curve for graph 3201 is symmetric with both endpoints of the response curve (i.e., first and second endpoints 3201*a* and 3201*b*) being equal. As seen in this embodiment, the apex of the response curve for graph 3201 is at 97.75%. Therefore, the desired target value of 90% for is within the feasibility range for at least some values of the sample size regardless of which "side" of the hill-shaped response curve the sample size lies. As such, once the target value of 90% is determined to be valid (i.e., in the feasibility range), the sample size 3206*a* for Group A can be determined, as previously described.

FIG. 33 illustrates a graphical user interface 3300 having multiple graphs 3301, 3302, and 3303, a fixed total sample size 3305 of 50, and a desired quality metric 3307 representing a margin of error. Graph 3300 also comprises input parameters such as the Group 1 and Group 2 sample sizes 3306*a*, 3306*b* and the Group 1 and Group 2 Proportions 3308, 3309, respectively.

As seen in this figure, the response curve for graph 3301 associated with the Group 1 sample size 3306*a* is not symmetric. Therefore, if the researcher wants to find the Group 1 sample size 3306*a* that will result in a target value of 0.48 for the margin of error, it is only possible on one side of the valley-shaped response curve (i.e., side 3301*b*) and not on the other side of the valley-shaped response curve (i.e., side 3301*a*).

Therefore, to determine a sample size 3306*a* that will yield a target value of 0.48 for the margin of error, embodiments of the present disclosure first determine whether the target value of 0.48 is or is not within the feasibility range for the margin of error, as previously described. If so, computing device 2402 determines the sample size 3306*a* that will yield the desired target value within a pre-specified tolerance, as previously described. Particularly, computing device 2402 is configured, as previously described, to determine whether the value for the input parameter (i.e., sample size 3306*a*) can only be found on one side of the valley-shaped response curve of graph 3301 and not the other, as previously described. Therefore, computing device 2402 will determine which side 3301*a*, 3301*b* of the response curve of graph 3301 the feasibility range is on, and limit operations to that side of graph 3301 when determining the value for the sample size 3306*a*, as previously described.

Figure 34A:
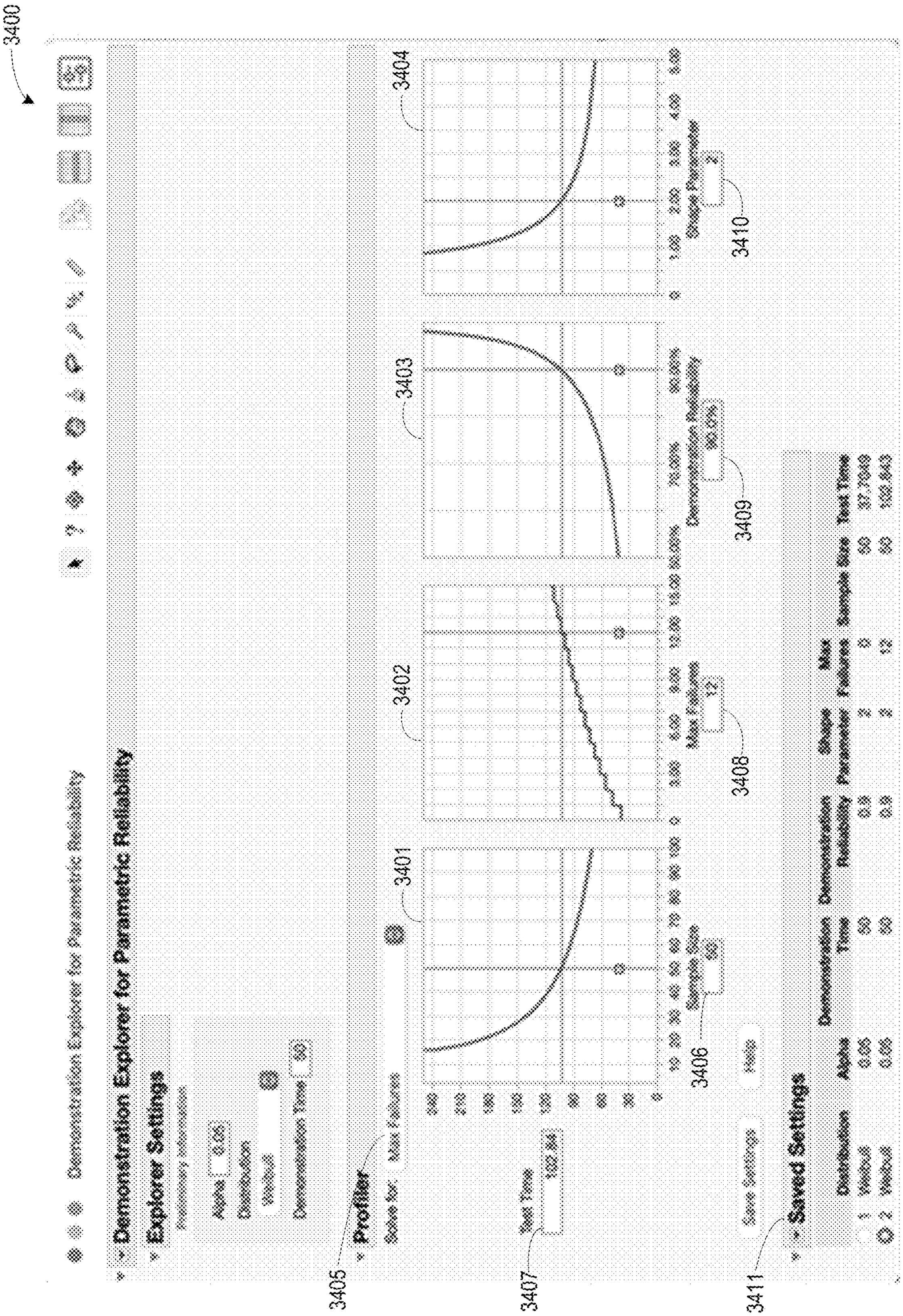
Figure 34B:
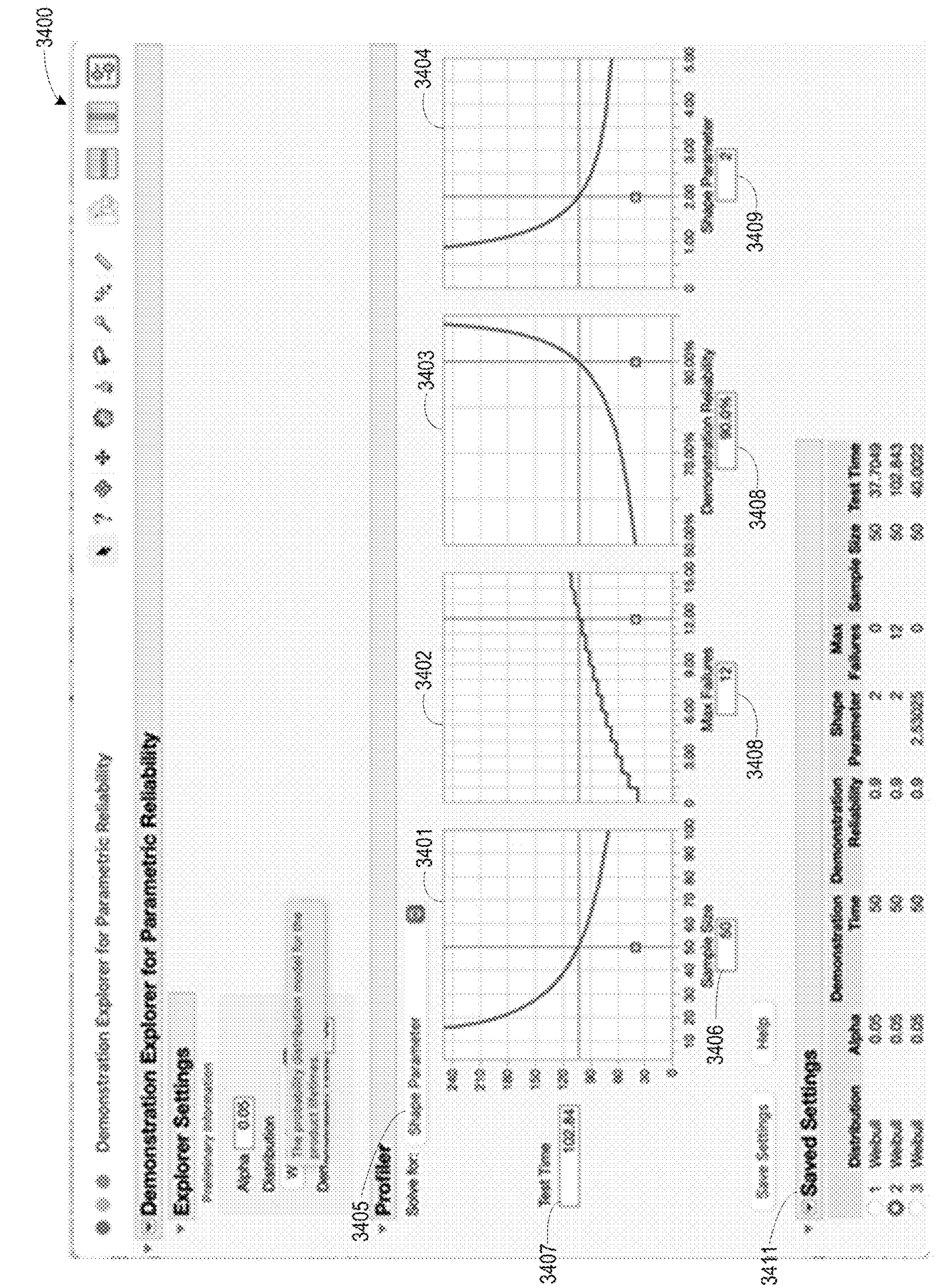

FIGS. 34A-34B illustrate an interactive graphical user interface 3400 comprising a plurality of graphs 3401, 3402, 3403, 3404, a "solve for" setting 3405, the design quality metric 3407, input values 3406, 3408, 3409, 310, and Saved Settings table 3411. In this embodiment, interactive graphical user interface 2430 is generated for use in reliability demonstration testing. Reliability demonstration testing is commonly used in industry to determine whether a product has met a certain reliability requirement at a given time with a specified confidence level. For example, a researcher designing an experiment may be interested in knowing the amount of time required to test a product (i.e., test time 3407) or the number of units (i.e., the sample size 3406)

required to be tested within the available test time to satisfy the prespecified demonstration reliability.

For parametric reliability demonstration testing, the researcher will typically have prior knowledge about the distribution of the lifetime of the product being tested or assume such knowledge. The most commonly used lifetime distributions are associated with shape parameters whose values may be assumed as well. Some embodiments of the present disclosure are configured to allow researchers to explore ranges of the values of the shape parameters, thereby enabling the researchers to get a sense of values of the shape parameter that could have a significant impact on the test time and others that may not. This is particularly useful if the user does not have prior knowledge about the shape parameter and is reluctant to simply assume any value. The user may also wish to know the acceptable number of failures (i.e., max failures) given the other input parameters for a specific test time.

What is claimed is:

1. A computer-program product tangibly embodied in a non-transitory machine-readable storage medium, the computer-program product including instructions implementing a computer profiler tool of a computing system to cause the computing system to:

generate, by the computer profiler tool, an interactive adjustable power analysis graphically indicating a relationship between one or more adjustable settings and each of a plurality of power profiles, wherein to generate the interactive adjustable power analysis, the instructions are configured to cause the computer profiler tool to:

obtain, for a design of an experiment, settings comprising:

a first sample size indicating an amount of members for a first group observed as part of the experiment;

a design quality metric that assesses, based on the first sample size, a quality of the design for the experiment prior to conducting the experiment; and a parameter pertaining to the first group;

generate a graphical user interface by:

generating a first interactive graph visually representing the design quality metric as a function of the first sample size, wherein a first setting comprises a value on an x-axis of the first interactive graph; and generating a second interactive graph visually representing the design quality metric as a function of the parameter pertaining to the first group, wherein a second setting comprises a value on an x-axis of the second interactive graph and is different from the first setting; and display the first and second interactive graphs to a user in a graphical user interface;

update, by the computer profiler tool, the interactive adjustable power analysis, wherein to update the interactive adjustable power analysis, the instructions are configured to cause the computer profiler tool to:

receive, via the graphical user interface, a target value for the design quality metric, wherein the target value indicates a desired quality of the design of the experiment and wherein the design quality metric is related to an input parameter by a response curve;

validate the target value for the design quality metric as being in a feasibility range of values for the design quality metric;

determine a candidate value for the input parameter that yields a calculated value for the design quality metric by iteratively adjusting the candidate value for the input parameter until the calculated value for the design quality metric is within a predetermined tolerance of the target value for the design quality metric;

update, in the graphical user interface, an interactive graph visually representing the calculated value for the design quality metric as a function of the candidate value for the input parameter; and output the graphical user interface to a display.

2. The computer-program product of claim 1, wherein the input parameter is the first sample size and wherein the interactive graph is the first interactive graph; and wherein the instructions implementing the computer profiler tool of the computing system are further configured to update, in the graphical user interface, the second interactive graph by modifying the parameter pertaining to the second interactive graph according to the calculated value for the design quality metric.

3. The computer-program product of claim 1, wherein the input parameter is the parameter pertaining to the second interactive graph and wherein the interactive graph is the second interactive graph; and wherein the instructions implementing the computer profiler tool of the computing system are further configured to update, in the graphical user interface, the first interactive graph by modifying the first sample size according to the calculated value for the design quality metric.

4. The computer-program product of claim 1, wherein updating the interactive graph modifies the relationship that exists between the design quality metric and one or both of:

the first sample size; and the parameter pertaining to the first group.

5. The computer-program product of claim 1, wherein the instructions implementing the computer profiler tool of the computing system are further configured to validate the target value for the design quality metric as being in a feasibility range for the design quality metric based on whether a relationship between the design quality metric and the input parameter is monotonic or non-monotonic.

6. The computer-program product of claim 5, wherein to validate the target value for the design quality metric as being in a feasibility range for the design quality metric, the instructions implementing the computer profiler tool of the computing system are further configured to:

determine that the relationship between the design quality metric and the input parameter is monotonic;

calculate minimum and maximum validation values for the design quality metric as a function of a minimum input value and a maximum input value, respectively, for the input parameter; and validate the target value for the design quality metric as being in the feasibility range for the design quality metric when the target value is bounded by the minimum validation value and the maximum validation value.

7. The computer-program product of claim 5, wherein to validate the target value for the design quality metric as being in a feasibility range for the design quality metric, the instructions implementing the computer profiler tool of the computing system are further configured to:

determine that the relationship between the design quality metric and the input parameter is non-monotonic; and identify a midpoint value for the response curve, wherein to identify the midpoint value, the computer profiler tool of the computing system is configured to:

set a current midpoint value for the response curve equal to a minimum input value for the input parameter increased by a predetermined step size;

calculate corresponding response values as a function of the minimum input value and the current midpoint value, respectively; and determine whether the response curve is shaped like a hill or a valley based on the corresponding response values, wherein:

if the response value calculated for the current midpoint value is greater than the response value calculated for the minimum input value, the response curve is shaped like a hill in which the response curve opens down; and if the response value calculated for the current midpoint value is less than the response value calculated for the minimum input value, the response curve is shaped like a valley in which the response curve opens up.

8. The computer-program product of claim 7, wherein to validate the target value for the design quality metric as being in a feasibility range for the design quality metric, the instructions implementing the computer profiler tool of the computing system are further configured to:

determine a first candidate midpoint value as being equal to the current midpoint value increased by the predetermined step size;

determine a second candidate midpoint value as being equal to the current midpoint value decreased by the predetermined step size;

determine first, second, and third candidate response values as a function of the first candidate midpoint value, the second candidate midpoint value, and the current midpoint value, respectively; and set the current midpoint value to be equal to whichever of the first candidate midpoint value, the second candidate midpoint value, and the current midpoint value corresponds to:

a maximum of the first, second, and third candidate response values when the response curve is shaped like a hill; and a minimum of the first, second, and third candidate response values when the response curve is shaped like a valley.

9. The computer-program product of claim 8, wherein the instructions implementing the computer profiler tool of the computing system are further configured to identify the midpoint value as being the current midpoint value when the third candidate response value is greater than both the first candidate response value and the second candidate response value.

10. The computer-program product of claim 9, wherein the instructions implementing the computer profiler tool of the computing system are further configured to validate an initial input value for the input parameter, and wherein to validate the initial input value for the input parameter, the instructions implementing the computer profiler tool of the computing system are configured to:

determine that the response curve is asymmetrical based on a comparison of first and second endpoint values of the response curve;

determine first and second response values as a function of the first and second endpoints, respectively;

determine a third response value as a function of a midpoint on the response curve;

determine a user input response value as a function of the initial input value for the input parameter; and responsive to determining that the third response value is bounded by either the first and third responses or the second and third responses, adjust the initial input value based on whether the initial input value is on a same side of the response curve as the feasibility range.

11. The computer-program product of claim 1, wherein to determine a candidate value for the input parameter that yields a calculated value for the design quality metric, the instructions implementing the computer profiler tool of the computing system are further configured to determine a direction of the response curve based on whether a relationship between the design quality metric and the input parameter is monotonic or non-monotonic.

12. The computer-program product of claim 11, wherein the instructions implementing the computer profiler tool of the computing system are further configured to:

determine the calculated value for the design quality metric as a function of the candidate value for the input parameter; and evaluate the calculated value to determine whether the calculated value is within the predetermined tolerance of the target value for the design quality metric.

13. The computer-program product of claim 1, wherein to iteratively adjust the candidate value for the input parameter, the instructions implementing the computer profiler tool of the computing system are configured to modify the candidate value by a predetermined step size.

14. The computer-program product of claim 1, wherein when the calculated value for the design quality metric is within the predetermined tolerance of the target value for the design quality metric, the instructions implementing the computer profiler tool of the computing system are further configured to verify the calculated value for the design quality metric as being a closest value to the target value for the design quality metric.

15. The computer-program product of claim 14, wherein to verify the calculated value for the design quality metric as being a closest value to the target value for the design quality metric, the instructions implementing the computer profiler tool of the computing system are configured to:

determine a plurality of fine-tune candidate values on each side of the candidate value;

calculate a fine-tune response value for each of the plurality of fine-tune candidate values; and determine the calculated value for the design quality metric to be whichever fine-tune response value is the closest value to the target value for the design quality metric.

16. The computer-program product of claim 1, wherein the instructions implementing the computer profiler tool of the computing system are configured to:

display, in the graphical user interface, the first interactive graph proximate the second interactive graph;

receive a first user indication modifying at least one of the first and second settings by receiving a user manipulation of the first interactive graph; and update the second interactive graph by a computer-generated manipulation of the second interactive graph.

17. The computer-program product of claim 1, wherein:

the instructions implementing the computer profiler tool of the computing system are configured to receive a time period to demonstrate operation of one or more products;

the experiment relates to testing to ensure a likelihood that the one or more products will meet a predetermined requirement for the one or more products within the time period; and the design quality metric indicates a testing time for the experiment.

18. The computer-program product of claim 1, wherein:

the instructions implementing the computer profiler tool of the computing system are configured to receive one or more reliability requirements for conducting the experiment;

the design quality metric indicates a testing time for the experiment to demonstrate that the reliability requirements are met; and the input parameter comprises one or more of:

maximum values during the testing time, demonstration reliability metrics, and a distribution parameter.

19. The computer-program product of claim 1, wherein the instructions implementing the computer profiler tool of the computing system to receive additional input parameters comprising one or more of:

a distribution for samples of the first group;

an error estimation setting;

a test type setting; and a standard deviation estimation setting.

20. A computer-implemented method comprising:

generating an interactive adjustable power analysis graphically indicating a relationship between one or more adjustable settings and each of a plurality of power profiles, wherein generating the interactive adjustable power analysis comprises:

obtaining, for a design of an experiment, settings comprising:

a first sample size indicating an amount of members for a first group observed as part of the experiment;

a design quality metric that assesses, based on the first sample size, a quality of the design for the experiment prior to conducting the experiment; and a parameter pertaining to the first group;

generating a graphical user interface by:

generating a first interactive graph visually representing the design quality metric as a function of the first sample size, wherein a first setting comprises a value on an x-axis of the first interactive graph; and generating a second interactive graph visually representing the design quality metric as a function of the parameter pertaining to the first group, wherein a second setting comprises a value on an x-axis of the second interactive graph and is different from the first setting; and displaying the first and second interactive graphs to a user in a graphical user interface;

updating the interactive adjustable power analysis, wherein updating the interactive adjustable power analysis comprises:

receiving, via the graphical user interface, a target value for the design quality metric, wherein the target value indicates a desired quality of the design of the experiment and wherein the design quality metric is related to an input parameter by a response curve;

validating the target value for the design quality metric as being in a feasibility range for the design quality metric;

determining a candidate value for the input parameter that yields a calculated value for the design quality metric by iteratively adjusting the candidate value for the input parameter until the calculated value for the design quality metric is within a predetermined tolerance of the target value for the design quality metric;

updating, in the graphical user interface, an interactive graph visually representing the calculated value for the design quality metric as a function of the candidate value for the input parameter; and outputting the graphical user interface to a display.

21. The method of claim 20, wherein updating the interactive graph modifies a relationship that exists between the design quality metric and one or both of:

the first sample size; and the parameter pertaining to the first group.

22. The method of claim 20, wherein validating the target value for the design quality metric as being in a feasibility range for the design quality metric is based on whether a relationship between the design quality metric and the input parameter is monotonic or non-monotonic.

23. The method of claim 22, wherein responsive to determining that the relationship between the design quality metric and the setting is monotonic, validating the target value for the design quality metric as being in a feasibility range for the design quality metric further comprises:

determining a minimum input value and a maximum input value for the setting, wherein both of the minimum input value and the maximum input value are on the response curve;

calculating respective minimum and maximum validation values for the design quality metric at the minimum input value and the maximum input value; and validating the target value for the design quality metric as being in the feasibility range for the design quality metric when the target value is between, or equal to one of, the minimum validation value and the maximum validation value.

24. The method of claim 22, wherein responsive to determining that the relationship between the design quality metric and the setting is non-monotonic, validating the target value for the design quality metric as being in a feasibility range for the design quality metric further comprises identifying a midpoint value on the response curve by:

setting a current midpoint value for the response curve equal to a minimum input value for the input parameter increased by a predetermined step size;

calculating corresponding response values as a function of the minimum input value and the current midpoint value, respectively; and determining whether the response curve is shaped like a hill or a valley based on the corresponding response values, wherein:

if the response value calculated for the current midpoint value is greater than the response value calculated for the minimum input value, the response curve is shaped like a hill in which the response curve opens down; and if the response value calculated for the current midpoint value is less than the response value calculated for the minimum input value, the response curve is shaped like a valley in which the response curve opens up.

25. The method of claim 24, further comprising:

determining a first candidate midpoint value as being equal to the current midpoint value increased by the predetermined step size;

determining a second candidate midpoint value as being equal to the current midpoint value decreased by the predetermined step size;

determining first, second, and third candidate response values as a function of the first candidate midpoint value, the second candidate midpoint value, and the current midpoint value, respectively;

setting the current midpoint value to be equal to whichever of the first candidate midpoint value, the second candidate midpoint value, and the current midpoint value corresponds to:

a maximum of the first, second, and third candidate response values when the response curve is shaped like a hill; and a minimum of the first, second, and third candidate response values when the response curve is shaped like a valley.

26. The method of claim 25, further comprising identifying a midpoint value as being the current midpoint value when the third candidate response value is greater than both the first candidate response value and the second candidate response value.

27. The method of claim 26, further comprising validating an initial input value for the setting by:

determining that the response curve is asymmetrical based on a comparison of first and second endpoint values of the response curve;

determining first and second response values as a function of the first and second endpoints, respectively;

determining a third response value as a function of a midpoint on the response curve;

determining a user input response value as a function of the initial input value for the input parameter; and responsive to determining that the third response value is bounded by either the first and third responses or the second and third responses, adjusting the initial input value based on whether the initial input value is on a same side of the response curve as the feasibility range.

28. The method of claim 20, wherein determining a candidate value for the input parameter that yields a calculated value for the design quality metric comprises determining a direction of the response curve based on whether a relationship between the design quality metric and the input parameter is monotonic or non-monotonic.

29. The method of claim 28, further comprising:

determining the calculated value for the design quality metric as a function of the candidate value for the input parameter; and evaluating the calculated value to determine whether the calculated value is within the predetermined tolerance of the target value for the design quality metric.

30. A computing device comprising a processor and memory, the memory containing instructions executable by the processor wherein the computing device is configured to:

generate an interactive adjustable power analysis graphically indicating a relationship between one or more adjustable settings and each of a plurality of power profiles, wherein to generate the interactive adjustable power analysis, the instructions are executable to cause the computing device to:

obtain, for a design of an experiment, settings comprising:

a first sample size indicating an amount of members for a first group observed as part of the experiment;

a design quality metric that assesses, based on the first sample size, a quality of the design for the experiment prior to conducting the experiment; and a parameter pertaining to the first group;

generate a graphical user interface by:

generating a first interactive graph visually representing the design quality metric as a function of the first sample size, wherein a first setting comprises a value on an x-axis of the first interactive graph; and generating a second interactive graph visually representing the design quality metric as a function of the parameter pertaining to the first group, wherein a second setting comprises a value on an x-axis of the second interactive graph and is different from the first setting; and display the first and second interactive graphs to a user in a graphical user interface;

update the interactive adjustable power analysis, wherein to update the interactive adjustable power analysis, the instructions are executable to cause the computing device to:

receive, via the graphical user interface, a target value for the design quality metric, wherein the target value indicates a desired quality of the design of the experiment and wherein the design quality metric is related to an input parameter by a response curve;

validate the target value for the design quality metric as being within a feasibility range for the design quality metric;

determine a candidate value for the input parameter that yields a calculated value for the design quality metric by iteratively adjusting the candidate value for the input parameter until the calculated value for the design quality metric is within a predetermined tolerance of the target value for the design quality metric;

update, in the graphical user interface, an interactive graph visually representing the calculated value for the design quality metric as a function of the candidate value for the input parameter; and output the graphical user interface to a display.

* * * * *